United States Patent
Belter et al.

(10) Patent No.: US 12,479,259 B2
(45) Date of Patent: Nov. 25, 2025

(54) PRESSURE COMPENSATED ACTIVE SUSPENSION ACTUATOR SYSTEM

(71) Applicant: ClearMotion, Inc., Billerica, MA (US)

(72) Inventors: Joseph Thomas Belter, Novi, MI (US); Brian Alexander Selden, Concord, MA (US); Jason Steven Sirois, Atkinson, NH (US); Mathijs van Staalduinen, Amherst, NH (US); Clive Tucker, Charlestown, MA (US); Taha Zeki Ramazanoglu, Lowell, MA (US)

(73) Assignee: ClearMotion, Inc., Billerica, MA (US)

( * ) Notice: Subject to any disclaimer, the term of this patent is extended or adjusted under 35 U.S.C. 154(b) by 729 days.

(21) Appl. No.: 17/437,612

(22) PCT Filed: Mar. 11, 2020

(86) PCT No.: PCT/US2020/022193
§ 371 (c)(1),
(2) Date: Sep. 9, 2021

(87) PCT Pub. No.: WO2020/185968
PCT Pub. Date: Sep. 17, 2020

(65) Prior Publication Data
US 2022/0185056 A1    Jun. 16, 2022

Related U.S. Application Data

(60) Provisional application No. 62/863,202, filed on Jun. 18, 2019, provisional application No. 62/842,088,
(Continued)

(51) Int. Cl.
*B60G 17/08*    (2006.01)
*B60G 15/06*    (2006.01)

(52) U.S. Cl.
CPC ......... *B60G 17/08* (2013.01); *B60G 15/065* (2013.01); *B60G 2202/413* (2013.01);
(Continued)

(58) Field of Classification Search
CPC .............. B60G 17/08; B60G 15/065; B60G 2202/413; B60G 2202/416; B60G 2500/114; B60G 2600/182
(Continued)

(56) References Cited

U.S. PATENT DOCUMENTS 2,886,142 A * 5/1959 Orshansky, Jr. .......... F16F 9/48
                                                           188/317
3,595,551 A    7/1971 Ortheil
(Continued)

FOREIGN PATENT DOCUMENTS

BE    696971 A    9/1967
CN    1328622 A    12/2001
(Continued)

OTHER PUBLICATIONS

International Search Report and Written Opinion mailed Jul. 28, 2020 in connection with International Application No. PCT/US2020/022193.
(Continued)

*Primary Examiner* — Christopher P Schwartz
(74) *Attorney, Agent, or Firm* — Wolf, Greenfield & Sacks, P.C.

(57) ABSTRACT

Active suspension actuator systems including an actuator with a compression volume and an extension volume are described. In some embodiments, the system includes one or more flow control devices in fluid communication with the compression volume and/or the extension volume of the actuator. In some instances, a flow control device may include a pressure balanced blow-off valve (PBOV). In some
(Continued)

embodiments, the system includes a high capacity bidirectional base valve. In some embodiments, two or more flow control devices cooperate to, for example, damp low amplitude oscillations in the extension and/or compression volumes, and to allow the build-up of pump generated differential pressures while discharging rapid road induced differential pressure spikes between the extension and compression volumes.

18 Claims, 44 Drawing Sheets

Related U.S. Application Data filed on May 2, 2019, provisional application No. 62/821,834, filed on Mar. 21, 2019, provisional application No. 62/816,666, filed on Mar. 11, 2019.

(52) U.S. Cl.
CPC .. *B60G 2202/416* (2013.01); *B60G 2500/114* (2013.01); *B60G 2600/182* (2013.01)

(58) Field of Classification Search
USPC ........................................ 188/322.15, 322.22
See application file for complete search history.

(56) References Cited

U.S. PATENT DOCUMENTS

| | | | | |
|---|---|---|---|---|
| 4,786,034 | A * | 11/1988 | Heess | F16F 9/46 |
| | | | | 188/312 |
| 4,863,002 | A | 9/1989 | Kimberlin | |
| 4,936,423 | A * | 6/1990 | Karnopp | B60G 17/08 |
| | | | | 188/266.5 |
| 5,016,908 | A * | 5/1991 | Athanas | B60G 17/018 |
| | | | | 188/266.5 |
| 5,089,966 | A * | 2/1992 | Fukushima | B60G 17/018 |
| | | | | 280/124.108 |
| 5,248,014 | A | 9/1993 | Ashiba | |
| 7,395,907 | B2 | 7/2008 | Kock et al. | |
| 9,080,634 | B2 * | 7/2015 | Nowaczyk | F16F 9/182 |
| 9,879,744 | B2 * | 1/2018 | Haller | F16F 9/46 |
| 11,440,366 | B1 * | 9/2022 | O'Shea | B60G 17/08 |
| 11,635,075 | B1 * | 4/2023 | Giarratana | F01C 21/02 |
| | | | | 417/171 |
| 2009/0260935 | A1 | 10/2009 | Avadhany et al. | |
| 2010/0072760 | A1 | 3/2010 | Anderson et al. | |
| 2010/0262308 | A1 | 10/2010 | Anderson et al. | |
| 2013/0147205 | A1 | 6/2013 | Tucker et al. | |
| 2014/0190778 | A1 | 7/2014 | Gartner | |
| 2014/0265168 | A1 | 9/2014 | Giovanardi et al. | |
| 2014/0294625 | A1 | 10/2014 | Tucker et al. | |
| 2015/0082784 | A1 | 3/2015 | Uenishi et al. | |
| 2015/0276005 | A1 | 10/2015 | Kim | |
| 2016/0312851 | A1 | 10/2016 | Hamers et al. | |
| 2018/0154728 | A1 * | 6/2018 | Giovanardi | B60G 13/14 |
| 2020/0088214 | A1 | 3/2020 | Woodard et al. | |
| 2021/0252935 | A1 * | 8/2021 | Belter | B60G 11/27 |

FOREIGN PATENT DOCUMENTS

| | | |
|---|---|---|
| CN | 1466664 A | 1/2004 |
| CN | 104204601 A | 12/2014 |
| CN | 105041950 A | 11/2015 |
| CN | 105386951 A | 3/2016 |
| CN | 106394159 A | 2/2017 |
| CN | 108055861 A | 5/2018 |
| CN | 109070663 A | 12/2018 |
| CN | 109073024 A | 12/2018 |
| DE | 14 55 823 A1 | 5/1969 |
| DE | 2128591 A1 | 12/1972 |
| DE | 10 2010 023 434 A1 | 12/2011 |
| DE | 10 2011 102 537 A1 | 2/2012 |
| DE | 10 2015 104 388 A1 | 9/2016 |
| DE | 10 2016 216 544 A1 | 3/2018 |
| EP | 0 185 389 A1 | 6/1986 |
| FR | 2008466 A1 | 1/1970 |
| GB | 1185074 A | 3/1970 |
| GB | 1393812 A | 5/1975 |
| JP | 2001-073955 A | 3/2001 |
| JP | 2002-031101 A | 1/2002 |
| JP | 2016-501781 A | 1/2016 |
| WO | WO 2000/32955 A1 | 6/2000 |
| WO | WO 00/69664 A1 | 11/2000 |
| WO | WO 2011/154026 A1 | 12/2011 |
| WO | WO 2011/159874 A2 | 12/2011 |
| WO | WO 2014/145018 A2 | 9/2014 |
| WO | WO 2014/176371 A2 | 10/2014 |
| WO | WO 2016/072510 A1 | 5/2016 |
| WO | WO 2017/210492 A1 | 12/2017 |
| WO | WO 2018/222821 | 12/2018 |

OTHER PUBLICATIONS

International Preliminary Report on Patentability mailed Sep. 23, 2021 in connection with International Application No. PCT/US2020/022193.

U.S. Appl. No. 16/500,667, filed Oct. 3, 2019, Tucker et al.

\* cited by examiner

PRESSURE COMPENSATED ACTIVE SUSPENSION ACTUATOR SYSTEM

RELATED APPLICATIONS

This application is a national stage filing under 35 U.S.C. § 371 of International Patent Application Serial No. PCT/US2020/022193, filed Mar. 11, 2020, which claims the benefit of U.S. Provisional Patent Application Ser. No. 62/863,202, filed Jun. 18, 2019, U.S. Provisional Patent Application Ser. No. 62/842,088, filed May 2, 2019, U.S. Provisional Patent Application Ser. No. 62/821,834, filed Mar. 21, 2019, and U.S. Provisional Patent Application Ser. No. 62/816,666, filed Mar. 11, 2019, each of which are incorporated herein by reference in their entirety.

FIELD

Disclosed embodiments are related to vehicular active suspension systems that include hydraulic actuators.

BACKGROUND

Vehicular hydraulic active suspension systems, which take advantage of fluids to store, convert, and/or transmit power, may generally include one or more hydraulic actuators. The flow of hydraulic fluid within an active actuator system may be controlled by a hydraulic machine that functions as a pump, in some operating conditions, and/or hydraulic motor, in other operating conditions, in order to control a force applied between a sprung mass and an unsprung mass of a vehicle.

SUMMARY

In some embodiments, an active suspension actuator system may include an actuator that has a pressure tube. The pressure tube may have an internal volume that slidably receives a piston which divides at least a portion of the internal volume into a compression volume and an extension volume. In at least one mode of operation the pressure in the compression volume may oscillate at multiple frequencies that may include a first frequency. The system may also include hydraulic machine with a first port and a second port, where the first port may be connected to the compression volume by a first flow path that does not include the second port and where the second port is connected to the extension volume by a second flow path that does not include the first port. The hydraulic machine may be a hydraulic pump or a hydraulic motor. The system may also include a controller that operates the hydraulic machine as a hydraulic pump in at least a first operating mode and as a hydraulic motor in a second operating mode. As used herein, the term "compression volume" refers to the portion of the internal volume of an actuator which is compressed by the piston when the actuator is compressed, and the term "extension volume" refers to the portion of the internal volume of the actuator which is compressed by the piston when the actuator is extended during rebound.

The system may also include a damping flow control device, with a total impedance that resists the flow in a manner that damps flow oscillations in at least a portion of the first flow path. The flow control device may be structured such that its impedance (i.e. its damping effect) decreases when the pressure drop across the flow control device exceeds a first preset threshold pressure drop.

The system may also include a first bypass flow control device that is located between the compression volume and extension volume. The first bypass flow control device may include a first pressure balanced blow-off valve (PBOV) with a pressure offset. The pressure offset may prevent the PBOV from opening unless the pressure in the compression chamber or the pressure differential across the piston exceeds a preselected value. Once the pressure threshold (i.e. either the pressure differential threshold or the absolute pressure threshold) is exceed, the PBOV responds or effectively responds to pressure changes above a certain frequency but not to pressure changes that are below such a frequency. A PBOV may also operate in a similar fashion to discharge fluid from the extension volume into the compression volume. In some embodiments, a second PBOV may be used in conjunction with the first PBOV such that one discharges from the compression volume to the extension volume while the second PBOV discharges in the opposite direction.

In some embodiments the pressure offset may be an absolute offset or a relative offset. The damping coefficient of at least a portion of the first flow path may be greater than 10 but less than 400 newton-meters per second. Damping coefficients outside this range may also be used as the disclosure is not limited to this range.

In some embodiments, the damping coefficient of the damping flow control device may be different when the flow is towards the compression volume compared to when the flow is away from the control volume.

The in some embodiments, the first bypass flow control device discharges may include a hydraulic filter that blocks or effectively blocks frequencies between 10 Hz and 100 Hz. In some embodiments hydraulic filters may block or effectively block frequencies in other ranges may also be used as the disclosure is not limited to this frequency range.

In some embodiments the one or more bypass flow control devices may be integrated with the piston. In some embodiments one or more PBOVs may be located in other flow paths that may be external to the pressure tube.

In some embodiments, an active suspension actuator system of a vehicle may include a piston with a first face (or side) that includes a first inlet port and a second face (or side) that includes a first outlet port. The first inlet port may be fluidly connected to the first outlet port by a first fluid flow passage internal to the piston. The actuator may also include a pressure tube with an internal volume (e.g. a cylindrical volume) divided into a first chamber (e.g. a compression volume or an extension volume) and a second chamber (e.g. an extension volume or a compression volume) by the piston. The piston may be slidably received in the internal volume, and the first inlet port may be fluidly connected to the first chamber. A piston rod may be included that is attached to a sprung mass of the vehicle (e.g. a vehicle body) at a first end and the piston at a second end. The system may also include a first flow control device attached to the piston (located on the compression volume side of the piston or the extension volume side of the piston) that selectively, fluidly connects the first outlet port to the second chamber based at least in part on the pressure differential between the first and second chambers and/or one or more of the following properties: (i) a rate of pressure rise in the first chamber, (ii) a rate of change of the pressure differential between the first and second chambers, (iii) a rate of pressure drop in the second chamber, and (iv) a frequency of pressure fluctuation in the first chamber. As used herein, the term "compression volume" in an actuator refers to a volume in the actuator that is compressed by the piston during a compression stroke of the actuator while the term "extension volume" refers to a volume in the actuator that is compressed by the piston during an extension stroke of the actuator.

In some embodiments, an active suspension actuator system of a vehicle may also include a second flow control device attached to the piston. Additionally, the first face of the piston may also include a second outlet port and the second face may also include a second inlet port, where the second inlet port may be fluidly connected to the second outlet port by a second fluid flow passage internal to the piston. Additionally, second inlet port may be fluidly connected to the second chamber, and the second flow control device may selectively, fluidly connect the second outlet port to the first chamber based at least in part on the pressure differential between the first and second chambers and/or one or more of the following properties: (i) a rate of pressure rise in the second chamber, (ii) rate of change of the pressure differential between the first and second chambers, (iii) a rate of pressure drop in the first chamber, and (iv) a frequency of pressure fluctuation in the first chamber, and (iv) a frequency of pressure fluctuation in the second chamber. As used herein, the term "selectively connect" refers to using a flow control device to allow the passage of fluid under some operating conditions and to block or effectively block fluid flow under other operating conditions.

In some embodiments of an active suspension actuator system, the flow control device may be a pressure balanced blow-off valve. In some embodiments, the pressure balanced blow-off device may include a hydraulic low pass filter that includes a dissipative element (e.g. an orifice, a laminar flow element, a viscous damping element) and a compliance element (e.g. a gas filled chamber or a spring loaded piston). In some embodiments. The low pass filter may be used to delay the rise pressure in one volume in the valve relative a second volume in the valve. The pressure balanced blow-off valve may be a passive valve (e.g. is not energized by electricity).

In some embodiments, an active suspension actuator system may include a sealing element (e.g. a sealing washer, a shim stack), that selectively controls fluid flow from an outlet port in a piston, is biased in a closed position by at least two spring elements (e.g. coil springs). Additionally, one of the at least two bias springs in the pressure balanced blow-off valve may be operatively interposed between a spring perch, that is fixed relative to the piston rod, and the sealing element. A second of the at least two bias springs may be operatively interposed between a spring perch, that moves relative piston rod, and the sealing element.

In some embodiments, a method of operating an active suspension actuator system of a vehicle may include operating the vehicle over a road surface with an active suspension actuator operatively interposed between a wheel assembly and the vehicle body. The actuator may include a compression volume and an extension volume that are fluidly connected to a first and second port of a hydraulic machine (e.g. a hydraulic pump operating as a hydraulic motor and/or a pump, or a hydraulic motor operating as a pump and/or a hydraulic motor) respectively. During operation a wheel associated with the wheel assembly may strike or encounter a discontinuity in the road (e.g. pothole, bump, speed bump, a crack, an expansion joint, a curb, debris). Striking or encountering the discontinuity, may result in an increase in pressure and/or an increase in the pressure differential between the compression volume and extension volume increase to a first value greater than a pre-selected threshold value. This increase may be at a first rate of increase. In response, a pressure balanced blow-off valve may open to discharge at least a portion of the increased pressure or pressure differential by establishing flow between the compression and extension volumes. Under certain operating conditions, the hydraulic machine may be used to increase the pressure in the compression volume or the pressure differential between the compression and extension volumes to a value greater than the threshold but at a rate lower than the first rate without opening the pressure balanced blow-off valve. Under certain operating conditions, the hydraulic machine may be used to increase the pressure in the compression volume or the pressure differential between the compression and extension volumes to a value less than the threshold but at a rate higher than the first rate without opening the pressure balanced blow-off valve. In some embodiments, the pressure balanced blow-off valve may be a passive valve.

In some embodiments, a method of operating an active suspension actuator system of a vehicle may include operating the vehicle over a road surface with an active suspension actuator operatively interposed between a wheel assembly and the vehicle body. The actuator may include an internal cylindrical volume that is separated into a first chamber and a second chamber by a piston that is slidably received in the internal volume, and where the first chamber and second chamber are fluidly connected to a first and second port of a hydraulic machine respectively. During operation a wheel associated with the wheel assembly may strike or encounter a discontinuity in the road (e.g. pothole, bump, speed bump, a crack, an expansion joint, a curb, debris). Striking or encountering the discontinuity, may result in an increase in pressure in the first chamber and/or the first chamber relative to the second chamber to a first value greater than a pre-selected threshold value at a first rate of increase. The method may further include opening a pressure balanced blow-off valve to discharge at least a portion of the increased pressure or the differential pressure by allowing fluid to flow from the first chamber to the second chamber. The method may further include operating the hydraulic machine to increase the pressure in the first chamber or the pressure differential between the chambers to a value greater than the threshold at a rate lower than the first rate without opening the pressure balanced blow-off valve. The method may further include operating the hydraulic machine to increase the pressure in the first chamber and/or the pressure differential between the chambers to a value less than the threshold value at a rate greater than the first rate without opening the pressure balanced blow-off valve. In some embodiments the pressure balanced blow-off valve may be a passive valve. In some embodiments the first chamber may be a compression volume and the second chamber may be an extension volume.

In one embodiment, an active suspension actuator, includes: an actuator that includes a pressure tube and a second tube at least partially surrounding the pressure tube, wherein the pressure tube includes a compression volume and an extension volume separated by a piston, wherein the pressure tube and the second tube have an extension volume end and a compression volume end, wherein the pressure tube and the extension tube form an intervening volume; a base valve assembly, located at a compression volume end of the pressure tube and the second tube, that includes: a base valve body with that includes internal compression flow conduits and extension flow conduits that fluidly connect the compression volume and at least a portion of the intervening volume; an extension shim stack securely attached to the valve body that includes an extension sealing shim that controls the flow from the intervening volume via the extension flow conduits to the compression volume and prevents flow in the opposite direction in the extension flow conduits; and a compression shim stack securely attached to the valve body that includes a compression sealing shim that controls the flow from the compression volume via the compression flow conduits to the intervening volume and prevents flow in the opposite direction in the compression flow conduits.

In another embodiment, a bidirectional base valve of an active suspension actuator includes: a base valve body with a first set of internal flow channels and a second set of internal flow channels; a first shim stack that is configured to regulate flow, through the first set of flow channels, from a compression volume of the actuator to a second volume in the actuator and blocks flow from the second volume from entering the first set of flow channels; and a second shim stack that is configured to regulate flow, through the second set of flow channels, that flows from the second volume to the compression volume and blocks flow from the compression volume from entering the second set of flow channels.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures. In cases where the present specification and a document incorporated by reference include conflicting and/or inconsistent disclosure, the present specification shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
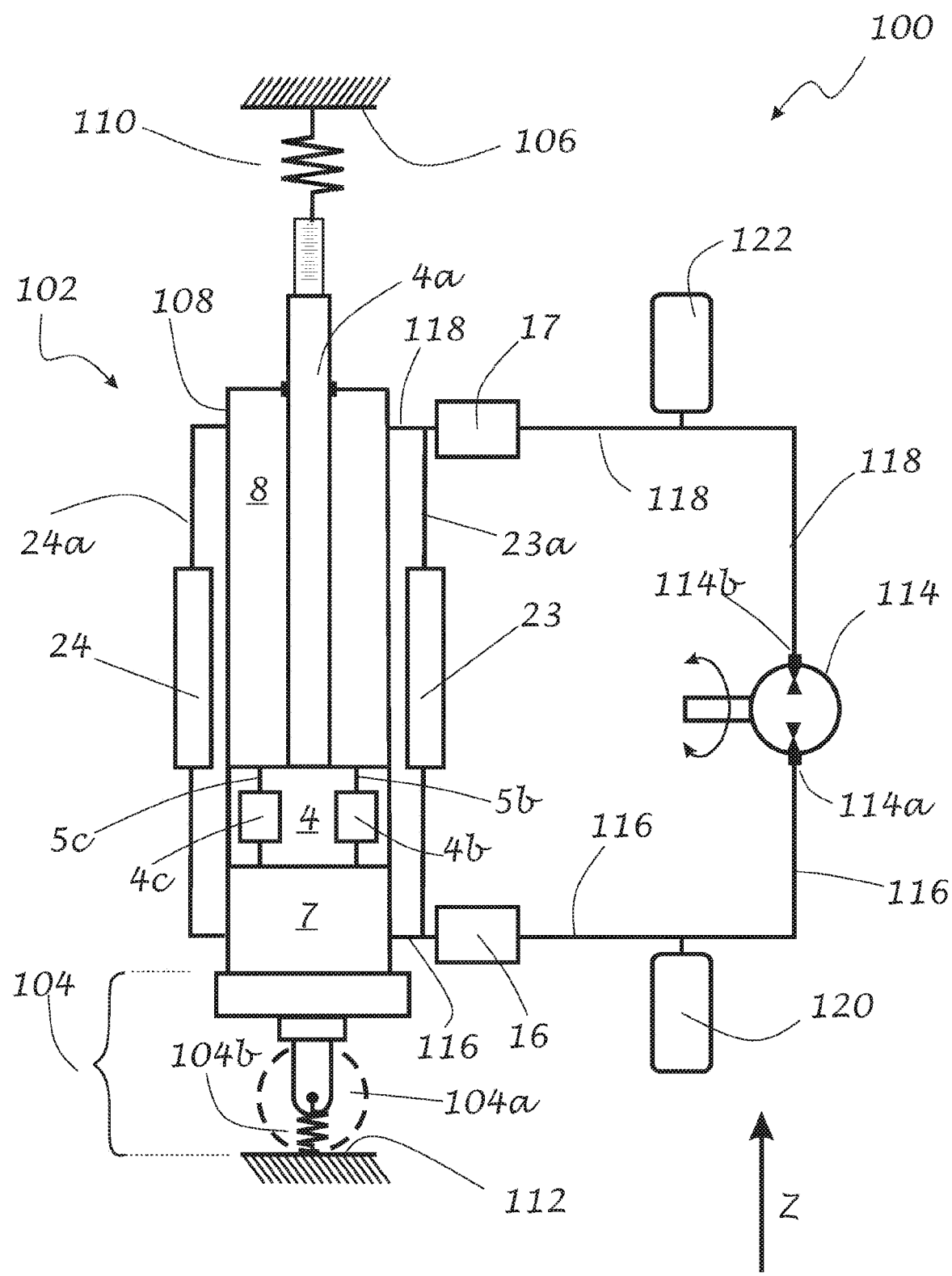
FIG. 1 illustrates an embodiment of a vehicular active suspension actuator system with multiple flow control devices.

FIG. 1 illustrates an active suspension actuator system 100 of a vehicle. Actuator 102, of the system, may be operatively interposed between an unsprung mass 104 of the vehicle (e.g. wheel assembly) and a sprung mass 106 of the vehicle (e.g. vehicle body). Actuator 102 includes a pressure tube 108 that slidably receives piston 4 in an internal cylindrical volume. In some embodiments, such as the embodiment of FIG. 1, the pressure tube 108 may also serve as the housing of the actuator 102. In other embodiments, the housing may include an outer tube that, at least partially, surrounds the pressure tube 108. In some embodiments, an annular fluid filled volume between the pressure tube 108 and the housing may serve as a flow passage and/or a gas filled accumulator. U.S. Pat. No. 9,689,382 entitled "INTEGRATED ENERGY GENERATING DAMPER", filed Apr. 8, 2015, the disclosure of which is incorporated herein by reference in its entirety, discloses integrated multi-tube actuators, for example, in FIGS. 6 and 7 and associated description.

The piston 4 divides at least a portion of the internal cylindrical volume of the pressure tube 108 of actuator 102 into a compression volume 7 and an extension volume 8. In the embodiment of FIG. 1, the piston 4 is attached to the sprung mass 106 by an intervening piston rod 4a and top mount 110. In some embodiments, the top mount 110 may effectively be a spring element and is illustrated as a spring element in FIG. 1. In some embodiments the top mount 110 may include a damping element in parallel or in series with the spring element.

In the embodiment of FIG. 1, the pressure tube 108 is directly or indirectly affixed to the unsprung mass 104 (e.g. wheel assembly), which includes a tire 104a shown in phantom. Tire 104a that may travel along a road surface 112 effectively performs as a spring and is represented as spring element 104b. It should be noted that, alternatively, in some embodiments, the actuator 102 may be inverted such that the pressure tube 108 is directly or indirectly affixed to the top mount 110 while the piston rod 4a is attached to the unsprung mass 104 and the disclosure is not so limited.

The embodiment illustrated in FIG. 1 includes a hydraulic machine 114 that includes a first port 114a and a second port 114b. Flow passage 116 fluidly connects port 114a to the compression volume 7 and flow passage 118 fluidly connects port 114b to the extension volume 8. The actuator system 100 may include one or more accumulators, such as for example, accumulator 120 that is fluidly connected to flow passage 116 by a branch flow passage, and/or accumulator 122 that is fluidly connected to flow passage 118 by a another branch flow passage. The accumulators may function as fluid storage elements and/or compliance or spring elements. Such accumulators may include a gas spring and/or mechanical spring, e.g. coil spring.

In the embodiment in FIG. 1, the force applied on the sprung mass 106 in the z direction by the actuator system 100 is determined by the pressure in the compression volume 7 multiplied by the cross sectional area of the piston (i.e. cross section that is transverse to the longitudinal axis of piston rod) minus the pressure in the extension volume multiplied by the difference in the cross sectional area of the piston 4 and the cross sectional area of the piston rod 4a.

In some embodiments, the force applied on the sprung mass by the actuator system 100 may be regulated by controlling the pressures in the compression volume 7 and/or extension volume 8. The pressure in these volumes may be influenced by road-induced disturbances that may cause the piston 4 to move relative to the pressure tube 108. Alternatively or additionally, in some embodiments, the pressures in the compression volume 7 and/or extension volume 8 may be influenced by fluid flow into and/or out of those volumes and/or the pressure differential produced by the hydraulic device 114. In some embodiments, flow into and out of the compression volume 7 may be controlled by, for example, flow control device 16 operatively positioned in flow passage 116, flow control device 4b operatively positioned in flow passage 5b in piston 4, and/or flow control device 23 operatively positioned in flow passage 23a.

In some embodiments, additionally or alternatively, flow into and out of the extension volume 8 may be controlled by flow control device 17 operatively positioned in flow passage 118, flow control device 4c operatively positioned in flow passage 5c in piston 4, and/or flow control device 24 operatively positioned in flow passage 24a. In some embodiments, one or more such flow control devices may be omitted, additional flow control devices may be incorporated in various flow channels, and/or multiple flow control devices may be consolidated into a single flow control device.

In some embodiments, a first set of flow control devices 14 and 15, and/or a second set of bypass flow control devices 23 and 24 may be used to exchange a quantity of hydraulic fluid between the compression volume 7 and the extension volume 8 without passing through the hydraulic device 114. Some embodiments may include only the first set of bypass flow control devices. Some embodiments may include only the second set of bypass flow control devices. Some embodiments may include both sets of bypass flow control devices. Some embodiments may include only one bypass flow control device from the first set and/or one bypass from the second set. It is noted that in some embodiments one or more of the flow control devices, such as 4b, 4c, 23, 24, 16, and 17, in FIG. 1, may be bi-directional or unidirectional and the disclosure is not limited in this respect.

The present disclosure is not limited to a particular number, positioning, or combination of flow control devices such as those shown in FIG. 1. Each of the flow control devices may include one or more damping elements that dissipate at least a portion of the kinetic and/or potential energy of the fluid that passes through the damping element. Damping elements may include, without limitation, orifices, capillary tubes, and/or other flow elements that are configured to viscously damp flow. Alternatively or additionally, each of the flow control devices may include, without limitation, one or more passive or active valves such as, for example, check valves, blow-off valves, poppet valves, pressure balanced blow-off valves, shim stacks, electrically actuated valves, and pressure actuated valves. In some embodiments of the actuator system 100 of FIG. 1, the actuator 102 may be inverted such that the pressure tube 108 maybe attached to the sprung mas 106 by means, for example, of the top mount 110 and the piston rod 4a may be attached to the unsprung mass 11.

In some embodiments, the hydraulic machine 114 of the active suspension actuator system 100 may be operated as a pump to apply an active force, i.e. a force in the direction of motion, on the sprung mass 106, relative to the unsprung mass 104, or a passive or resistive force in a direction that opposes the motion, of the sprung mass 106, relative to the unsprung mass 04. Alternatively or additionally, the hydraulic machine 114 may be operated as a hydraulic motor to produce a passive or resistive force, i.e. a force opposed to the direction of relative motion between the unsprung mass and sprung mass. The hydraulic machine 114 may be a hydraulic pump that is operated as a hydraulic pump and/or a hydraulic motor. Alternatively, the hydraulic machine 114 may be a hydraulic motor that is operated as a hydraulic motor and/or a hydraulic pump.

In some embodiments of FIG. 1, flow control device 16 and/or flow control device 17 may be configured to provide a first level of fluid damping [e.g. 0.8-1.2 bar/(L/min) or 1.0-1.1 bar/(L/min)] when the fluid flow rate through the device in a given direction is at a first flow rate [e.g. 2-10 L/min or 6-7 L/min], but a second lower level of damping [e.g. 0.05-0.1 Bar/(L/min)] when the flow rate through the flow control device is a higher second flow rate [e.g. 10-200 L/min or 7-100 L/min]. Additionally, the flow control device 16 and/or flow control device 17 may be configured to include a sufficiently large effective flow area(s) to accept substantially all or all [e.g. greater than 90%, 95%, 98% or 100%] of the flow volume displaced in the extension volume 8 by the piston during extension and/or displaced in the compression volume 7 during compression without exceeding a predetermined maximum pressure or rate of pressure rise in either the compression volume 7 or the extension volume 8 respectively. Additionally, the flow control device(s) 16 and/or 17 may be configured to include a sufficiently large effective flow area(s) to accept pump flow during operation without exceeding a maximum pressure drop [e.g. 3-5 Bar].

Additionally, in some embodiments, a first set of flow control devices 4b and 4c, and/or a second set of bypass flow control devices 23 and 24 may be used to exchange a quantity of hydraulic fluid between the compression volume 7 and the extension volume 8 without passing through (i.e. bypassing) the hydraulic machine 114.

These flow control devices may act to equilibrate the pressures in the two chambers when: the differential pressure between them increases rapidly [e.g. 200-300 Bar/sec or 300-500 Bar/sec] and the differential pressure is greater than a threshold value [e.g. 2-10 Bar or 2-30 Bar].

Figure 2:
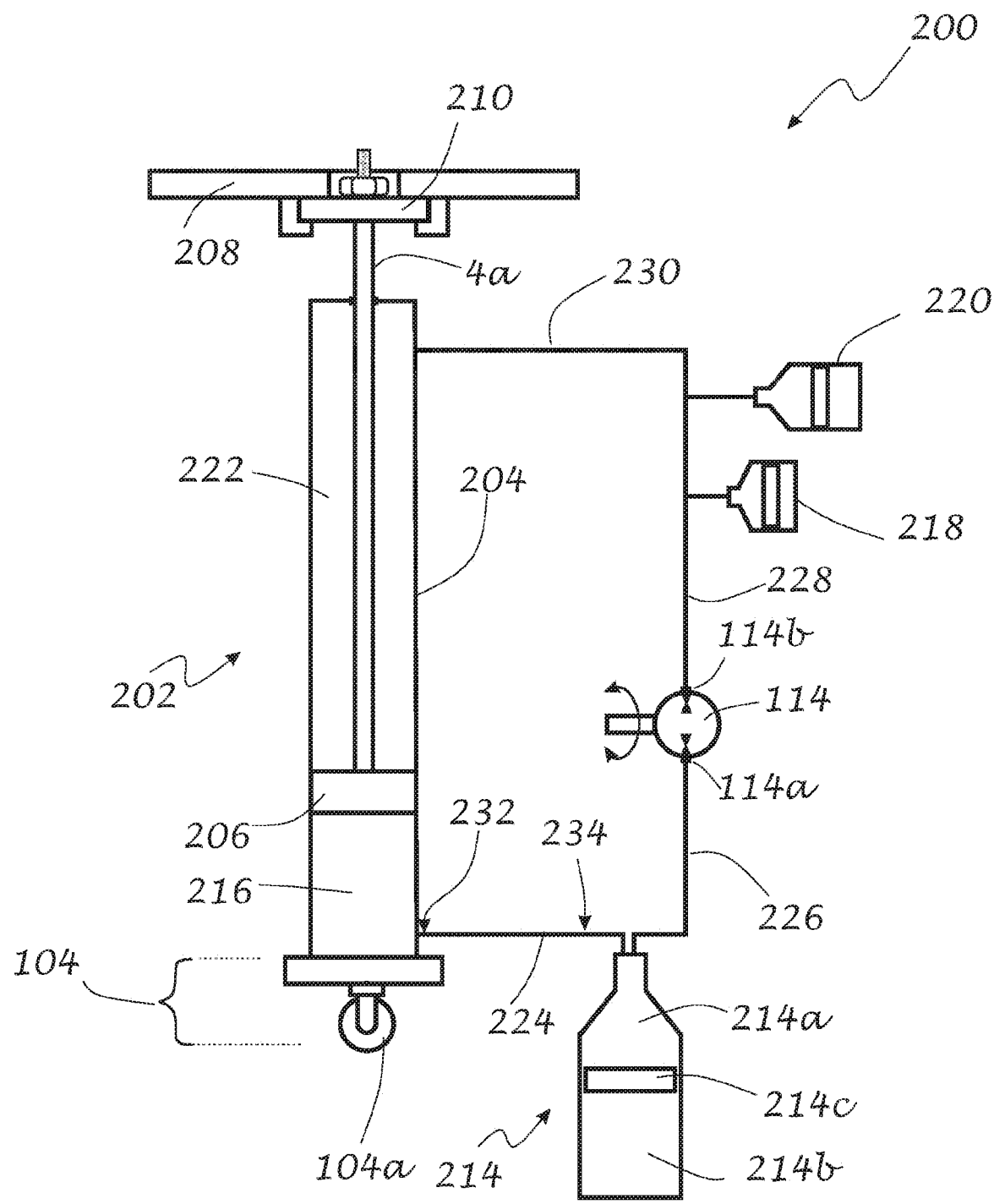
FIG. 2 illustrates an embodiment of a vehicular active suspension actuator system with multiple gas pressurized accumulators, and a flow passage fluidly connected to the compression volume.

FIG. 2 illustrates an embodiment of a hydraulic, active suspension actuator system 200 of a vehicle. The active suspension actuator system 200 of FIG. 2 includes an actuator 202, with a pressure tube 204 that may include a predominantly cylindrical internal volume, a hydraulic machine 114 (e.g. a hydraulic pump, a hydraulic motor) which may be operatively coupled to an electric machine (electric generator, electric motor) (not shown), and a multiplicity of hydraulic fluid flow passages. At least a portion of the internal volume of pressure tube 204 may be separated into a compression volume 7 and an extension volume 8 by a piston 206 that is slidably received in the pressure tube 204. Piston 206 is operatively coupled to a sprung mass 208 by intervening piston rod 4a. In some embodiments, the piston rod 4a may be securely attached to the sprung mass 208 by means of an intervening top mount 210.

As in FIG. 1, the embodiment of active suspension actuator system 200 may include a hydraulic machine 114 with a first port 114a and a second port 114b. Any of the active suspension actuator systems described herein may include one or more accumulators operatively interposed between the hydraulic machine and the compression volume, and/or between the hydraulic machine and the extension volume. For example, the active suspension actuator system 200 includes one flow-through accumulator 214 operatively interposed between the hydraulic machine 114 and the compression volume 216 as well as a branched accumulator 218 and branched accumulator 220 operatively interposed between the extension volume 222 and the hydraulic machine. It is noted that any one or more of these accumulators, or none of them, may be flow-through accumulators and the disclosure is not so limited.

The embodiment illustrated in FIG. 2 includes flow passage 224 that fluidly connects compression volume 216, of the actuator 202, to volume 214a in accumulator 214. In some embodiments, accumulator 214 may include volume 214b that contains a compressible material such as, for example, nitrogen, air or other appropriate gas. In some embodiments, the gas in volume 214b may be separated from volume 214b by floating piston 214c or contained in a sealed compressible bladder (not shown) in which case the piston 214c may be unnecessary. In other embodiments, volume 214a may be separated from volume 214b by a flexible diaphragm (not shown). The gas or compressible material in volume 20b may act as a spring element to add compliance to the hydraulic circuit. In some embodiments, the gas or compressible material may be replaced or augmented by a metal spring such as a coil spring.

Flow passage 226 fluidly connects port 114a to volume 214a and flow passages 228 and 230 in combination fluidly connect port 114b to the extension volume 222. One or more of the accumulators may function as fluid storage elements and/or compliance or spring elements. Such accumulators may include a gas spring and/or mechanical spring, e.g. coil spring.

Figure 3:
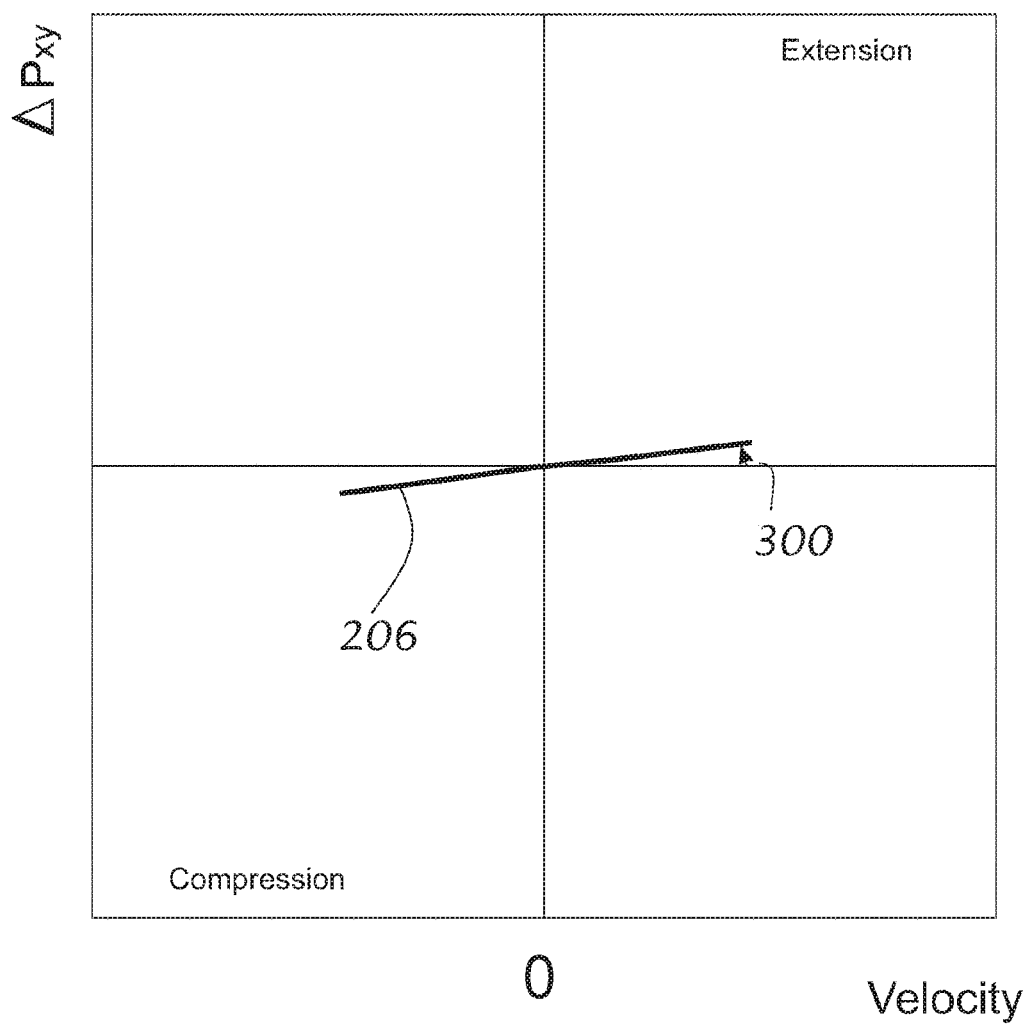
FIG. 3 shows the relationship between pressure drop and flow velocity between two positions in the flow passage of FIG. 2.

FIG. 3 illustrates the relationship between the pressure drop, ΔPxy, between positions 232 and 234 in flow passage 224 that carries fluid to and from the compression volume 216. If the flow passage is a largely unobstructed flow passage configured to carry expected maximum flow rates in the passage, i.e. low impedance, the pressure drop at low flow rates may be too small to produce sufficient damping. As used herein, "low flow rate" in a given flow passage in the active suspension actuator system refers to the flow rate, in the given passage, when the piston is moving at a speed of less than 0.2 meters/second in compression and/or extension. As used herein, "high flow rate" in a given flow passage in an active suspension actuator system refers to the flow that occurs when the piston is moving at a speed greater than 0.6 meters/second in compression and/or extension but less than 1 meter/second. As used herein, "very high flow rate" in a given flow passage in an active suspension actuator system refers to the flow that occurs when the piston is moving at a speed greater than or equal to 1 meter per second and less than 2 meters per second. For example, in the embodiment of FIG. 2, the flow rate in passage 224 is low when the piston is moving at less than 0.2 meters per second in compression or extension.

In the embodiment illustrated in FIG. 2, pressure perturbations, which may be induced in the compression volume 216 by, for example, road disturbances or the hydraulic machine, may induce flow oscillations between positions 232 and 234. The characteristics of the flow oscillation may be a function of various parameters including, for example, one or more of: the geometry of flow passage 224, density of the fluid in the flow passage 224, the compliance of the accumulator 214, the mass of fluid in compression volume 216, the mass of the pressure tube 204, the mass of the unsprung mass 104, and the spring constant of the tire 104a. The Inventors have recognized that in some embodiments, the interaction of these components with pressure perturbations in the compression volume 216 may resemble the harmonic behavior of a spring mass oscillator. Under such circumstances, if there is limited fluid damping (i.e. underdamped flow) in certain passages where flow oscillations may be present, such as flow passage 224 and/or 230, any oscillations that are generated by, for example, a road disturbance or the operation of the hydraulic machine, may persist for an extended period. This may result in objectionable levels and/or duration of vibrations transferred to the vehicle body over an extended period.

The Inventors have recognized that flow passages that are configured to carry flow at high flow rates with acceptable pressure drops may not function properly at low flow rates. They may have insufficient damping at low flow rates to dissipate flow oscillations. In FIG. 3, the slope angle 300 of the curve 302 is indicative of the impedance of the flow passage 224 of the embodiment in FIG. 2. The flow of fluid in passage 224 may be under-damped under certain operating conditions, such as, when oscillations are induced during low flow conditions. Such oscillations may be induced by interaction between tire 104a and road surface imperfections and/or discontinuities. Such oscillations may produce fluctuating forces in actuator 202 which may be transmitted to the vehicle body by piston rod 4a and may be sensed by occupants of the vehicle.

As discussed above, the Inventors have recognized that damping levels in one or more flow passages in an active suspension actuator system may be insufficient to dissipate certain oscillations at a sufficiently rapid rate. The Inventors have recognized that, in some embodiments, it may be necessary to add damping elements to certain flow passages in order to dissipate oscillations. Such damping elements may be discrete elements such as, for example, orifices or other restrictions or distributed elements that are distributed along a length of pipe or flow passage.

Figure 4:
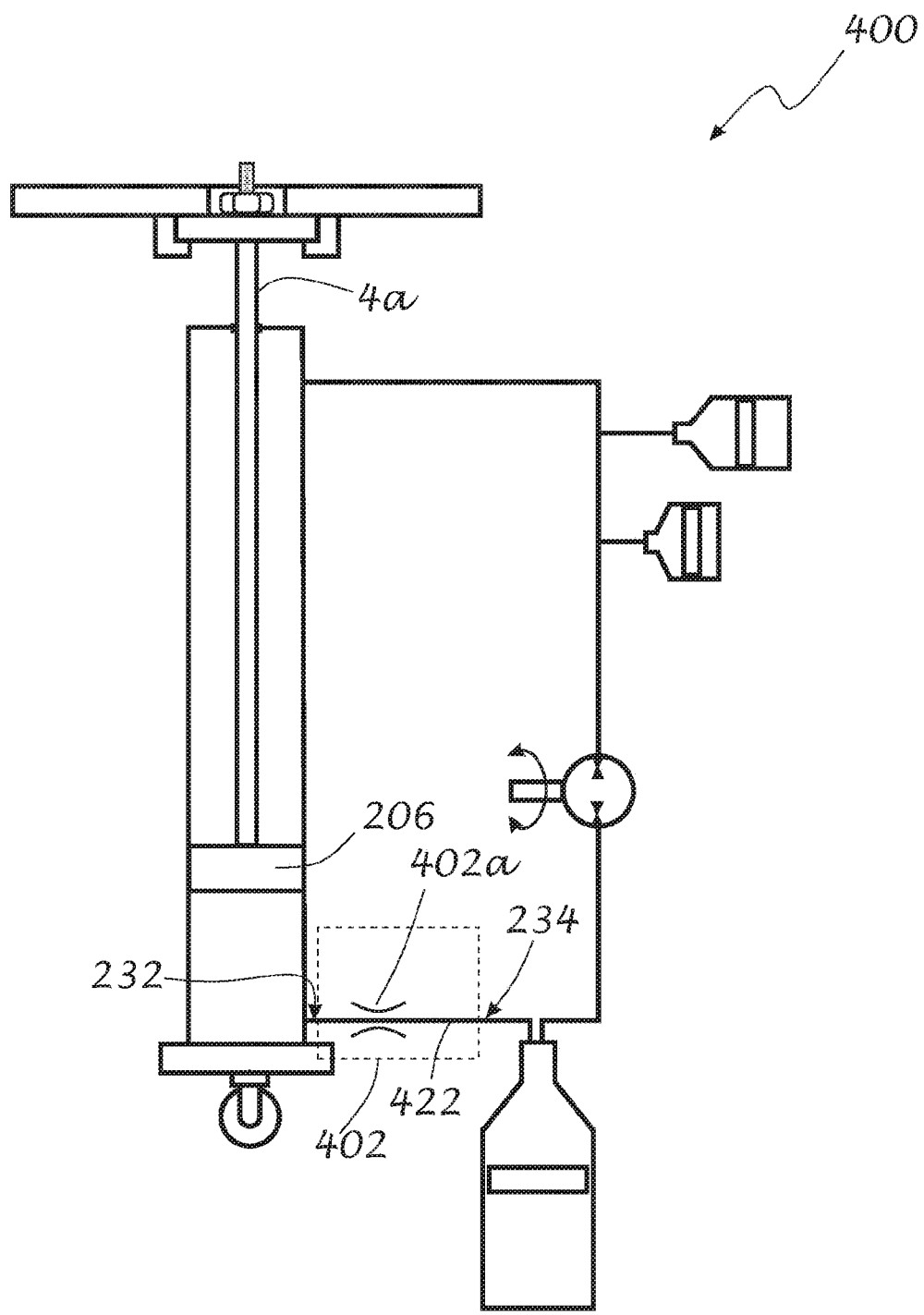
FIG. 4 illustrates the embodiment of a vehicular active suspension actuator system of FIG. 2 with an embodiment of a flow control device located in the flow passage fluidly connected to the compression volume.
Figure 5:
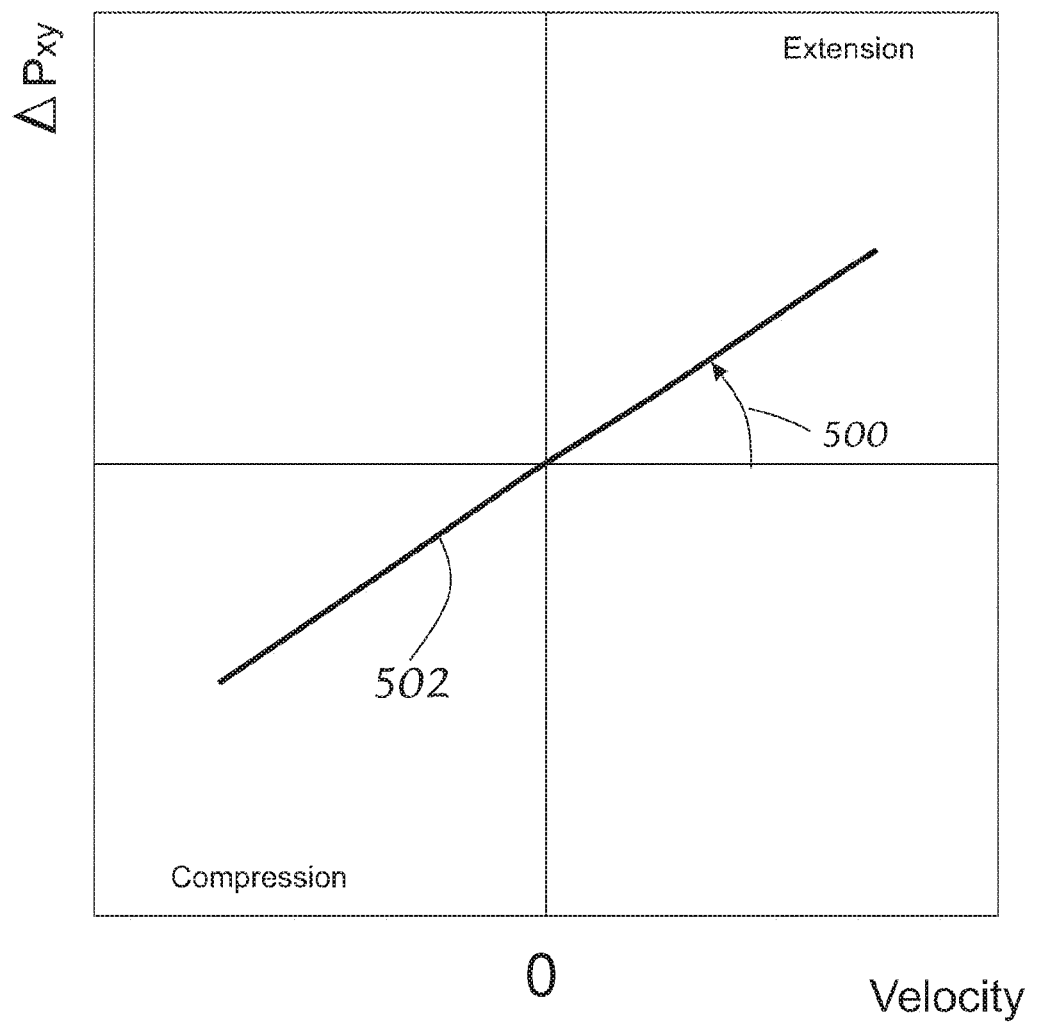
FIG. 5 shows the relationship between pressure drop and flow velocity between the two positions in the flow passage of FIG. 4.

FIG. 4 illustrates an active suspension actuator system 400, similar to the embodiment of FIG. 2 but including an added flow control device 402 in flow passage 224. The flow control device 402 in the embodiment of FIG. 4 includes a damping element 402a which may include, for example, an orifice or a conduit that induces viscous damping. It should be noted that the damping effect of flow control device 402 is cumulative with any inherent damping present in flow passage 224. FIG. 5 illustrates the relationship between the pressure drop, $\Delta Pxy$, between position 232 and 234 in flow passage 224, as a function of flow velocity in passage 224. The increased slope angle 500 of curve 502, as compared to slope of curve 300, reflects the increased impedance and damping due to damping element 402a. It is noted that in the embodiment of FIG. 4, the flow velocity in flow passage 224, may be directly proportional or effectively directly proportional to the velocity of piston 206 under at least some operating conditions. However, the relation between flow and pressure drop in some embodiment may be nonlinear and the disclosure is not so limited.

However, the Inventors have recognized that damping levels sufficient to effectively dissipate oscillations may excessively restrict flow under other operating conditions such as high flow rates. This may result in, for example, an undesirable increase in pressure in the compression volume and/or the extension volume. Furthermore, such damping may lead to inefficiencies during active operation. For example, when the active suspension actuator system is operating to apply an active force to the sprung mass, it may be desirable to rapidly pump fluid from one side of the piston to the other (e.g., from the extension chamber to the compression chamber, or vice versa). The damping force provided by the damping element 402a may resist this rapid transport of fluid. In turn, additional work may be required to overcome the damping force provided by the damping element, leading to a loss in efficiency of the active suspension actuator system during active operation.

Figure 6:
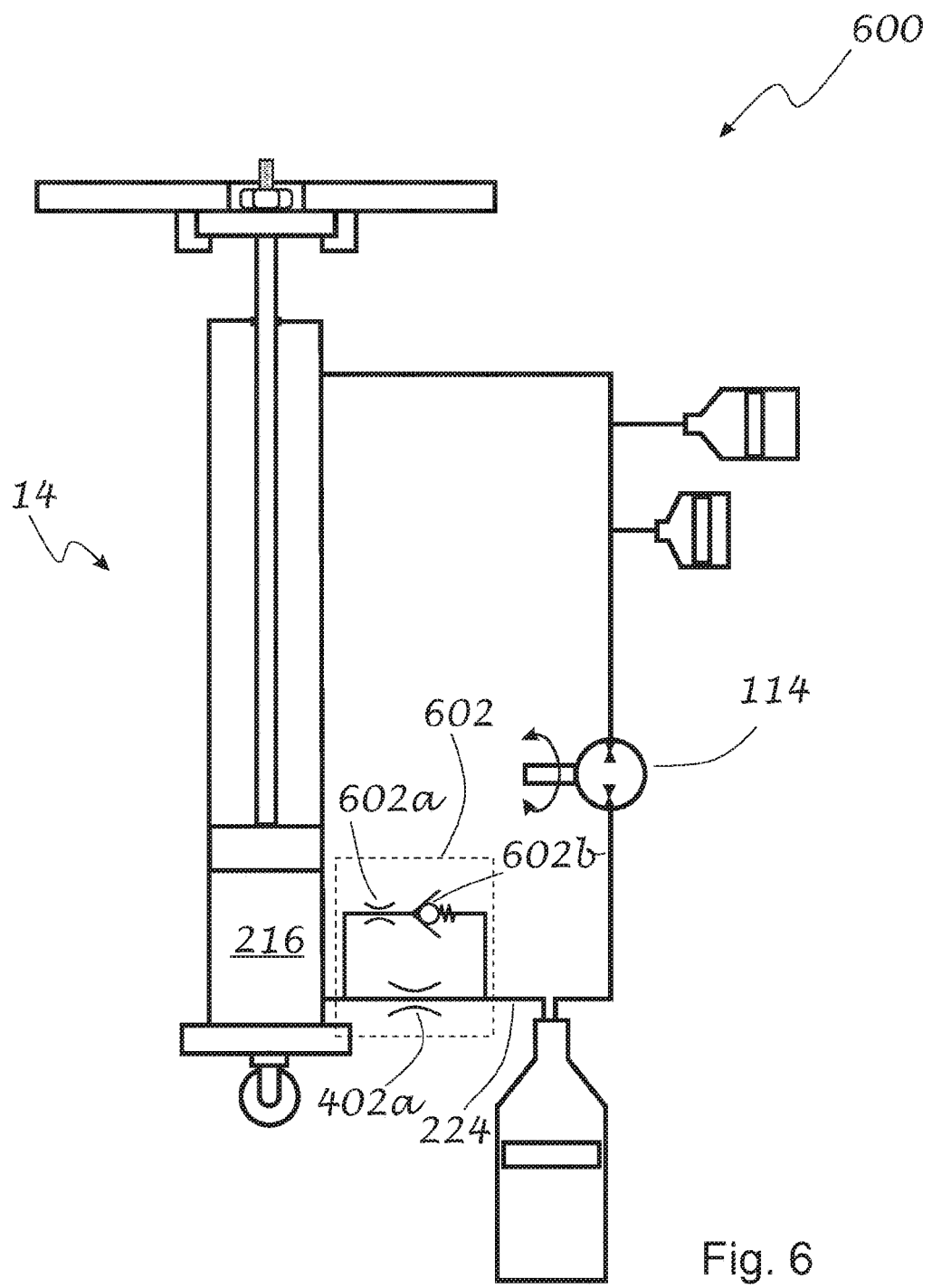
FIG. 6 illustrates the embodiment of a vehicular active suspension actuator system that includes another embodiment of a flow control device located in the flow passage fluidly connected to the compression volume.

FIG. 6 illustrates an active suspension actuator system 600 similar to the embodiment of FIG. 2 but including a flow control device 602 in flow passage 224. This flow control device, in addition to damping element 402a, may include a biased blow-off valve 602b which may be, for example, a spring-loaded check valve. In some embodiments, when the $\Delta Pxy$ between positions 232 and 234 reaches a threshold value, valve 602b may open to permit some of the flow in flow passage 224 to bypass the damping element 402a.

Figure 7:
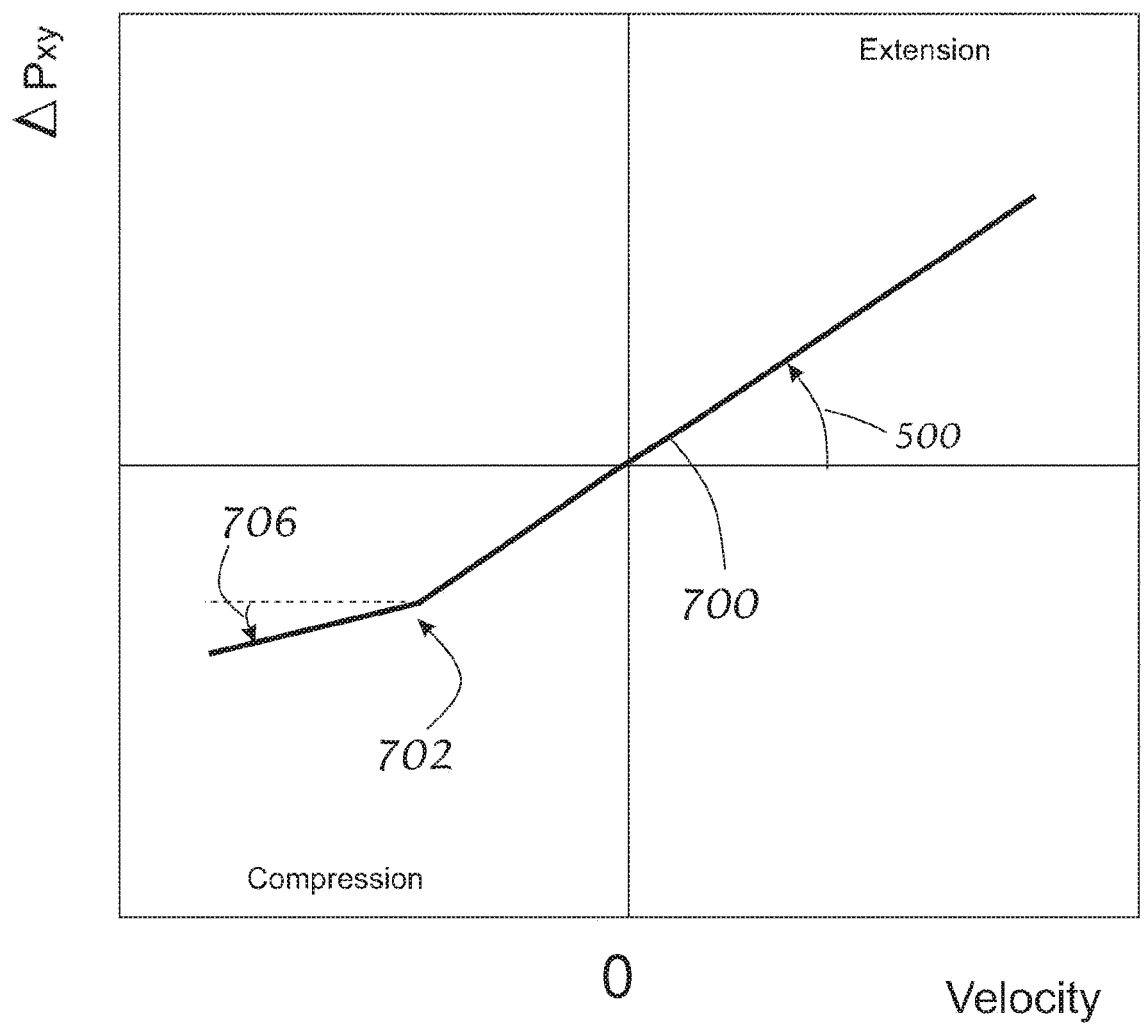
FIG. 7 shows the relationship between pressure drop and flow velocity between the two points in the flow passage of FIG. 6.

FIG. 7 illustrates the relationship between the pressure drop $\Delta Pxy$, between position 232 and 234 in flow passage 224, as a function of flow velocity in passage 224. Before the valve 602b opens at point 702 in graph 700, the relationship between $\Delta Pxy$ and flow velocity may be the same as the relationship illustrated in FIG. 5 (i.e. slope 500). But when the pressure drop on compression exceeds a threshold value of $\Delta Pxy_b$, valve 602b opens and the impedance between positions 232 and 234 drops. Once the valve 602b opens, the overall impedance of the flow control device 602 is represented by slope angle 706. In the embodiment in FIG. 6, the impedance of the flow control device 602 may be determined as the parallel combination of the branch that includes the damping element 402a and the impedance (represented by the impedance 602a) of the branch that includes the blow-off valve 602b. It should be noted that in some embodiments, elements 602a and 602b may be combined into a single device. Alternatively, in some embodiments, elements 602a, 602b, and 402a may be combined into a single device. It should be noted that the impedance of damping element 402a in FIG. 5 and FIG. 7 is shown to be independent of the direction of the flow, i.e. the slope of line 502 is the same in compression and extension. In some embodiments, the impedance of the flow in one direction (e.g. during compression) may be greater or less than the flow in the opposite direction (e.g. during extension).

As illustrated in FIG. 7, in the embodiment of FIG. 6, the pressure drop between positions 232 and 234 continues to grow with increasing flow into the compression volume 216. In some embodiments, this may be undesirable during, for example, active operation. For example, when the hydraulic machine 114 is operated as a pump to force fluid into the compression volume 216, for example, to actively extend actuator 14, all of the flow entering the compression volume 216 may flow through the damping element 402a. This may be inefficient because excess energy would need to be expended to overcome the impedance of damping element 402a under high flow conditions.

Figure 8:
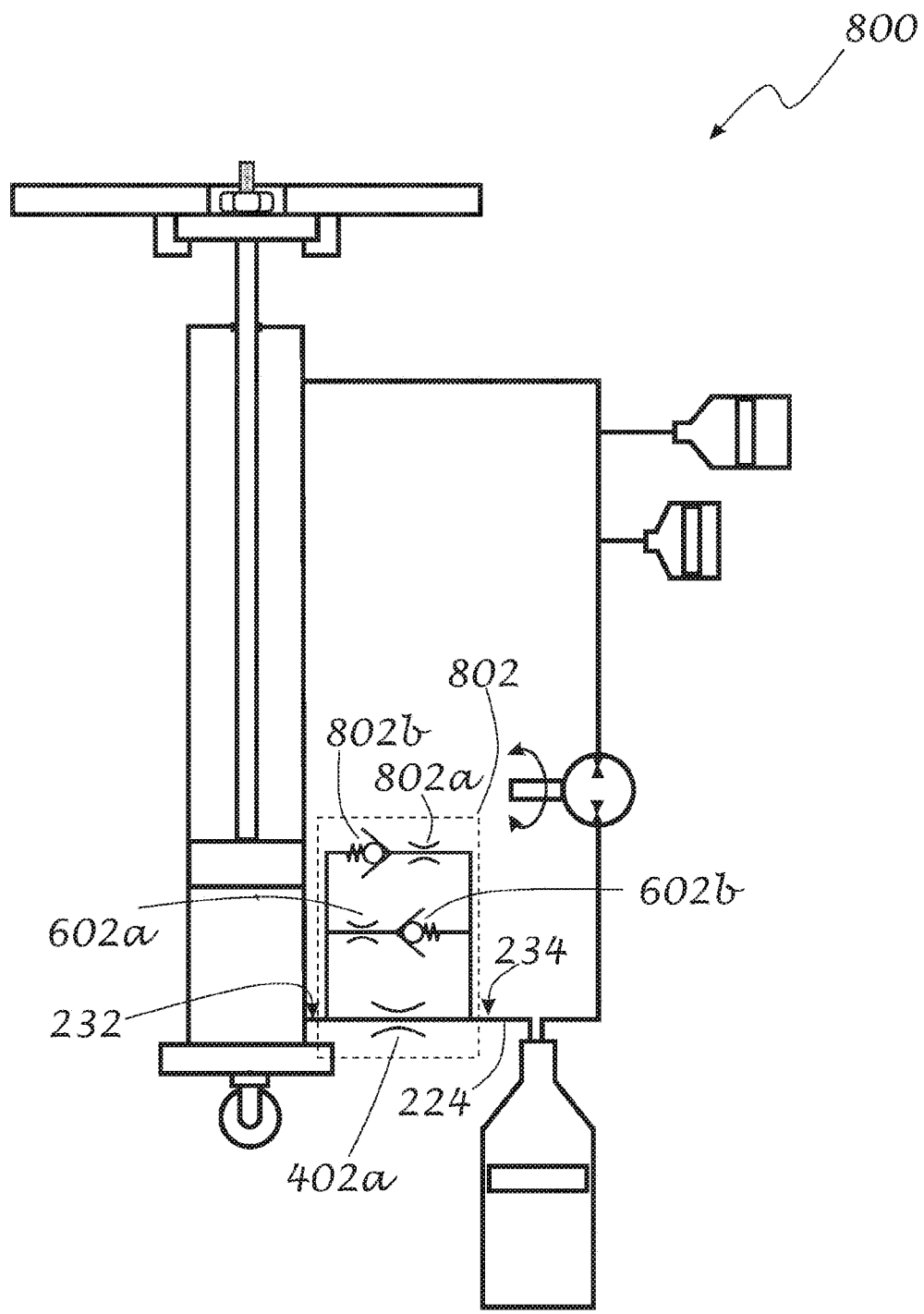
FIG. 8 illustrates an embodiment of a vehicular active suspension actuator system that includes another embodiment of a flow control device located in the flow passage fluidly connected to the compression volume.

FIG. 8 illustrates an active suspension actuator system 800 that includes flow control device 802. Flow control device 802 includes damping element 402a, blow-off valve 602b and impedance 602a, and blow-off valve 802b and impedance 802a. This arrangement may allow damped flow through damping element 402a in both directions, but also the ability to bypass the damping element 402a in either direction, with at least a portion of the flow, when the pressure drop across the damping element 402a exceeds a preset threshold level in a given direction. In some embodiments, the cracking pressure of valve 802b may be different than the cracking pressure of valve 602b. In other embodiments, these cracking pressures may be equal or effectively equal. Similarly, in some embodiments, impedance elements 602a and 802, that are fluidly in series with the blow-off valves, may provide the same or different resistances to flow.

Figure 9:
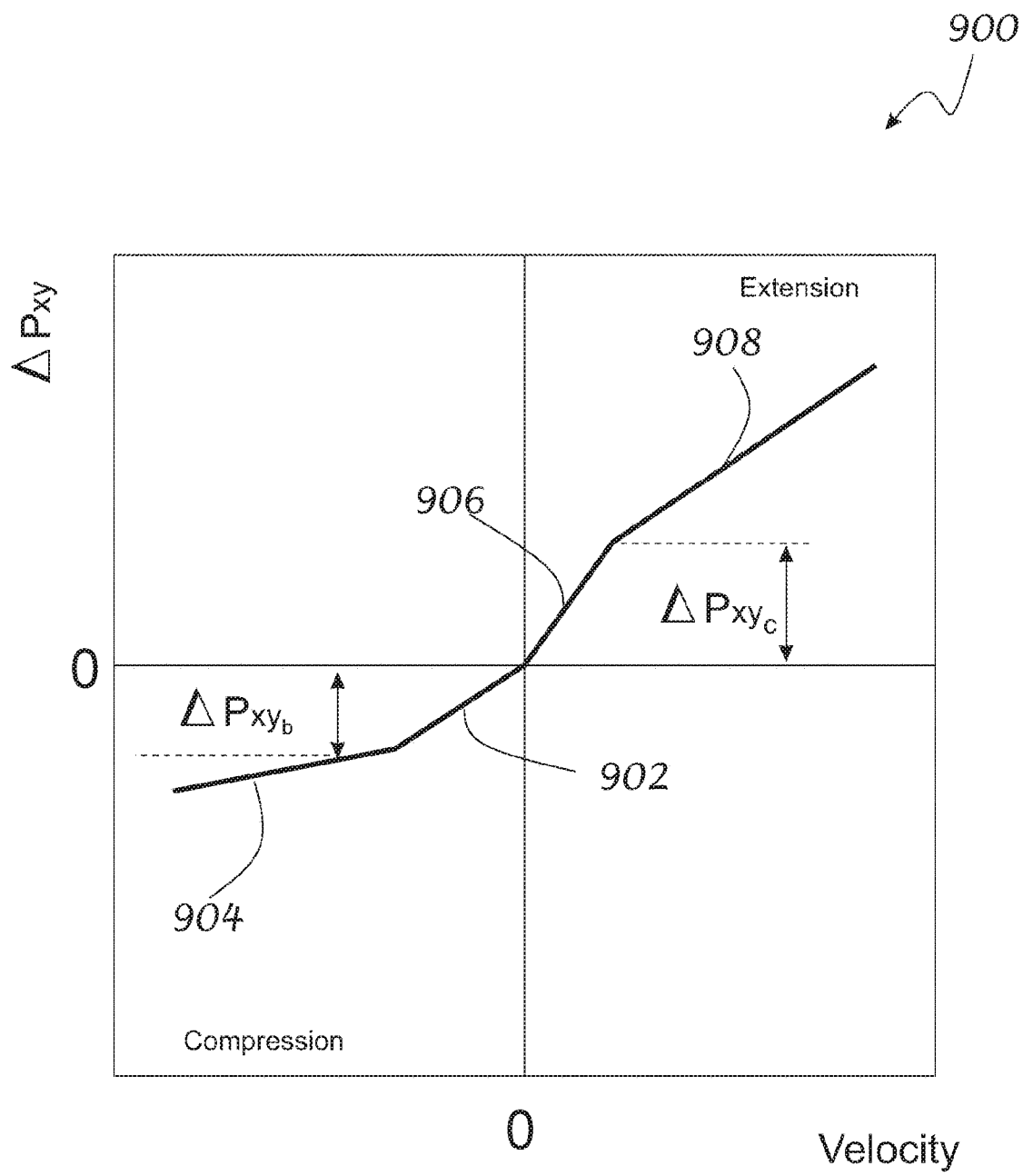
FIG. 9 shows the relationship between pressure drop and flow velocity between the two positions in the flow passage of FIG. 8.

FIG. 9 illustrates graph 60 which illustrates the relationship between $\Delta Pxy$ and flow velocity into and out of the compression volume during compression or extension of the actuator. Both operating conditions when flow is leaving the compression volume (i.e. the actuator is undergoing compression), and when flow is entering the compression volume (i.e. the actuator is in extension) are shown. During compression, the slope of segment 902 represents the impedance of the damping element 402a when both valves 602b and 802b are closed. The slope of segment 904 represents the impedance of the flow control device 802 during compression when fluid is flowing out of the compression volume, the pressure differential has surpassed threshold $\Delta Pxy_b$, and valve 602b has opened.

The slope of segment 906, which in some embodiments may be different than the slope of segment 902, represents the impedance of damping element 402a when fluid is flowing into the compression volume 216. The slope of segment 908 represents the overall impedance of flow control device 802 when fluid is flowing into the compression volume 216, the pressure differential has exceeded threshold $\Delta Pxy_c$, valve 802b is open, and valve 602b is closed. In FIG. 9, the relationships between $\Delta Pxy$ and velocity in four operating modes are represented by linear or effectively linear segments 902, 904, 906, and 908. In some embodiments, one or more of these relationships may be non-linear and the disclosure is not so limited.

It should be noted that in some embodiments the damping element 402a may be a single component such as, for example, an orifice or other restriction that occupies a limited portion of flow passage 224. In certain other embodiments the damping element 402a may include one or more components that are localized in a small section of flow passage 224 and/or distributed along some or the entire length of the flow passage 224.

Figure 10:
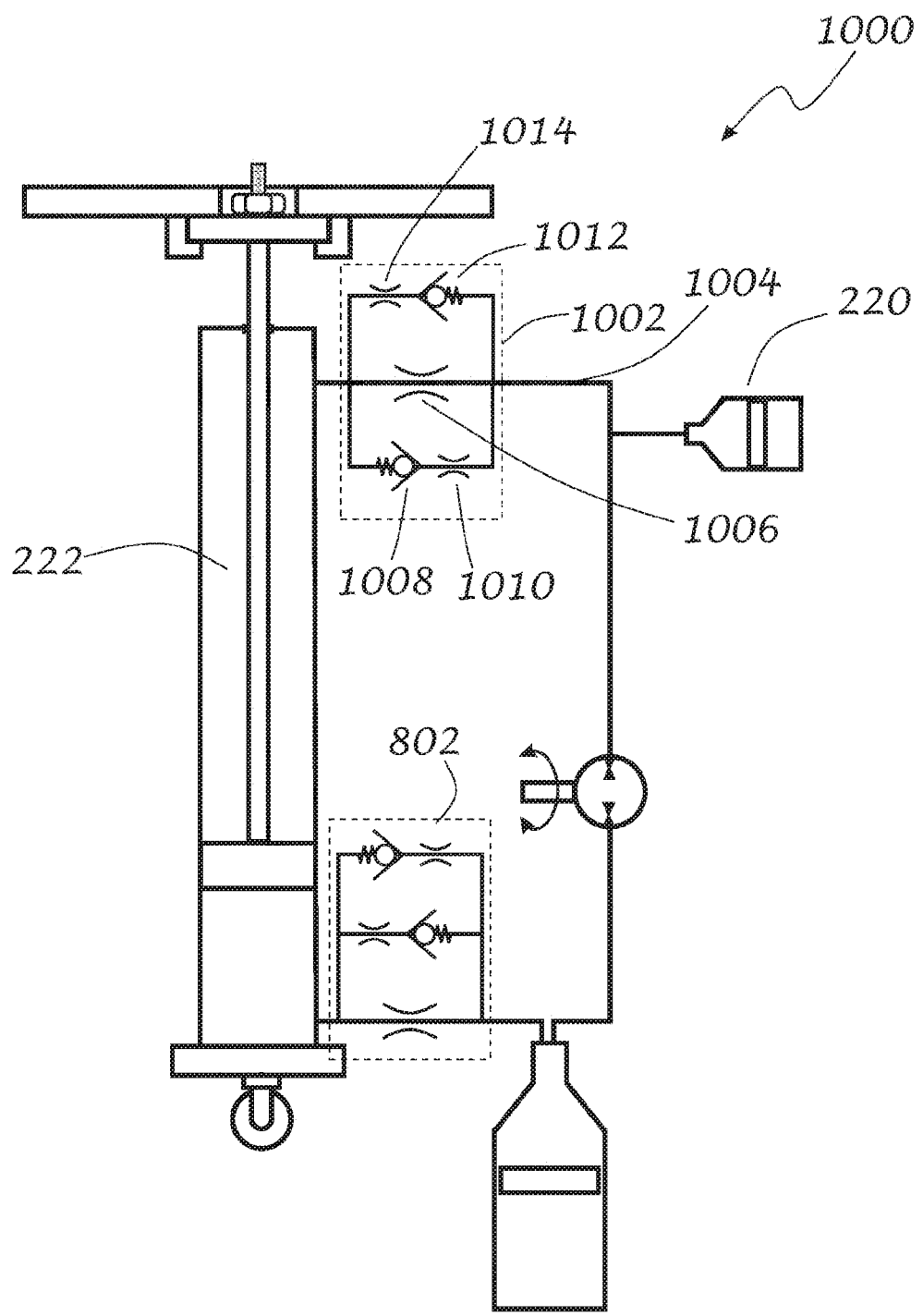
FIG. 10 illustrates an embodiment of a vehicular active suspension actuator system that includes an embodiment of a flow control device fluidly interposed in a flow passage of FIG. 2 that is fluidly connected to the extension volume.

FIG. 10 illustrates an active suspension actuator system 1000 that includes flow control device 1002 operatively interposed in flow passage 1004 between the compliance element 220 and the extension volume 222. Flow control device 1002 may be incorporated in addition to or instead of flow control device 802. This flow control device may include damping element 1006, blow-off valve 1008 and impedance 1010, and blow-off valve 1012 and impedance 1014. This arrangement may allow damped flow in both directions, but also the ability to bypass the damping element 1006 in either direction when the pressure drop across the damping element 1006 in a given direction exceeds a preset threshold level in that direction. In some embodiments, the cracking pressure of valve 1008 may be different than the cracking pressure of valve 1012. In other embodiments, these cracking pressures may be equal or effectively equal. Similarly, in some embodiments, the impedance elements 1006 and 1014 may provide effectively the same or different resistance to flow.

The flow control device 1002 damps fluid flowing in both directions with damping element 1006. The damping rate may be reduced when the flow rate leaving the extension volume 222 increases to a point where the pressure drop across flow control device 1002 exceeds a preset threshold value. Under such operating conditions, valve 1012 may open and allow at least some of the flow leaving the extension volume 222 to bypass damping element 1006 thus reducing the overall impedance of the flow control device 1002. In some embodiments, the flow control device 1002 may also include a second bypass valve 1008. This arrangement may allow damped flow in both directions, but also the ability to bypass the damping element 1006 in either direction when the pressure drop across the damping element 1006 in a given direction exceeds a preset threshold level in that direction.

It is noted that, in some embodiments, the impedance of one or more damping elements may be the same in both flow directions while in other embodiments, the impedance of one or more damping elements may depend on the direction of flow. In some embodiments, one or more flow control devices may be used to limit the maximum pressure in the compression volume and/or the extension volume by providing a flow path between these volumes that bypasses the hydraulic machine in the system.

Figure 11:
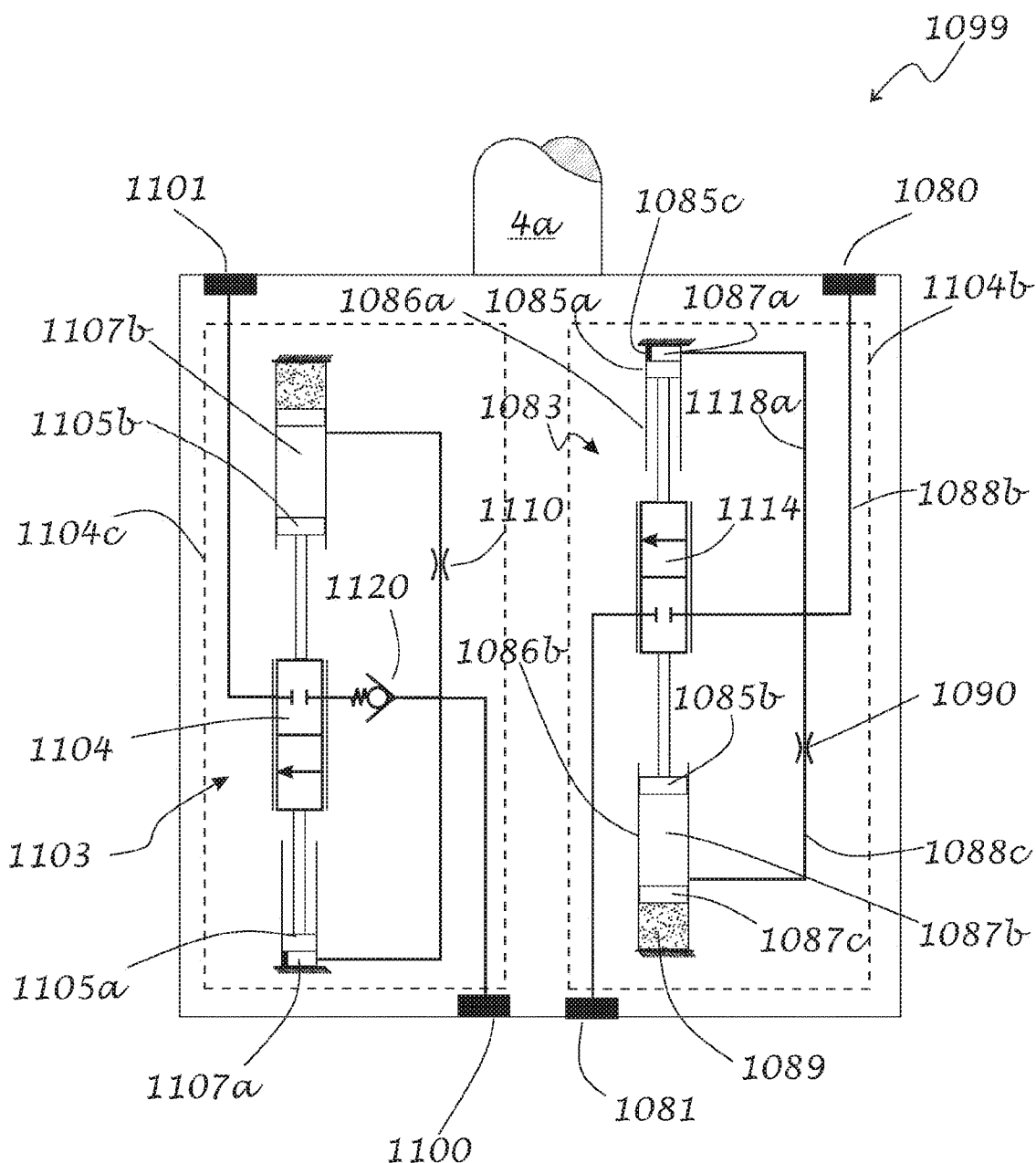
FIG. 11 illustrates an embodiment of a pressure balanced blow off valve with a preset absolute pressure offset.

FIG. 11 illustrates an exemplary embodiment of actuator piston 1099 attached to piston rod 4a that includes a flow control device 1104b and a flow control device 1104c. Flow control device 1104b may include an inlet port 1080 and outlet port 1081 and pressure balance blow-off valve (PBOV) 1083. The inlet port 1080 of PBOV 1083 is exposed to the pressure of the fluid in the extension volume (not shown) and the outlet port 1081 is exposed to the pressure of the fluid in the compression volume (not shown).

The PBOV 1083 includes a two-position valve 1114 that is actuated by the force differential between the force applied by piston 1085a that is slidably received in cylinder 1086a and the force applied by piston 1085b that is slidably received in cylinder 1086b.

In the embodiment of FIG. 11, piston 1085b has a larger diameter than piston 1085a. When the pressure in volume 1087b is equal to the pressure in volume 1087a, the resulting force imbalance on the two-position valve 1084 keeps the valve 1104 in the closed position. In some embodiments, PBOV 1083 may also include a travel stop 1085c that limits the travel of piston 1085a in cylinder 1086a.

Flow passages 1118a and 1088b fluidly connect the volume 1087a to the inlet port 1080. Flow passages 1088c and 1088b fluidly connect volume 1087b to inlet port 1080. The pressure in gas volume 1089 biases the PBOV 1083 in the closed position. The gas volume 1109 is separated from the liquid in volume 1087b by floating piston 1087c. In some embodiments, additionally or alternatively, the bias force provided by the gas volume 1109 may be provided by a coil spring (not shown) or other spring element.

In some embodiments, pistons 1085*a* and 1085*b* may be of equal diameter. Flow passage 1088*c* may also include a hydraulic an impedance element 1090 that in conjunction with the compliance of volume 1087*b* may form a low pass hydraulic filter that blocks or effectively block high frequency changes in pressure at the inlet port 1080 from reaching volume 1087*b*. In some embodiments, the hydraulic impedance 1090 may be tuned to block, or effectively block, frequencies above a threshold value. In some embodiments, the threshold frequency may be preselected to be in the range of 12-15 Hz. Alternatively, in some embodiments, the threshold frequency may be preselected to be in the range of 10-20 Hz. The threshold frequency may be selected to be in other frequency ranges as the disclosure is not limited in this respect. During operation, in some embodiments, if the rate of pressure increase in the extension volume and/or at inlet port 1080 is above a predetermined threshold value, the pressure in volume 1087*a* may increase more rapidly than the pressure in volume 1087*b* due to hydraulic filter formed by impedance 1090. If the rate of pressure rise continues for a sufficient period, then the force bias on the PBOV 1083 due to the gas pressure in volume 1089 and/or the piston size differential of the two-position valve may be overcome and the two-position valve may move to its open position. As a result, fluid flow may then be established between the inlet port 1080 and the outlet port 1081. The operation of the PBOV 1083 then acts to mitigate the effect of the rapid increase in the pressure in the extension volume (above a certain rate of increase) while allowing the more gradual rate of pressure build-up that may result from, for example, the operation of the hydraulic machine to be effectively applied to the piston 1100. When the rate of pressure increase is slow, whether caused by the hydraulic machine or road disturbance, the pressures in volume 1087*a* and 1087*b* effectively track each other. Because piston 1085*b* is larger, the PBOV 1083 may remain in a closed position under such an operating condition.

In some embodiments, piston 1100 may also include an additional flow control device 1104*c*. Flow control device 1104*c* may include an inlet port 1100 and outlet port 1101 and pressure balanced blow-off valve (PBOV) 1103. The inlet port 1100 is exposed to the pressure of the fluid in the compression volume (not shown) and the outlet port 1101 is exposed to the pressure of the fluid in the extension volume (not shown). The PBOV 1103 may include a two-position valve 1104 that is actuated by the force differential between the force applied by piston 1105*a* and the force applied by piston 1105*b*. As in the case of PBOV 1083, the low pass filter formed by using 1110 may be tuned to block, or effectively block, frequencies above a threshold value. In some embodiments, the threshold frequency may be preselected to be in the range of 12-15 Hz. Alternatively, in some embodiments, the threshold frequency may be preselected to be in the range of 10-20 Hz. The threshold frequency may be selected to be in other frequency ranges as the disclosure is not so limited. During operation, in some embodiments, if the rate of change of pressure increase in the compression volume is above a predetermined threshold value, the pressure in volume 1107*a* may increase more rapidly than the pressure in volume 1107*b*. If the rate of pressure rise continues for a sufficient period, then the force bias on the PBOV 1103 may be overcome and the two-position valve may move, fully or partially, to its open position and flow may be established between the inlet port 1100 and the outlet port 1101. The operation of the PBOV 1103 dissipates the effect of the rapid increase in the pressure in the compression volume (above a certain rate of increase) while allowing the more gradual buildup of pressure that may result from, for example, the operation of the hydraulic machine.

In some embodiments, the flow control device 1104*c* may also include a biased valve, such as for example, a spring biased check valve 1120. Check valve 1120 may effectively prevent flow between the inlet port 1100 and outlet port 1101 even when PBOV 1103 is in a partially or fully open position. Accordingly, flow between the inlet port 1100 and the outlet port 1101 may be prevented or effectively prevented unless both biased check valve 1120 and the two-position valve 1104 are at least partially open.

Accordingly, flow control device 1104*c* may be used to prevent or mitigate rapid rise in pressure of the compression volume when the pressure of the compression volume is above a preset pressure threshold established by the pressure/force bias of valve 1120 while also allowing slow and/or rapid increase in pressure when compression volume pressure is below that threshold. Flow control device 1104*c* may be used to, for example, prevent or limit the rapid rise of pressure in the compression volume when the pressure is above a threshold value while allowing rapid pressure rise, for example during wheel control, at frequencies in the range of 10-15 Hz, when the pressure is below the threshold value. Accordingly, the pressure in the compression volume may increase at a given rate without triggering the PBOV when the total pressure is below a threshold value. Alternatively, when the pressure in the compression volume is above the threshold pressure, valve 1220 may open, in which case the PBOV would be trigger if there is a rapid pressure increase.

Figure 12:
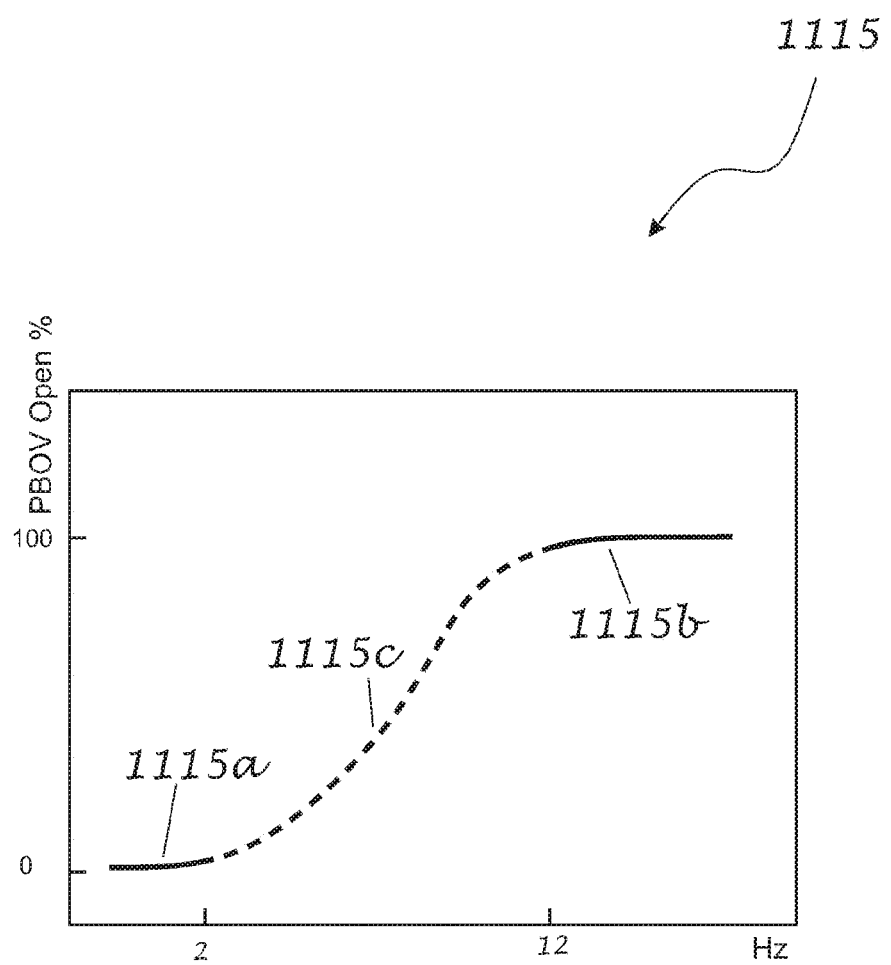
FIG. 12 a graph showing the relationship between the degree of opening of a pressure balanced blow-off valve illustrated in FIG. 11 as a function of the frequency of pressure oscillations to which the inlet of the pressure balanced blow-off valve is exposed.

FIG. 12 shows graph 1115 that illustrates an example of the PBOV 1103, of the embodiment of the flow control device in FIG. 11, may operate when valve 1120 is open or effectively open. At low frequencies, PBOV 1103 may remain closed or effectively closed, as shown by line 1115*a*, regardless of the pressure at inlet port 1100. The PBOV 1103 may be tuned by, for example, selecting the appropriate low pass hydraulic filter formed by using 1110. In some embodiments, a PBOV may open when inlet port 1100 is exposed to a pressure oscillation of approximately 12 Hz for a sufficient duration (line 1115*b*). The transition (curve 1115*c*) from curve 1115*a* to 1115*b* depends on, for example, the design parameters of the hydraulic filter and the size of pistons 1105*a* and 1105*b*.

In some embodiments, the bias on check valve 1120 may be an absolute bias so that it may be activated by, for example, the total pressure at inlet port 1100. For example, if the force bias on valve 1120 is tuned so that the valve 1120 opens at a total pressure of 50 psi, then the valve 1120 would open regardless of how that pressure is reached. In the above example, if the pressure of the compression volume is 40 psi, valve 1120 would open if there is an additional pressure increase of 10 psi due to, for example, a road disturbance. However, if the same road disturbance were to occur when the pressure in the compression chamber was, for example, 20 psi, the valve 1120 would remain closed. The PBOV 1103 in the flow control device 1104*c* of the embodiment in FIG. 13 is an absolute bias PBOV because flow between ports 1100 and 1101 may occur when the pressure at port 1100 is sufficient to overcome the bias of valve 1120.

Figure 13:
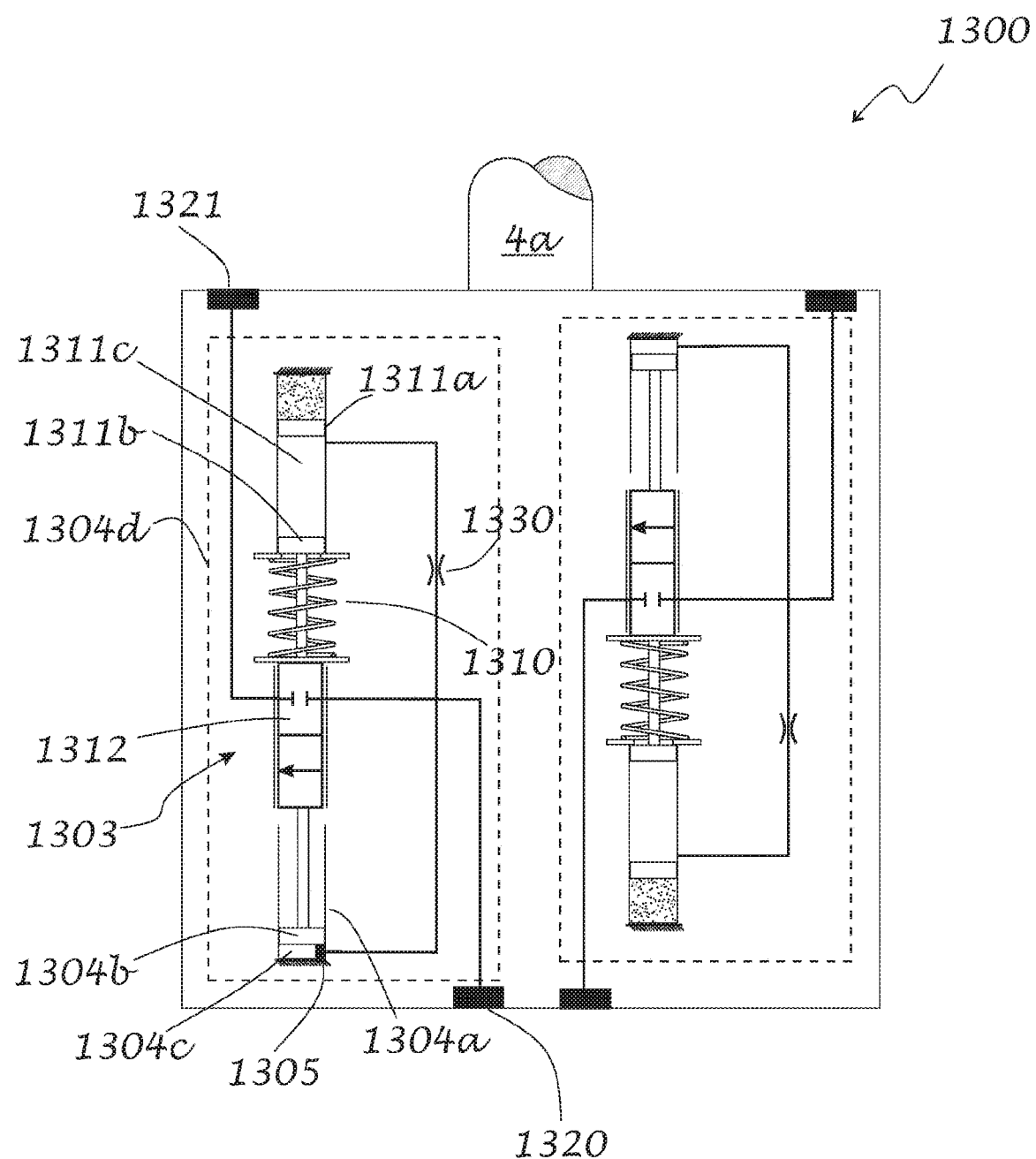
FIG. 13 illustrates another embodiment of a pressure balanced blow off valve with a preset relative pressure offset.

FIG. 13 illustrates a piston 1300 with a flow control device 1304*d* with a relative bias PBOV 1303. In the embodiment of FIG. 13, cylinder 1304*a* includes a travel stop 1305 that prevents piston 1304*b* from traveling beyond a preset point in cylinder 1304*a*. Spring element 1310 (e.g.

a coil spring), that is anchored to cylinder 1311a applies a bias closing force on the two-position valve 1312. The two-position valve 1312 is configured to remain in the closed position until the net force on pistons 1311b and 1304b exceeds the bias force applied by spring element 1310. In the configuration of FIG. 13, piston 1304b and 1311b effectively have the same diameter and the PBOV 1303 is therefore insensitive to slowly changing pressures at inlet port 1310. This is because pressures in both volumes 1311c and 1304c track the pressure at inlet port 1320 when the pressure at port 1320 changes slowly. The two-position valve 1312 in FIG. 13 may be triggered when a rapidly changing pressure rise (e.g. greater than 10 Hz, 12 Hz, or greater than 12 Hz but less than 1000 Hz), is blocked or effectively blocked by the filter, formed by using impedance 1330 in conjunction with the compliance of volume 1311c, from reaching volume 1311c, but reaches cylinder 1304c. The increased pressure in 1304c may create a force imbalance that overcomes the bias imposed by spring element 1310. The two-position valve 1312 of the embodiment in FIG. 13 is remains effectively closed when the same pressure reaches both cylinders in the PBOV 1303. PBOV 1303 is a relative biased device because the flow between port inlet port 1320 and outlet port 1321 depends on the differential pressure between the cylinders 1304c and 1311c and independent of the absolute pressures at the ports.

The valves in flow control devices illustrated in FIGS. 6, 8, 10, 11 and 13 are shown as passive or pressure actuated valves. Alternatively or additionally, in some embodiments electrically activated valves may be used in one or more such bypass flow control devices. Such electrically controlled valves may be activated based on data from various sensors, such as for example, pressure sensors that sense the pressure in the compression and/or extension volumes. Alternatively, such electrically controlled valves may be activated based on information from, for example, accelerometers that are configured to measure the acceleration of the unsprung mass. Such acceleration may be the relative acceleration between the sprung mass and the unsprung mass.

Figure 14:
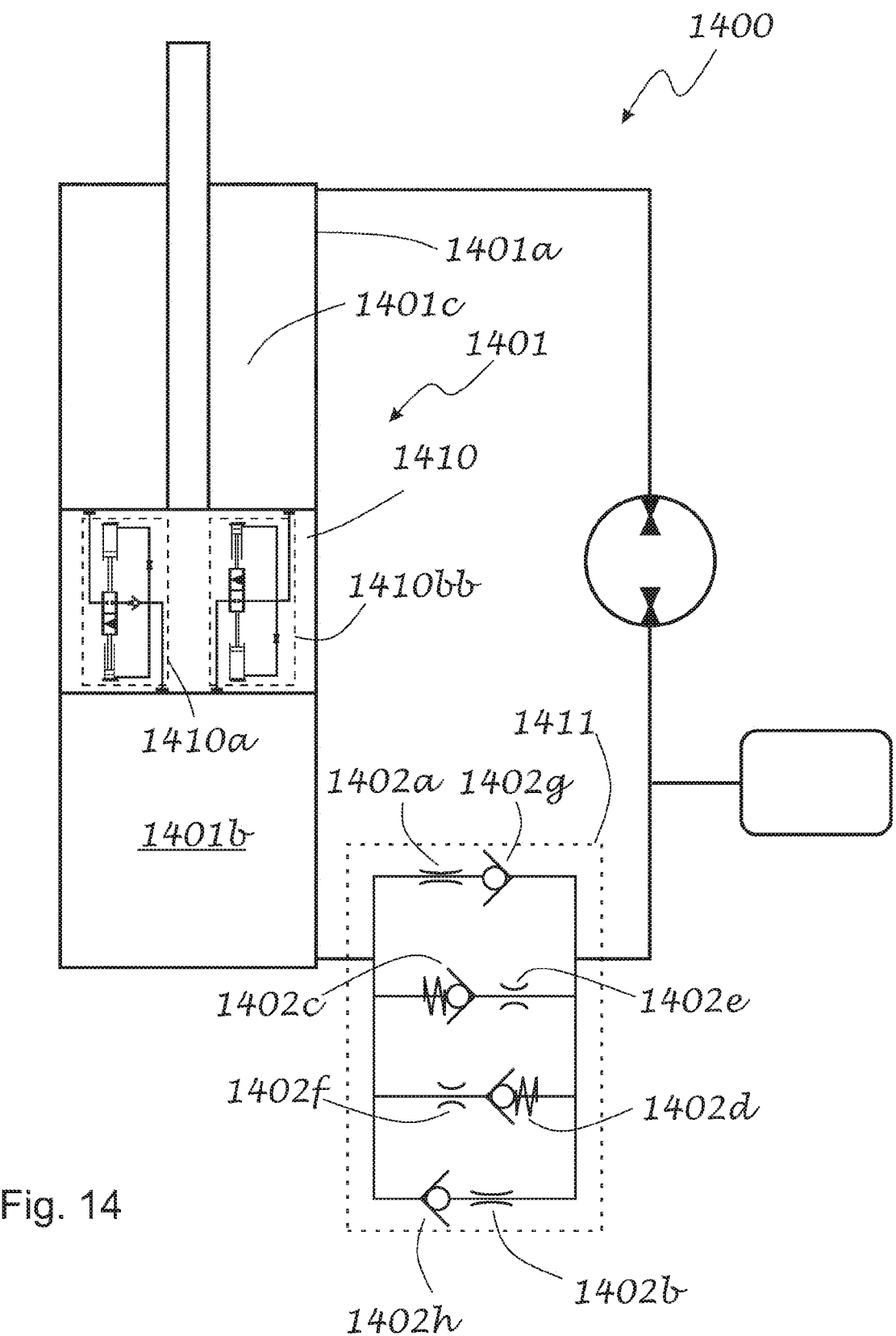
FIG. 14 illustrates a further embodiment of a vehicular active suspension actuator system with multiple flow control devices.

In the embodiment of FIG. 1, one or more of the flow control devices 4b, 4c, 16, 17, 23 and 24 may be tuned by selecting appropriate parameters. FIG. 14 illustrates an example of a special case of the embodiment of FIG. 1. Active suspension actuator system 1400 includes actuator 1401 with pressure tube 1401a. The pressure tube includes an internal volume that is divided into a compression volume 1401b and extension volume 1401c by piston 1410. Piston 1410 includes flow control devices 1410a and 1410b. In the exemplary embodiment illustrated in FIG. 14, the overall damping coefficient of flow control device 1411 may be selected to appropriately damp oscillation that may result at any given operating condition. The low flow velocity damping coefficient of outward flowing (from the compression volume) damping element 1402b may be the same as or different than the damping coefficient of the inward flowing (to the compression volume 1401b) damping element 1402a.

The cracking pressure of valves 1402c and 1402d and their associated impedances represented as 1402e and 1402f, respectively, may be selected to trim the amount of pressure drop and damping at higher flow velocities passing through flow control device 1411. The check valves 1402g and 1402h allow different damping coefficients to be used for the flow to and from the compression volume at low flow rates. The hydraulic low pass filter and the force bias of the PBOVs (i.e. flow control devices 1410a and 1410b) may be selected to determine at what frequencies and pressure levels the PBOVs 1410a and 1410b may activate.

By appropriately selecting such parameters, the active suspension actuator systems of, for example, the embodiments illustrated FIG. 1, FIG. 6, FIG. 8, and FIG. 14, may operate to:

(1) control flow between the actuator (i.e. the compression volume and/or the extension volume) and a compliance element with a first flow control device,
(2) damping fluid flow velocity oscillations in the first flow control device, induced, for example, by low velocity wheel events, at a first level for flow velocities below a threshold magnitude,
(3) reduce the level of damping for flow velocities that are greater than the threshold magnitude,
(4) produce a pressure differential across the piston of the actuator by using the hydraulic machine as a pump, and
(5) at least partially discharge the pressure differential across the piston by using a second flow control device that bypasses the hydraulic machine and that is activated when the rate of increase pressure differential across the piston is greater that a preset threshold value.

Figure 15:
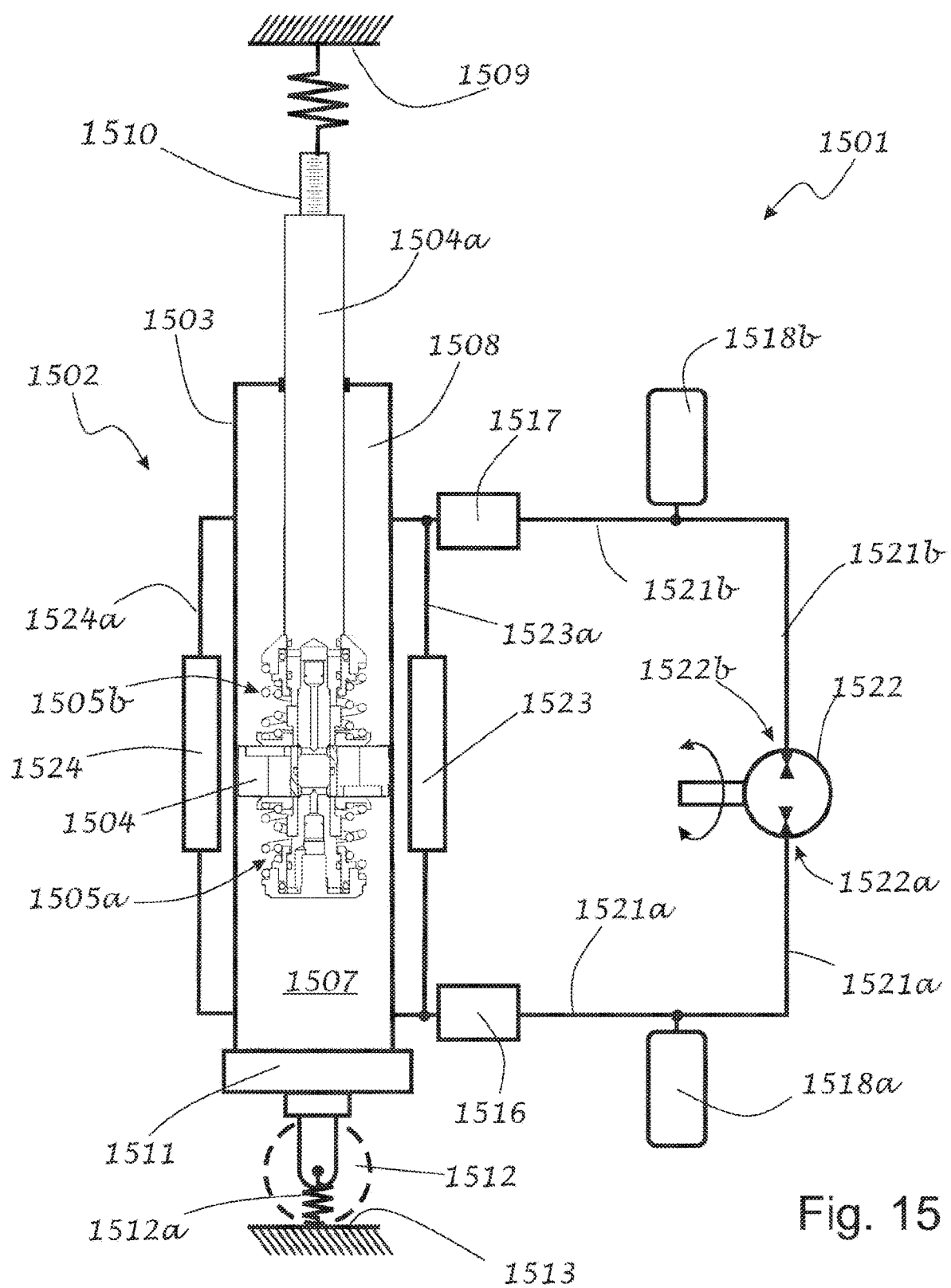
FIG. 15 illustrates an embodiment of a vehicular active suspension actuator system with multiple flow control devices.

FIG. 15 illustrates an active suspension actuator system 1501 of a vehicle. Actuator 1502, of the system, may be operatively interposed between an unsprung mass 1511 of the vehicle (e.g., wheel assembly) and a sprung mass 1509 of the vehicle (e.g., vehicle body). Actuator 1502 includes a pressure tube 1503 that slidably receives piston 1504 in an internal cylindrical volume. In some embodiments, such as the embodiment of FIG. 15, the pressure tube 1503 may also serve as a housing of the actuator 1502. In other embodiments, the housing may include an outer tube that, at least partially, surrounds the pressure tube.

In the embodiment illustrated in FIG. 15, piston 1504, which includes two pressure balanced blow-off valves (PBOVs), divides the internal cylindrical volume of the pressure tube 1503 of actuator 1502 into a compression volume 1507 and an extension volume 1508. In the embodiment of FIG. 15, the piston 1504 is attached to the sprung mass 1509 by an intervening piston rod 1504a and top mount 1510. In some embodiments, the top mount may effectively be a spring element and is illustrated as a spring element in FIG. 15. In some embodiments the top mount may include damping element in parallel or in series with the spring element.

In the embodiment of FIG. 15, the pressure tube 1503 is attached to the unsprung mass 1511 (e.g. wheel assembly), which includes a tire 1512 (shown in dashed line). Tire 1512 that travels along a road surface 1513 effectively performs as a spring and is represented as spring element 1512a. The embodiment illustrated in FIG. 15 includes a hydraulic machine 1522 that includes a first port 1522a and a second port 1522b. Flow passage 1521a fluidly connects port 1522a to the compression volume 1507 and flow passage 1521b fluidly connects port 1522b to the extension volume 1508. The actuator system 1501 may include one or more accumulators, such as for example, accumulator 1518a that is fluidly connected to flow passage 1521a by a branch flow passage, and/or accumulator 1518b that is fluidly connected to flow passage 1521b by another branch flow passage. Other types of accumulators, such as flow-through accumulators may be used, as the disclosure is not so limited. The accumulators may function as fluid (e.g. hydraulic fluid or other liquid) storage elements and/or compliance or spring elements.

In the embodiment illustrated in FIG. 15, the net force applied on the sprung mass 1509 by the actuator system 1501 is equal to the net force applied to the piston 1504 by the fluid (e.g. hydraulic fluid or other liquid) in the compression volume, in a direction that parallel to the longitudinal axis of the piston rod, minus the net force applied to the piston 1504 by the fluid (e.g. hydraulic fluid or other liquid) in the extension volume.

In some embodiments, the force applied on the sprung mass 1509 by the actuator system 1501 may be regulated by controlling the pressures in the compression volume 1507 and/or extension volume 1508. The pressure in these volumes may be influenced by road-induced disturbances that may cause the piston 1504 to move relative to the pressure tube 1503. Alternatively or additionally, in some embodiments, the pressures in the compression and/or extension volumes may be influenced by fluid flow into and/or out of those volumes. In some embodiments, flow into and out of the compression volume 1507 may be controlled by, for example, flow control device 1516 operatively positioned in flow passage 1521a and/or PBOV 1505a or 1505b.

In some embodiments, flow into and/or out of the extension volume 1508 may be controlled by flow control device 1517 operatively positioned in flow passage 1521b and/or PBOV 1505b. In some embodiments one or more such flow control devices may be omitted, additional flow control devices may be incorporated in various flow channels, and/or multiple flow control devices may be consolidated into a single flow control device. For example, in some embodiments, only a single PBOV may be attached to piston 1504. In some embodiments, the operation of one or more PBOVs, 1505a and 1505b, may be replaced by PBOVs that are located external to the pressure tube. For example, such PBOVs may be incorporated in or replace, for example, the flow control devices 1523 and 1524. The present disclosure is not limited to a particular number, positioning, or combination of flow control devices (e.g., PBOVs) such as those shown in FIG. 15.

In some embodiments, the hydraulic machine 1522 of the active suspension actuator system 1501 may be operated as a pump to apply an active force, i.e. a force in the direction of motion, on the sprung mass 1509, relative to the unsprung mass 1511, or a passive or resistive force in a direction that opposes the motion, of the sprung mass 1509, relative to the unsprung mass 1511. Alternatively or additionally, the hydraulic machine 1522 may be operated as a hydraulic motor to produce a passive or resistive force, i.e. a force opposed to the direction of motion, on the sprung mass, relative to the unsprung mass. The hydraulic machine 1522 may be a hydraulic pump that is operated as a hydraulic pump and/or a hydraulic motor. Alternatively, the hydraulic machine 1522 may be a hydraulic motor that is operated as a hydraulic motor and/or a hydraulic pump.

Figure 16:
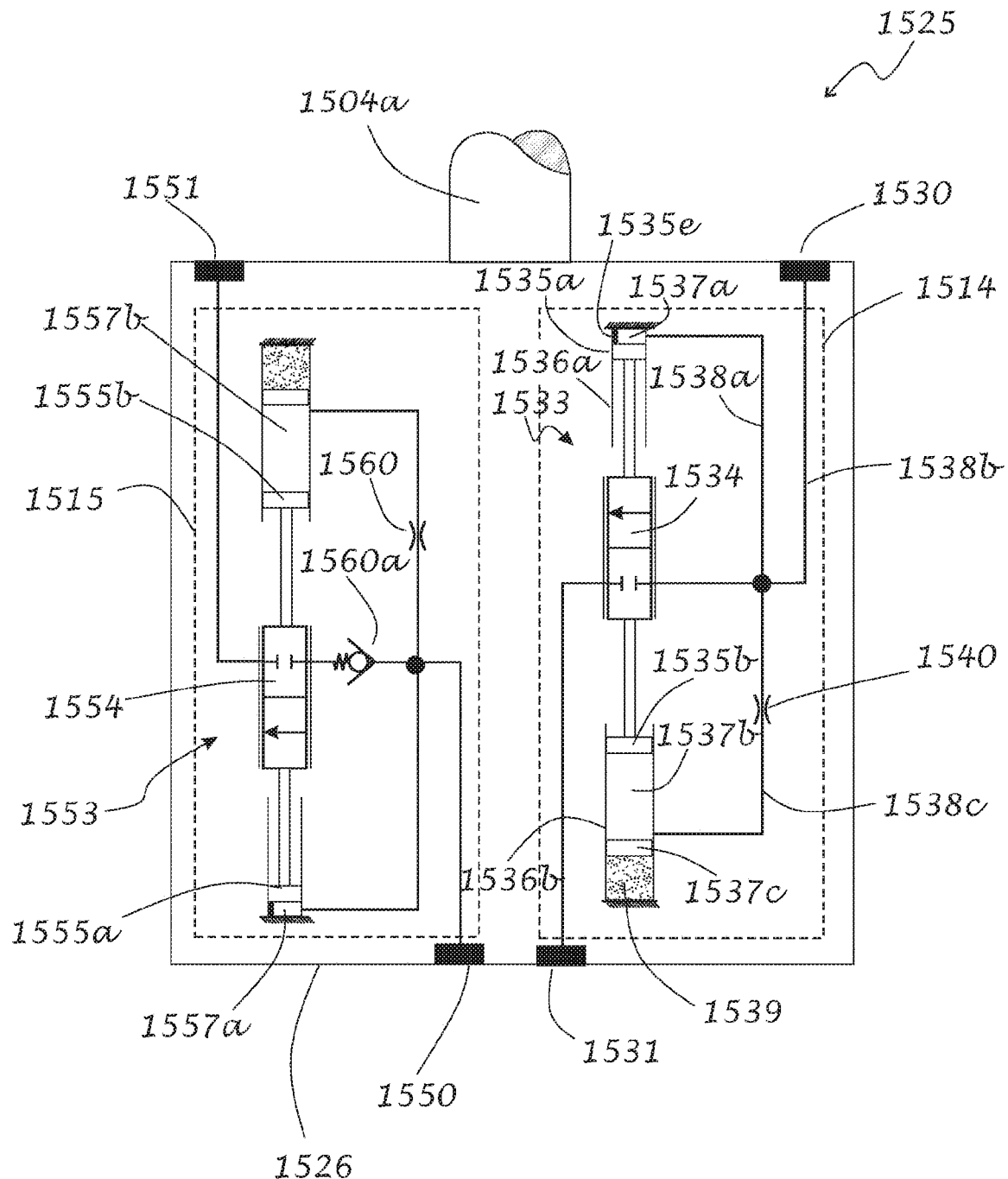
FIG. 16 illustrates a cross section view of a piston of an active suspension actuator with dual pressure balanced blow-off valves incorporated into the piston.

FIG. 16 shows an embodiment of actuator piston 1526 attached to piston rod 1504a that includes a flow control device 1514 (shown in dashed line) and flow control device 1515 (shown in dashed line). Flow control device 1514 may include an inlet port 1530 and outlet port 1531 and pressure balanced blow-off valve (PBOV) 1533. The inlet port 1530 of PBOV 1533 is exposed to the pressure of the fluid in the extension volume (not shown) and the outlet port 1531 is exposed to the pressure of the fluid in the compression volume (not shown).

The PBOV 1533 includes a valve 1534 that is actuated by the force differential between the force applied by piston 1535a that is slidably received in cylinder 1536a and the force applied by piston 1535b that is slidably received in cylinder 1536b. In some embodiments valve 1534 may be a continuously variable valve as indicated in FIG. 16. Alternatively, valve 1534 may be a two position valve with only no-flow and full-flow positions.

In the embodiment of FIG. 16, piston 1535b is larger than piston 1535a. When the pressure in volume 1537b is equal to the pressure in volume 1537a, the resulting force imbalance on the two-position valve 1534 keeps the valve in the closed position. In some embodiments, PBOV 1533 may also include a travel stop 1535e that limits the travel of piston 1535a in cylinder 1536a.

Flow passages 1538a and 1538b fluidly connect the volume 1537a to the inlet port 1530. Flow passages 1538c and 1538b fluidly connect volume 1537b to inlet port 1530. The pressure in gas volume 1539 biases the PBOV 1533 in the closed position. The gas volume 1539 is separated from the liquid in volume 1537b by floating piston 1537c. In some embodiments, additionally or alternatively, the bias force provided by the gas volume may be provided by a coil spring (not shown) or other spring element.

In some embodiments, pistons 1535a and 1535b may be of equal diameter. Flow passage 1538c may also include a hydraulic low pass filter dissipative element 1540 that may block or effectively block high frequency changes in pressure at the inlet port 1530 from reaching volume 1537b. The compliance of chamber 1537b along with the inlet restive element 1540 create a hydraulic low-pass filter that limits the rate of pressure change in chamber 1537b in reference to the pressure change experienced at inlet 1530. In some embodiments, the hydraulic low pass filter which is made up of the compliance element 1539 and the dissipative element 1540 may be tuned to block, or effectively block, pressure fluctuations at frequencies above a threshold value. In some embodiments, the threshold frequency may be preselected to be in the range of, for example 12-15 Hz or 5-20 Hz. The threshold frequency may be selected to be in other appropriate frequency ranges as the disclosure is not limited in this respect. In some embodiments, the low pass filter may be tuned to provide sufficient backpressure on valve 1534 to prevent the valve 1534 from opening for pressure fluctuations rates that are associated with, for example, body-control operating pressure rates. In some embodiments, these rates may be, for example, below 5 Hz in frequency and full force amplitude (e.g. up to 6000 N). Inventors have recognized that in some embodiments, the performance and reliable operation of a PBOV may be improved when the piston area exposed to the filtered volume (e.g. 1537b) is greater than the piston area exposed to the unfiltered volume (e.g. 1537a). In some embodiments this ratio may be in the range of 1.05 to 1.3. Other area ratios may be selected and the disclosure is not limited in this respect.

During operation, in some embodiments, if the rate of pressure increase in the extension volume (not shown) and/or at inlet port 1530 is above a predetermined threshold value, the pressure in volume 1537a will increase more rapidly than the pressure in volume 1537b due to the hydraulic filter that is formed by the dissipative element 1540 and the compliance of volume 1537b. If the rate of pressure rise continues for a sufficient period, then the force bias on the PBOV 1533 will be overcome and the two position valve will move to its open portion and flow will be established between the inlet port 1530 and the outlet port 1531. The operation of the PBOV 1533 then acts to mitigate the effect of the rapid increase in the pressure in the extension volume (above a certain rate of increase) while allowing the more gradual rate of pressure increase that may result from, for example, the operation of the hydraulic machine, to be effectively applied to the piston 1504. The dissipative element 1540 may be, for example, a fluid restriction, orifice, or other element that provides resistance to flow in order to act as a low pass filter dissipative element in response to pressure fluctuations. In some embodiments an orifice restriction may be in the range of 0.1 to 2 mm hydraulic equivalent but may be dependent on the volumetric stiffness of chamber 1537*b*.

In some embodiments, piston 1504 may also include an additional flow control device 1515. Flow control device 1515 may include an inlet port 1550 and outlet port 1551 and balance pressure blow-off valve (PBOV) 1553. The inlet port 1550 is exposed to the pressure of the fluid in the compression volume (not shown) and the outlet port 1551 is exposed to the pressure of the fluid in the extension volume (not shown). The PBOV 1553 may include a two-position valve 1554 that is actuated by the force differential between the force applied by piston 1555*a* and the force applied by piston 1555*b*.

As in the case of PBOV 1533, a low pass filter, which may include dissipative element 1560 and compliance element 1567*c* may be tuned to block, or effectively block, frequencies above a threshold value. In some embodiments, the threshold frequency may be preselected to be in the range of, for example, 12-15 Hz, or 5-20 Hz. The threshold frequency may be selected to be in other frequency ranges as the disclosure is not so limited. During operation, in some embodiments, if the rate of change of pressure increase in the compression volume is above a predetermined threshold value, the pressure in volume 1557*a* (i.e. unfiltered volume) may increase more rapidly than the pressure in volume 1557*b* (i.e. filtered volume). If the rate of pressure rise continues for a sufficient period, then the force bias on the PBOV 1553 will be overcome and the two position valve may open, fully or partially, and flow may be established between the inlet port 1550 and the outlet port 1551. The operation of the PBOV 1553 may act to mitigate shock of rapid pressure increase in the compression volume (by discharging the pressure build-up when rate of pressure increase is above a certain threshold value) while allowing the more gradual pressure build-up that may result from, for example, the operation of the hydraulic machine as a pump.

The flow control device 1515 may also include, for example, a biased valve, such as for example, a spring biased check valve 1560*a*. Spring biased check valve 1560*a* may effectively prevent flow between the inlet port 1550 and outlet port 1551 even when PBOV 1553 is in an open position due to a rapid pressure event. Accordingly, flow between the inlet port 1550 and the outlet port 1551 may be prevented or effectively prevented unless both of the spring biased check valve 1560*a* and the two-position valve 1553 are at least partially open.

Accordingly, flow control device 1515 may be used to prevent or curtail rapid pressure increase in the compression volume when the pressure is above a preset pressure threshold by the pressure/force bias of valve 1560*a* while also allowing rapid increase in pressure at compression volume pressures below that threshold. Flow control device 1515 may be used to, for example, prevent or limit the rapid rise of pressure in the compression volume when the pressure is above a threshold value while allowing rapid pressure rise, for example during active wheel control, at frequencies, in the range of 10-15 Hz, when the pressure is below the threshold value. Accordingly, an increased pressure in the compression volume may occur without triggering valve 1560*a*, regardless of the rate of increase of pressure when the total pressure is below the bias pressure of the valve. Alternatively, in some embodiments when the pressure differential between the compression and extension volumes is above the threshold pressure, a valve may open, in which case the PBOV may react to a rapid differential pressure rise.

In some embodiments, the piston may include only an extension PBOV (i.e. an EPBOV) that, when open or effectively open, may discharge fluid from the extension volume to the compression volume or a compression PBOV (i.e. a CPBOV) that, when open or effectively open, may discharge fluid from the compression volume to the extension volume.

Figure 17:
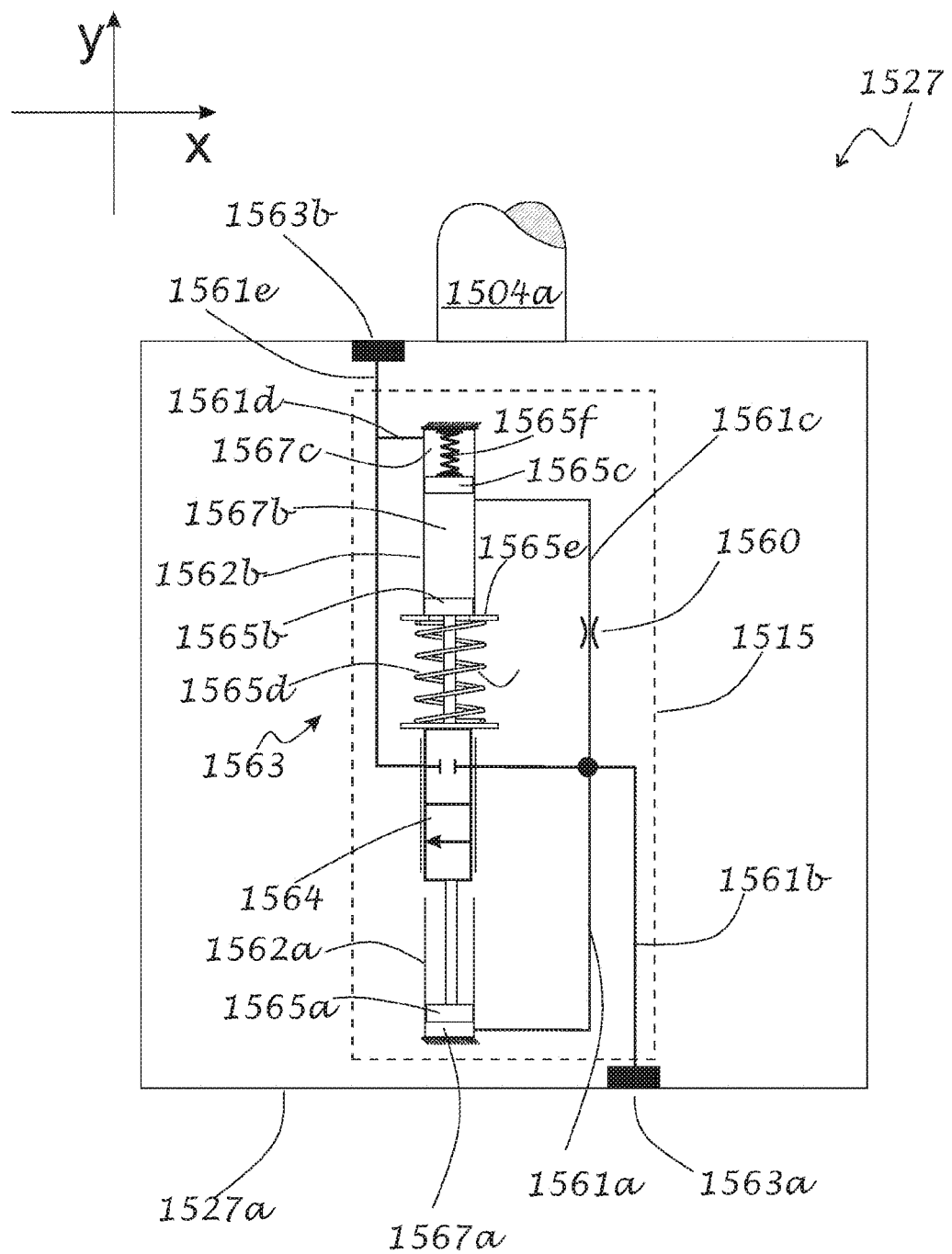
FIG. 17 illustrates a cross section view of a piston of an active suspension actuator with a single pressure balanced blow-off valve incorporated into the piston.

FIG. 17 shows an embodiment 1527 of actuator piston 1527*a* attached to piston rod 1504*a* that includes a flow control device 1515 (shown in dashed line). Flow control device 1515 may include an inlet port 1563*a* and outlet port 1563*b* and pressure balanced blow-off valve (PBOV) 1563. The inlet port 1563*a* of PBOV 1563 is exposed to the pressure of the fluid in the compression volume (not shown) and the outlet port 1563*b* is exposed to the pressure of the fluid in the extension volume (not shown).

The PBOV 1563 includes a valve 1564 that is actuated by the net force applied by piston 1565*a*, piston 1565*b*, and spring 1565*d*. Piston 1565*a* is slidably received in cylinder 1562*a* and the force applied by piston 1565*a* is determined by the product of pressure in volume 1567*a* and the cross sectional area of the cylinder 1562*a* that is transverse to the longitudinal axis of the cylinder 1562*a*. Piston 1565*b* is slidably received in cylinder 1562*b* and the force applied by piston 1565*b* is determined by the product of pressure in volume 1567*b* and the cross sectional area of the cylinder 1562*b* that is transverse to its longitudinal axis of the cylinder 1562*b*. The motion of the assembly made up of piston 1565*b*, valve 1564, and piston 1565*a* is limited by mechanical stop 1565*e*. In some embodiments valve 1564 may be a continuously variable valve as indicated in FIG. 17.

Alternatively, valve 1564 may be a two position valve with only no-flow and full-flow positions. In some embodiments, if the diameter of 1565*b* is larger than the diameter of 1565*a*, when the pressure in volume 1567*b* is equal to the pressure in volume 1567*a*, the resulting force imbalance on valve 1564 helps keep the valve 1564 in the closed position and piston 1565*b* seated against mechanical stop 1565*e*.

Flow passages 1561*a* and 1561*b* fluidly connect the volume 1567*a* to the inlet port 1563*a*. Flow passages 1561*c* and 1561*b* fluidly connect volume 1567*b* to inlet port 1563*a*. Volume 1567*c* is fluidly connected to the outlet port 1563*b* by flow passages 1561*d* and 1561*e* and separated from volume 1567*b* by piston 1567*c*. In some embodiments, the position of piston 1565*c* is determined the force resulting from the pressures in volumes 1567*b* and 1567*c* and the force applied by spring 1565*d*.

As in the case of PBOV 1533, shown in FIG. 16, the low pass filter dissipative element 1560 in flow passage 1561*c* in conjunction with the compliance of chamber 1567*b* achieved by spring 1565*f* may be sized or tuned to block, or effectively block, frequencies and/or rates of pressure rise above a threshold value. For example, in some embodiments, the threshold frequency may be preselected to be in the range of 12-15 Hz or 5-20 Hz. The threshold frequency may be selected to be in other frequency ranges as the disclosure is not so limited.

In the embodiment of FIG. 17, if the pressure at the inlet port 1563*a* (i.e. pressure in the compression volume) increases slowly relative to the pressure at the outlet port 1563*b* (i.e. pressure in the extension volume), the pressure in volume 1567*a* will track or effectively track the pressure at port 1563*a*. Concurrently, fluid will flow through flow passages 1561*b* and 1561*c* so that the pressure in volume

1567b will also equilibrate with the pressure at port 1563a. If the rate of pressure change at port 1563b relative to pressure at port 1563b is lower than hydraulic filter dissipative element 1560 is configured to block or effectively block, the pressure in volume 1567b will also track the pressure in volume 1567a. As a result, the force balance on valve 1564 would remain unchanged or effectively unchanged and the valve would remain in the closed position.

Similarly, if the pressure at port 1563b were to drop slowly, piston 1565b would move upwards but fluid would flow from the inlet port through flow passages 1561b and 1561c. As a result, the force balance on valve 1564 would remain unchanged or effectively unchanged and the valve would remain in the closed position.

During operation, in some embodiments, if the rate of change of pressure increase at port 1563a relative to port 1563b is above a predetermined threshold value, the pressure in volume 1567a may increase more rapidly than the pressure in volume 1567b due to the blocking effect of the filter that includes dissipative element 1560. In some embodiments, the effective flow restriction of element 1560 may be 10 times or more restrictive than the inherent hydraulic restriction of flow path 1561a. If the rate of pressure rise continues for a sufficient period, then the force bias on the PBOV 1563 that keeps the valve 1564 in the closed position may be overcome and the valve 1564 may move fully or partially to its open position and flow may be established between the inlet port 1563a and the outlet port 1563b. The operation of the PBOV 1563 may act to mitigate the effect of the rapid increase in the pressure in the compression volume (above a certain rate of increase).

Similarly if the pressure at port 1563b were to drop rapidly relative to the pressure at port 1563a, fluid would flow out of volume 1567c causing the piston 1565c to move in the positive y direction. But because of the blocking effect of filter dissipative element 1560 at high rates of flow increase in flow passage 1561c, the pressure in volume 1567b may fall. As a result, the force balance on valve 1564 to shift such that it may move in the positive y direction to its fully open or partially open position.

Figure 18:
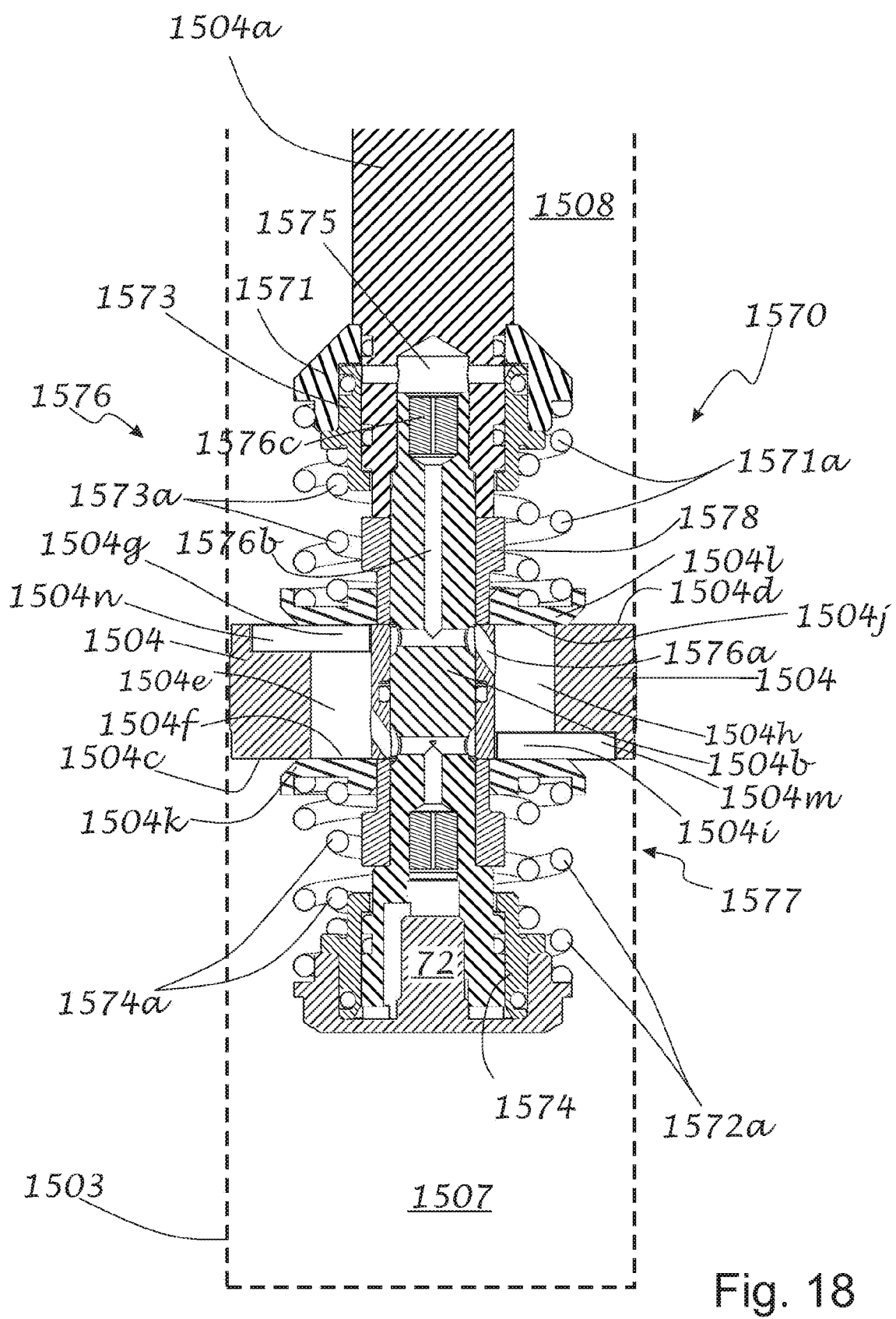
FIG. 18 illustrates the piston, piston/rod interface, and dual pressure balanced blow-off valves of FIG. 1 in greater detail.

The piston, piston/rod interface, the EPBOV (extension side pressure balanced blow off valve) and CPBOV (compression side pressure balanced blow off valve) of FIG. 15 are shown in greater detail in FIG. 18. An embodiment of a system with two flow control devices external to the piston 1504 is illustrated in FIG. 18. Piston 1504 is fixedly attached to extension stud 1504b at approximately the midpoint of the stud. The piston 1504 separates the internal volume of the pressure tube 1503 (shown in dashed line) The extension stud 1504b has a proximate end, which is fixedly attached to piston rod 1504a, and a distal end. Piston 1504 includes a first face 1504c that is at least partially exposed to the fluid in the compression volume 1507 and a second face 1504d that is at least partially exposed to the fluid in the extension volume 1508. In some embodiments, piston 1504 includes at least one flow passage 1504e that fluidly connects an outlet port 1504f in the first face of piston 1504 with an inlet port 1504g in the second face 1504d of the piston 1504.

In some embodiments, piston 1504 may include at least one flow passage 1504h that fluidly connects an inlet port 1504i in the first face of piston 1504 with an outlet port 1504j in the second face 1504d. In some embodiments, a sealing washer 1504k may be used to selectively seal or selectively effectively seal one or more outlet ports (e.g. outlet port 1504f) in the first face 1504c of piston 1504. In some embodiments, a sealing washer 15041 may be used to selectively seal or selectively effectively seal the one or more outlet ports (e.g. outlet port 1504j) in the second face 1504d. The interface between the sealing washers 1504k and 15041 and the piston faces 1504c and 1504d, respectively, may be radially extending flat surfaces. However, other appropriately shaped mating surfaces may be used as the disclosure is not so limited. In some embodiments, the sealing washers may be annular disks as illustrated in FIG. 18. Alternatively, appropriately shaped shim-stacks or other sealing elements may be used as the disclosure is not so limited.

Figure 19:
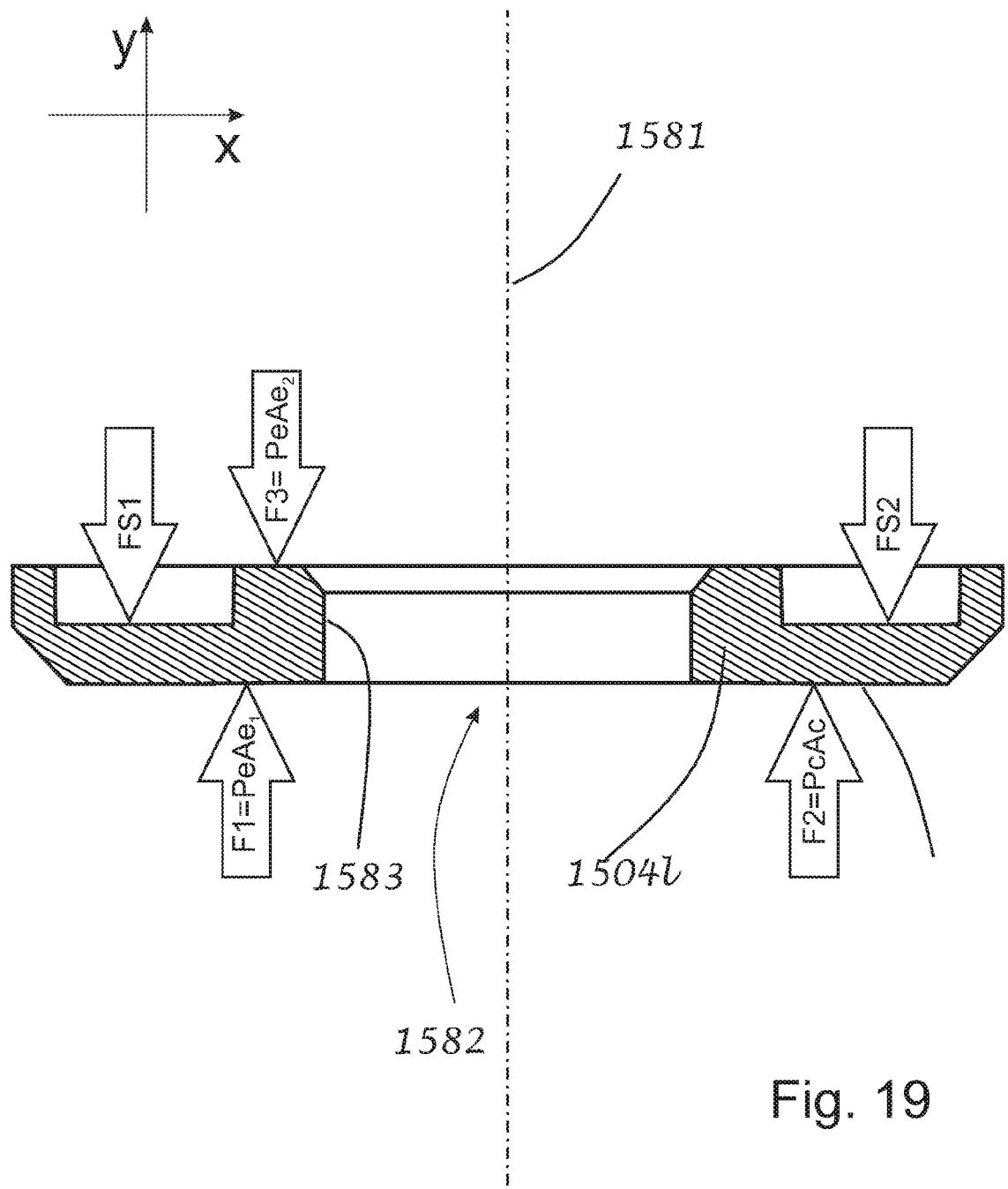
FIG. 19 illustrates a cross section elevation view of a sealing washer and the forces acting on it in the longitudinal direction.

In the embodiment of FIG. 18, the sealing washers 1504k and/or 15041 may be biased against the sealing surfaces of faces 1504c and/or 1504d by one or more hydraulic and/or mechanical forces. FIG. 19 illustrates a force balance on sealing washer 15041, when it is in its seated position, as illustrated in FIG. 18. The illustrated embodiment of the sealing washer 15041 is an annular disk with a central axis 1581 that coincides with the longitudinal axis of piston rod 1504a and/or extension stud 1504b. The central opening 1582 of the sealing washer 15041 may include a central cylindrical portion 1583 that may be configured to receive the extension stud 1504b and a surrounding bearing. The balance of the forces acting on sealing washer 15041 determine whether the washer will remain in a seated position against piston face 1504d or lift off that seated position. The washer may maintain a hydraulic seal when the sealing contact force is positive and non-zero. In the embodiment of FIG. 19, if the net force in the negative y direction is greater than or equal to the net force in the positive y direction, the sealing washer 15041 may remain seated against the mating surface of the piston. If there is a net force in the positive y direction, the sealing washer 15041 may lift off the mating surface of the washer, allowing fluid to flow from the compression volume 7, through flow passage 1504h, to the extension volume 1508.

The embodiment of the dual PBOV system, shown in FIG. 18, may include a fixed proximate spring perch 1571 affixed or secured to rod 1504a and distal spring perch 1573 affixed or secured to the distal end of extension stud 1504b. Fixed spring 1571a is operatively interposed between proximate fixed spring perch 1571 and sealing washer 15041. Fixed spring 1571a is configured to apply a mechanical force on sealing washer 15041. Similarly, in some embodiments, fixed spring 1572a is operatively interposed between distal fixed spring perch 1572 and sealing washer 1504k. In some embodiments, fixed spring 1572a is configured to apply a mechanical bias force on sealing washer 1504k.

The embodiment illustrated in FIG. 18 may also include proximate floating perch 1573 and distal floating perch 1574. Floating springs 1573a and 1574a are operatively disposed between sealing washers 1504k and 15041 and floating perches 1574 and 1575, respectively. The combination of bias forces applied by floating spring 1573a and fixed spring 1571a, unless overcome by an opposing net hydraulic force, may maintain the sealing washer 15041 seated against the second face 1504d or piston 1504. Similarly, in some embodiments, floating spring 1574a and fixed spring 1572a, unless overcome by an opposing net hydraulic force, may maintain sealing washer 1504k seated against the first face 1504e of piston 1504b.

In the embodiment illustrated in FIG. 18 the compression volume 1507 is fluidly connected to manifold 1575 by means of recessed pocket 1504m, inlet port 1504i, and flow passages 1504h, 1576a, and 1576b and flow restriction 1576c. Flow restriction 1576c may be, for example, an orifice, a laminar flow element (e.g. a tube where the flow is laminar during operation) or other appropriate component that induces a hydraulic pressure drop. Slow changes in pressure of the compression volume 1507 may reach the manifold 1575 without or effectively without mitigation. However, because of the resistance of the flow passages and especially flow restriction 1576c, rapid increases in pressure of compression volume 1507 may be attenuated when they reach the manifold 1575. The pressure differential between the pressure in manifold 1575 and the pressure in the extension volume 1508 results in a net hydraulic force being applied to the floating perch 1573 in the longitudinal direction. Therefore, for slowly changing compression volume 1507 pressures, the pressure in the manifold 1575 may track or effectively track the pressure in the compression volume 1507. Therefore, for slowly changing pressures in the compression volume 1507, the net force on the floating perch 1573 may compress floating spring 1573a thus increasing the mechanical force on the sealing washer 15041. The increased mechanical force counteracts the increased hydraulic force on the sealing washer 15041 that may lift the sealing washer 15041 from its seated position. Therefore, PBOV 1576, may resist opening and at least partially discharging the pressure differential due to increased pressure in the compression volume if those changes are slow, such as for example between 0 Hz and 4 Hz.

However, for rapidly changing compression volume pressures, the intervening resistance between the compression volume 1507 and the manifold 1575 may block or effectively block the manifold pressure from tracking the compression volume pressure. Without sufficient increase in the pressure of manifold 1575 there may not be sufficient pressure differential applied to the floating spring perch 1573 to cause the floating spring to compress or compress sufficiently. Without the additional mechanical force applied by the floating spring 1573a, the sealing washer 15041 may lift off its seated position and allow the pressure differential between the compression volume 1507 and the extension volume 1508 to at least partially discharge.

In a similar fashion, the PBOV 1577 may be used to discharge the differential pressure between the extension volume 1508 and the compression volume 1507 when the pressure increase in the extension volume 1508 is rapid. However, the PBOV 1577 may allow for the pressure in the extension volume 1508 to be increased slowly, for example by the operation of the hydraulic machine 1522 of FIG. 15, to the maximum pressure capacity of the hydraulic machine 1522, without causing the sealing washer 1504k to lift off its sealing position. Therefore, flow from the extension volume 1508 to the compression volume 1507, through flow passage 1504e, would be effectively blocked.

It should be noted, in some embodiments, PBOV 1576 and/or PBOV 1577 may be configured to be insensitive to rapid pressure increases so long as the differential pressure between the compression volume 1507 and extension volume 1508 remains below a preset threshold. For example, the spring constants and initial compression of spring 1571a and/or spring 1573a, may be selected such that the sealing washer 15041 remains in its sealing position, regardless of the rate of pressure rise in the compression volume 1507, as long as the net longitudinal hydraulic force on the sealing washer 15041 is less than the mechanical force applied on that washer by the combination of the springs 1571a and/or 1573a.

Figure 20:
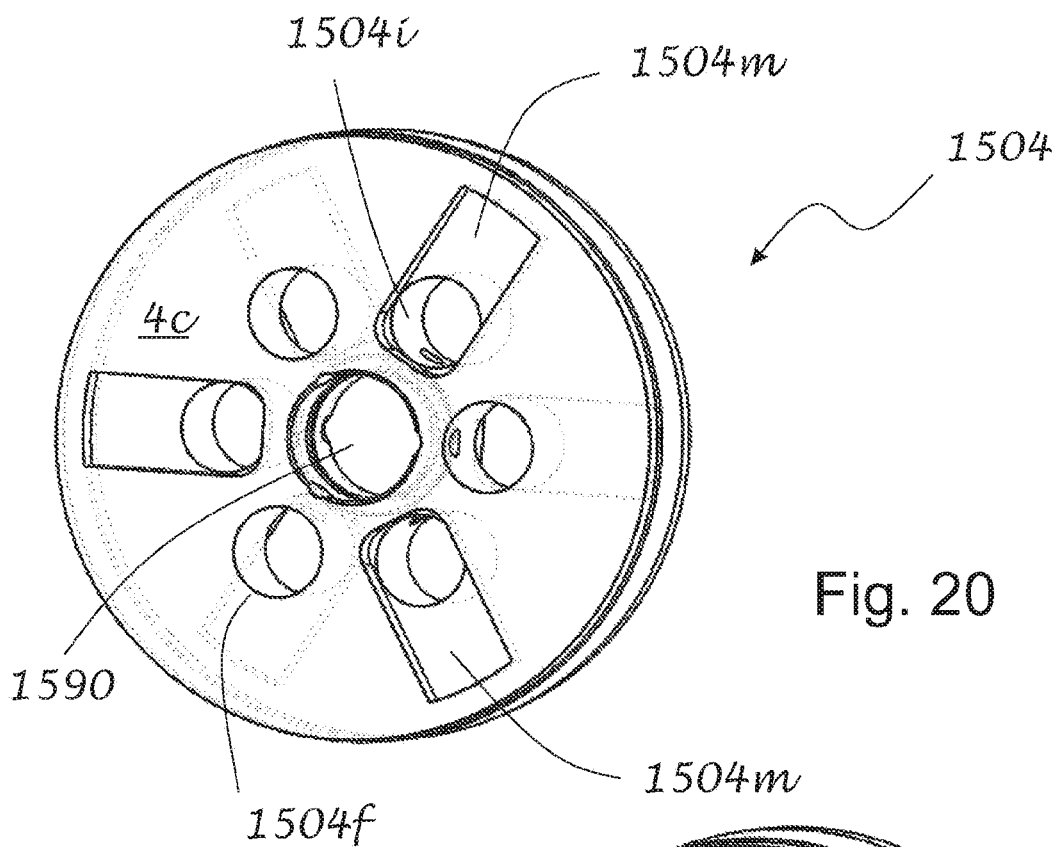
FIG. 20 illustrates a piston face of the piston shown in FIG. 15.
Figure 21:
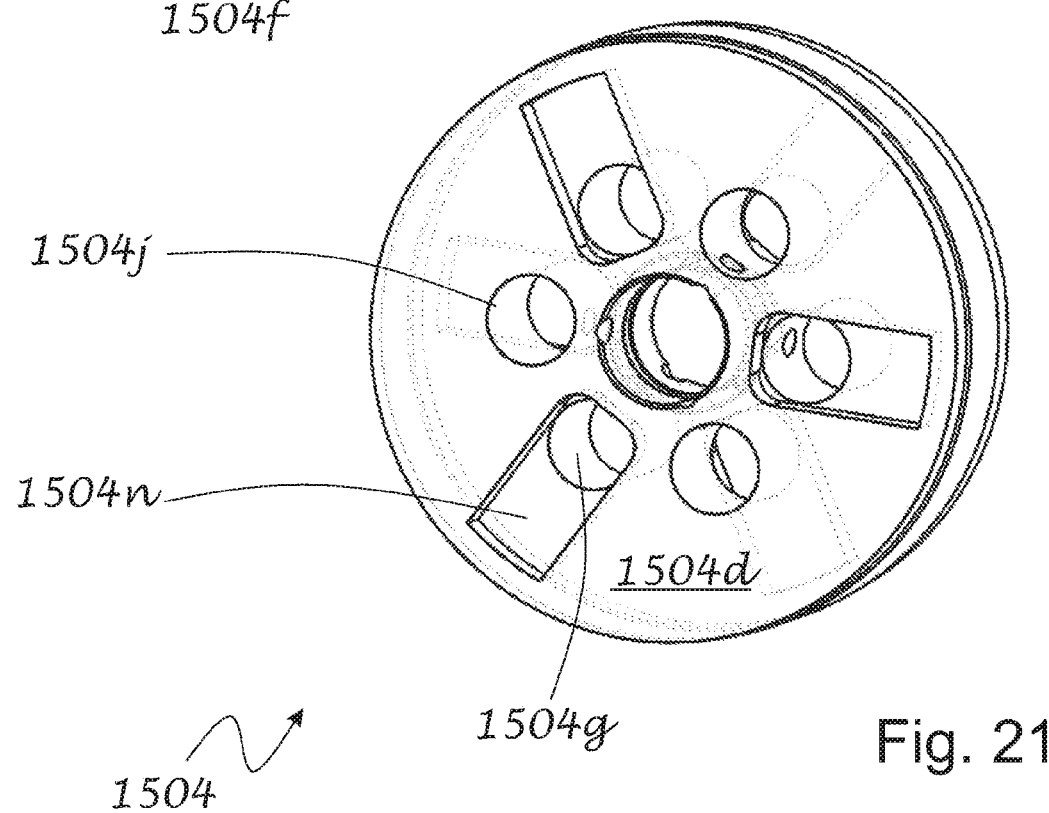
FIG. 21 illustrates a second piston face of the piston shown in FIG. 15.

FIG. 20 and FIG. 21 illustrate the first face 1504c and second face 1504d, respectively, of piston 1504 of the embodiment shown in FIG. 18. These two faces are annular, planar, radially extending surfaces with openings for inlet and outlet ports. Some embodiments may include surfaces that are not planar but that include protrusions and recesses as the disclosure is not so limited. The piston 1504 of FIGS. 5 and 6 includes a central opening 1590 that sealably receives extension stud 1504b and spacer bushing 1578.

In the embodiment shown in FIG. 20, piston face 1504c includes three outlet ports 1504f and three inlet ports 1504i. When sealing washer 1504k is in its seated position, the outlet ports 1504f are sealed or effectively sealed so that fluid flow through the piston from the extension volume 1508 to the compression volume 1507 is blocked or effectively blocked. However, when the sealing washer 1504k is seated against the piston face 1504c, inlet ports 1504i are not blocked because these openings include recessed pockets 1504m. Fluid in the compression volume may enter the inlet ports 1504i by means of recessed pockets 1504m even when the sealing washer 1504k is in its sealing position. Therefore, in some embodiments, sealing washer 1504k may be used to seal one or more outlet ports 1504j, while allowing flow from the extension volume 1508 to enter one or more inlet ports 1504i through recessed pockets 1504m.

Similarly, in the embodiment shown in FIG. 21, piston face 1504d includes three outlet ports 1504j and three inlet ports 1504g. When sealing washer 15041 is in its seated position, the outlet ports 1504j are sealed or effectively sealed so that fluid flow through the piston form the compression volume 1507 to the extension volume 1508 is blocked or effectively blocked. However, when the sealing washer 15041 is seated against the piston face 1504d, inlet ports 1504g are not blocked because these openings include recessed pockets 1504n. Fluid in the compression volume 1507 may enter the inlet ports 1504j by means of recessed pockets 1504n even when the sealing washer 15041 is in its sealing position. Therefore, in some embodiments, sealing washer 15041 may be used to seal one or more outlet ports 1504j, while allowing flow from the compression volume 1507 to enter one or more inlet ports 1504g through recessed pockets 1504n.

Figure 22:
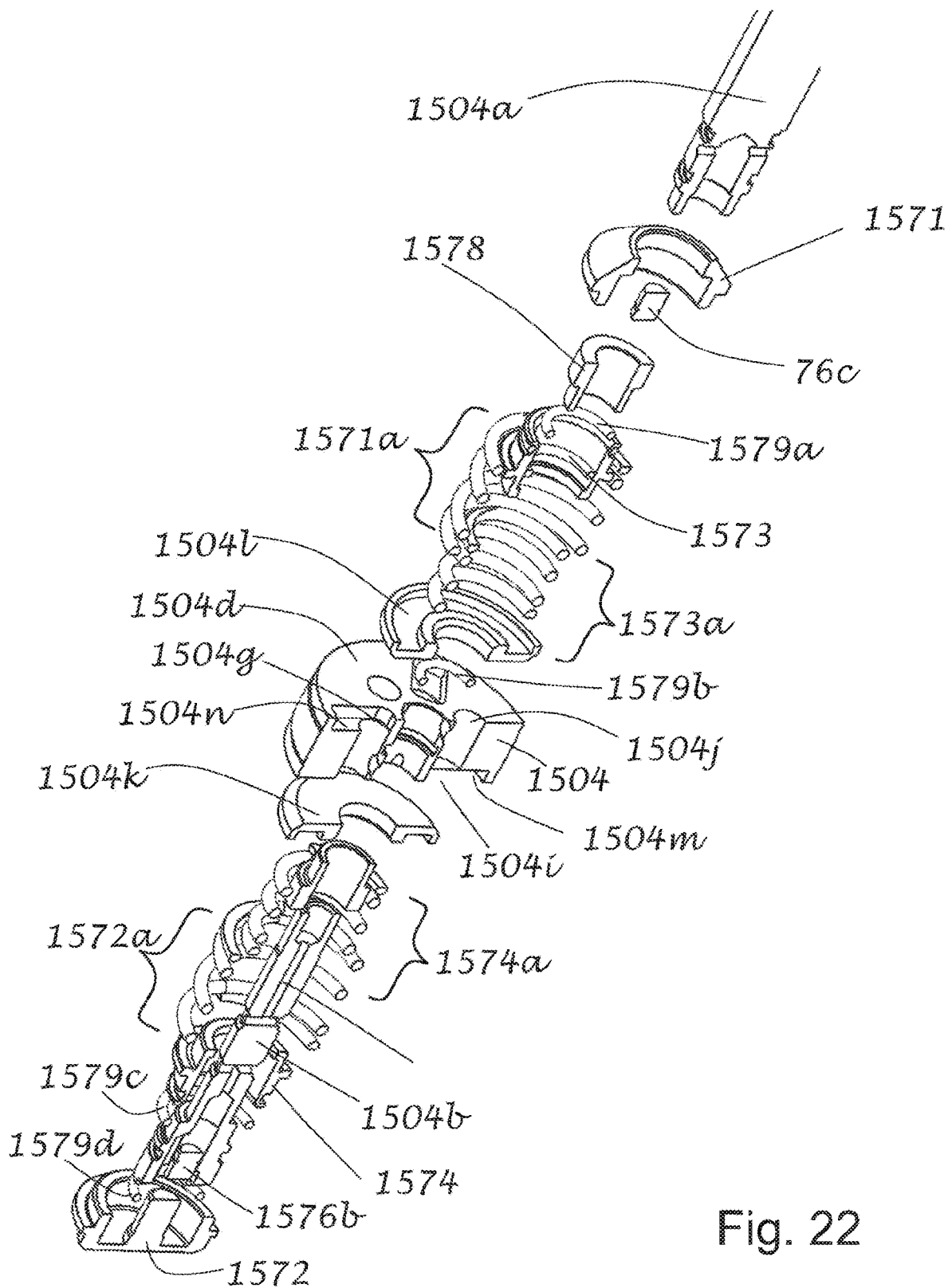
FIG. 22 a perspective exploded cross section view of the piston assembly of FIG. 18.

FIG. 22 illustrates a sectioned, exploded, perspective view of the dual PBOV system of FIG. 18. Sealing elements 1579a, 1579b, 1579c, and 1579d, that may be, for example, o-rings are shown. Also shown are flow resistance blocks 1576b and 1576c that may include an orifice or other component that induces a hydraulic pressure drop.

Figure 23:
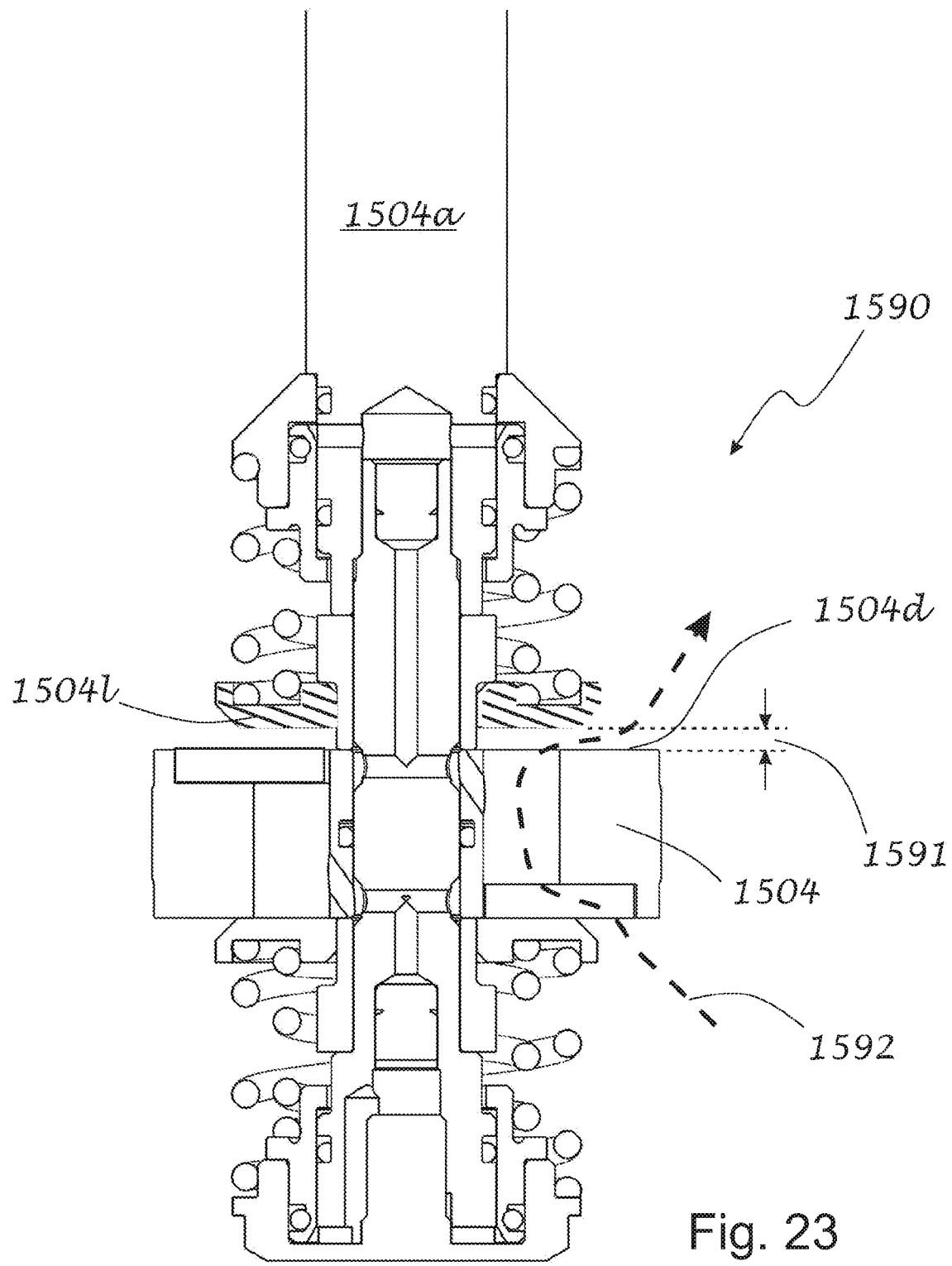
FIG. 23 illustrates of the apparatus of FIG. 18 with a spring loaded sealing washer displaced from its seated position.

FIG. 23 illustrates the dual PBOV piston and piston rod combination 1590 where the sealing washer 15041 (shown in cross hatched section) has lifted from its sealing position against face 1504d of the piston 1504 by a displacement amount 1591. As a result, fluid in the compression volume 1507 may flow to the extension volume 1508 along, for example, flow path 1592.

Figure 24:
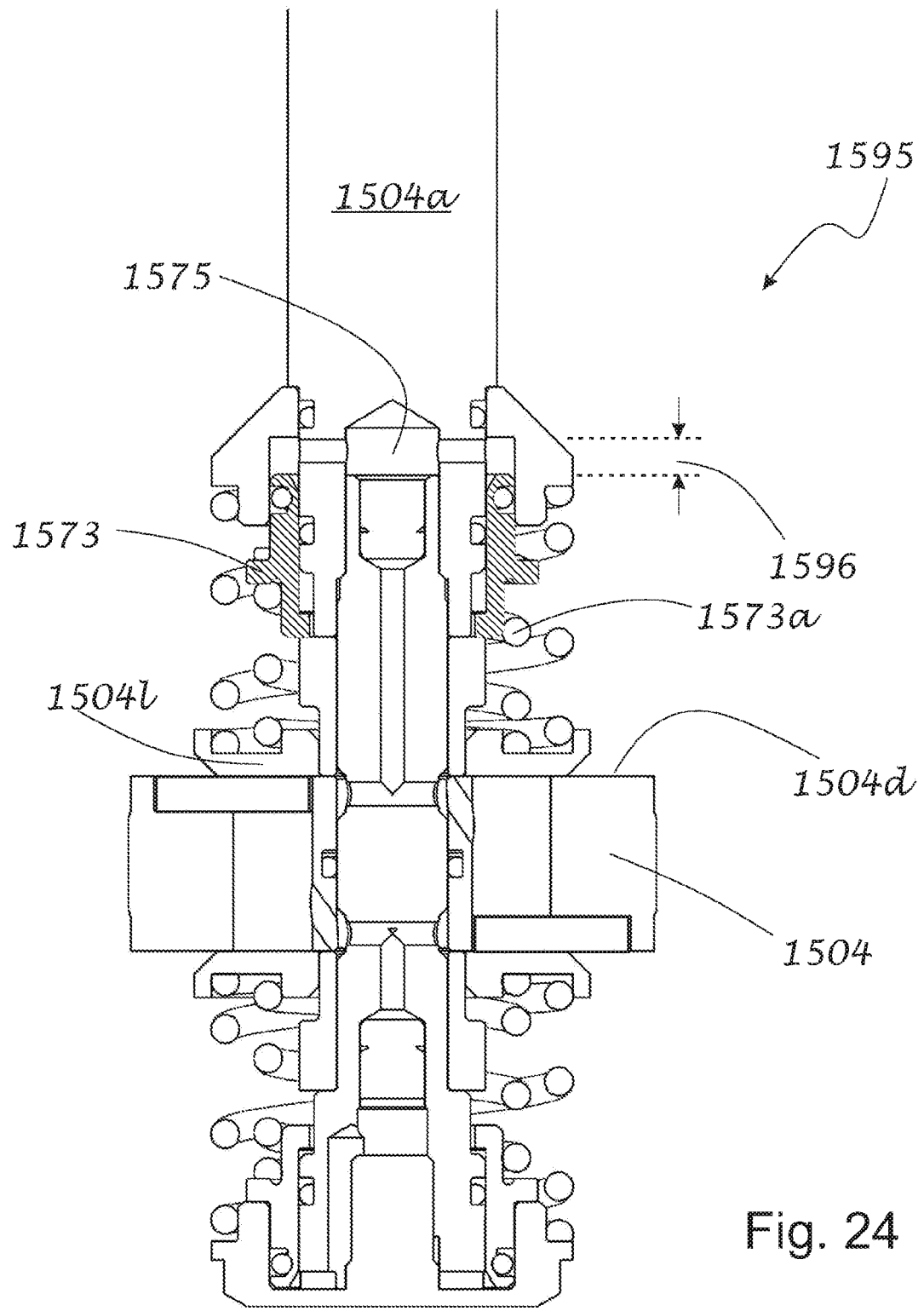
FIG. 24 illustrates the apparatus of FIG. 18 with a floating spring perch displaced from its resting position.

FIG. 24 illustrates the dual PBOV piston and piston rod combination 1595 where the sealing washer 15041 is in its sealing position against face 1504d of the piston 1504. Proximate floating perch 1573 (shown in cross hatched section) has been displaced by displacement amount δ 1596, as a result of a pressure differential between the pressure in manifold 1575 and the pressure in the extension volume. In some embodiments, the displacement of the floating perch 1573 relative to the piston rod 1504a may compress floating spring 1573a by an equal amount. This compression of floating spring 1573a may increase the mechanical force on the sealing washer 15041 by an amount equal to the spring constant of floating spring 1573a multiplied by the displacement δ.

FIG. 1 shows piston 4 that includes two flow control devices 4c and 4b. One or both of these flow control devices may be bidirectional flow control devices. FIG. 18 shows piston 1504 with dual unidirectional flow control devices, PBOVs 1576 and 1577. PBOV 1576 is a unidirectional poppet valve that allows fluid flow only from the compression volume 1507 to the extension volume 1508. PBOV 1577 is a unidirectional poppet valve that allows fluid flow only from the extension volume 1508 to the compression volume 1507. One or both of these poppet valve PBOVs may be replaced by another appropriate type of flow control device and the disclosure is not limited in this respect.

Figure 25:
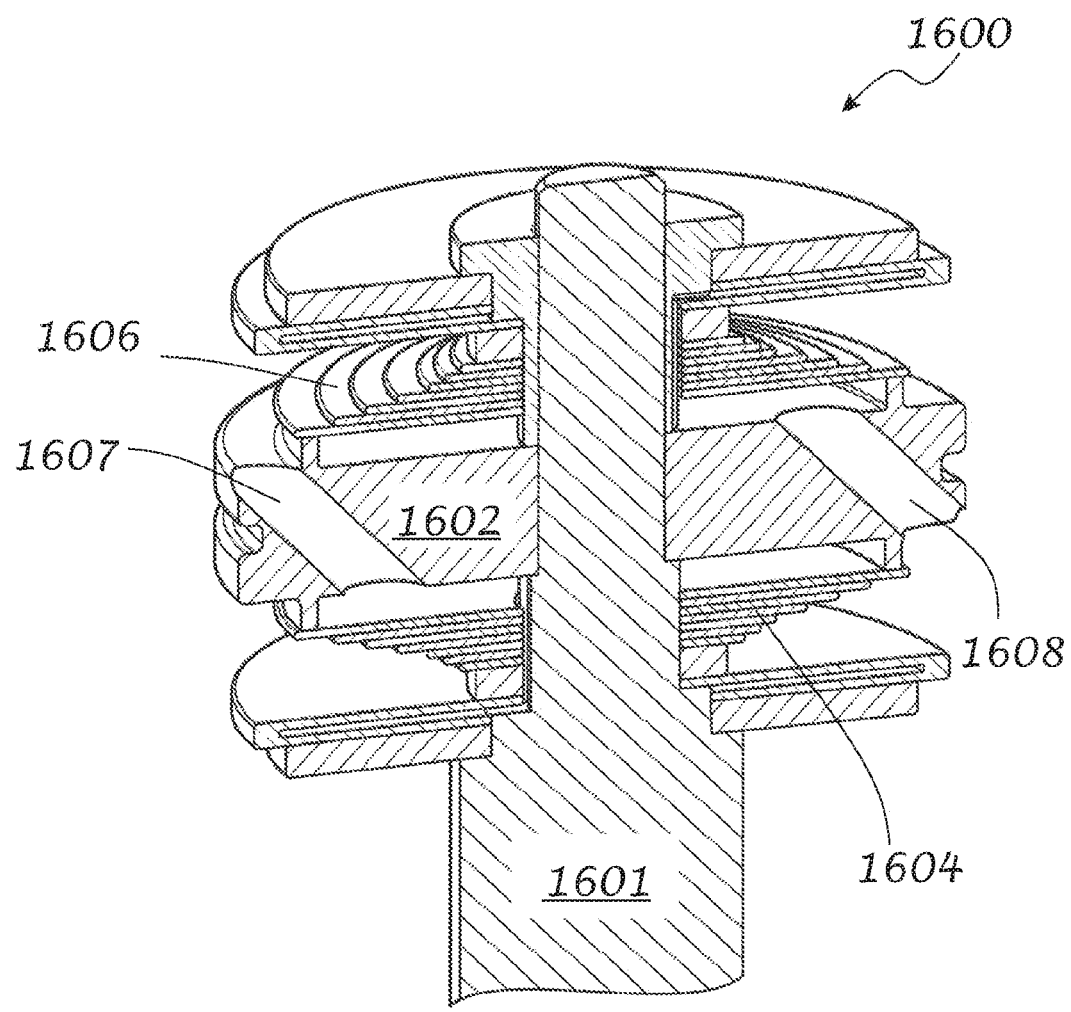
FIG. 25 shows a perspective cross-section of an embodiment of an actuator piston with two shim-stack PBOVs each of which includes an expandable pressure chamber.

FIG. 25 illustrates yet another embodiment of an active suspension actuator piston assembly 1600 with piston 1602. In this embodiment, compression shim stack 1604 and the extension shim stack 1606 effectively perform the function of PBOVs 1576 and 1577, respectively.

Piston 1602 separates the compression volume from the extension volume of the actuator. In the embodiment in FIG. 25, shim stack 1604, in its closed position, is configured and preloaded to prevent or effectively prevent fluid flow, through one or more flow paths, such as 1607, from the compression volume to the extension volume. Similarly, in its closed position, shim stack 1606, is configured and preloaded to prevent or effectively prevent fluid flow, through one or more flow paths such as 1608, from the extension volume to the compression volume.

Figure 26:
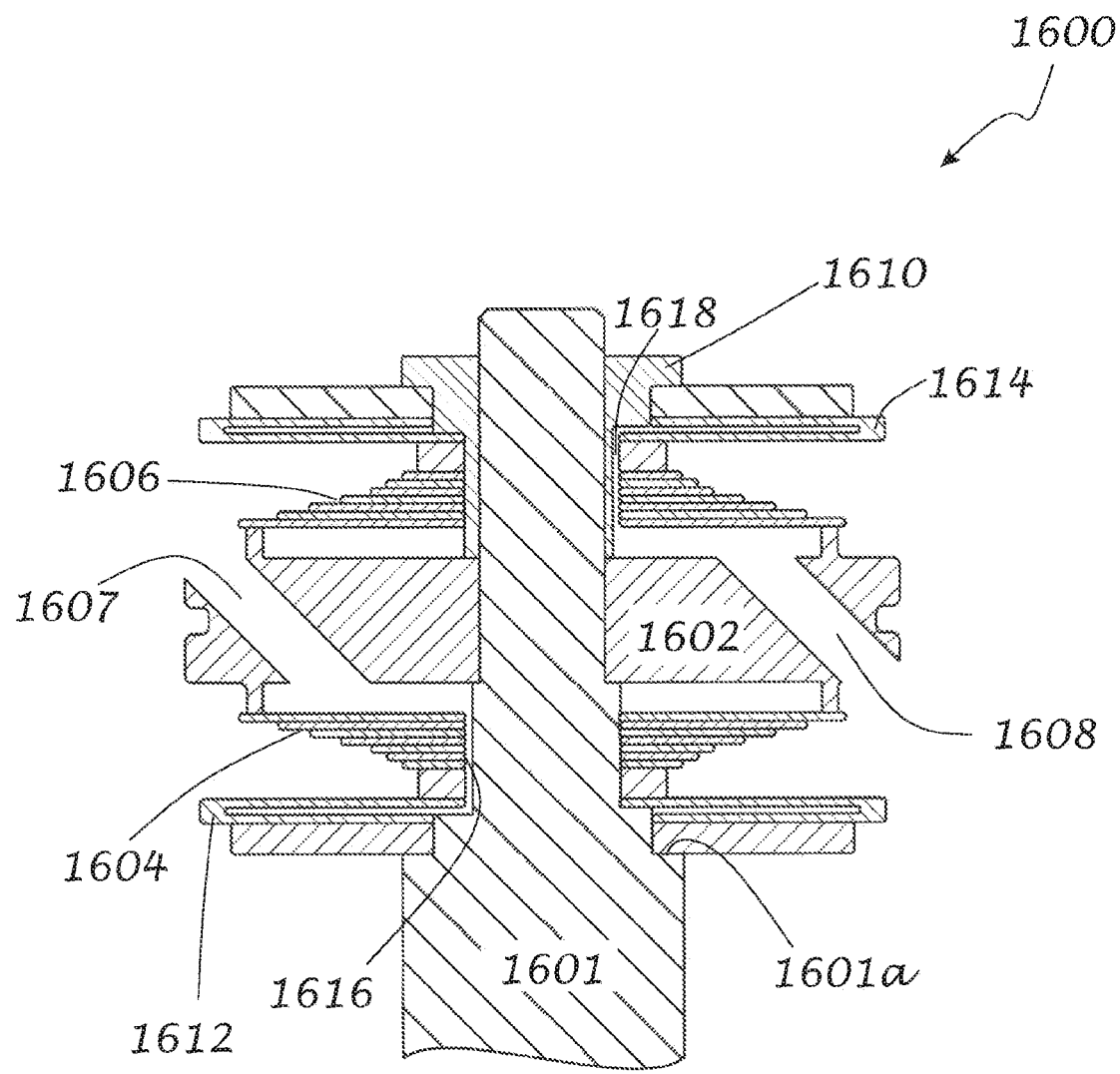
FIG. 26 shows a planar cross-section of the embodiment in FIG. 25.

When these shim stacks are exposed to a hydraulic pressure differential above a certain threshold value, they may deflect sufficiently to at least partially unblock a flow path through the piston. The deflection may open a flow path by an amount that is a function of differential pressure and the spring constant of the shim stack. FIG. 26 shows a planar cross-section of the embodiment of FIG. 25. Piston 1602, shim stack 1604, and shim stack 1606 are operatively and securely sandwiched between radially extending shoulder 1601a of piston 1601 and nut 1610 secured to the distal end of the piston rod.

Figure 27:
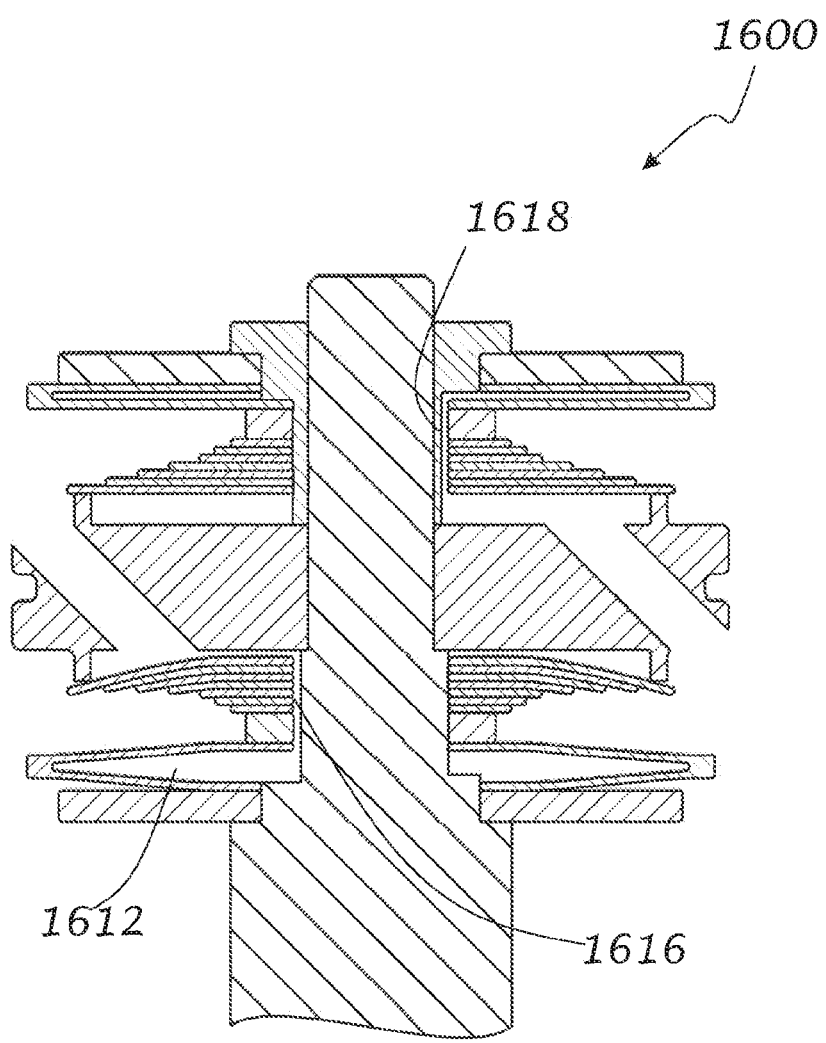
FIG. 27 shows a planar cross-section view of the embodiment in FIG. 25 with an enlarged pressure chamber in the compression-side PBOV.

The compression and extension shim stacks illustrated in FIG. 26 are in series with sealed hydraulic pressure chambers 1612 and 1614, respectively. In some embodiments, these pressure chambers may be made up of two larger shims bonded to each other on the outer edge to form a flexible expansion chamber. When the pressure differential across the damper piston is increased, flow channel 1616 or 1618 may be used to convey hydraulic fluid from the high pressure side to increase the pressure in the flexible expansion chamber 1612 or 1614, respectively. FIG. 27 illustrates a planar view of the embodiment of FIG. 25 where the pressure chamber 1612 has expanded to provide additional preload force on the shim stack 1604. In some embodiments, the effective area of the flexible expansion chamber may be higher than the exposed pressure area under the shim stack, in which case the entire shim stack may simply deflect against the sealing face. This deflection may keep the shim stack seated, thus preventing the hydraulic fluid from flowing across the piston when exposed to higher pressure differentials. This design prevents hydraulic flow across the piston for slow changes in delta pressure. For fast changes in delta pressure, the shims deflect to open the flow path across the piston at a lower differential pressure across the piston. This behavior can be achieved by restricting the flow path connecting the compression or extension volumes to the pressure chamber of the associated shim stack. The combination of the volumetric compliance of each expansion chamber and the flow impedance of the associated flow channel (1616 or 1618), effectively acts as a low-pass hydraulic filter that limits the rate of increase in the pressure in the flexible expansion chamber. If the pressure change is faster than the ability for flow through the flow channel to fill the expansion chamber (i.e. increase the pressure), then the preload of the shim stack may remain unchanged or effectively unchanged and the shim stack may deflect away from the sealing face and allow flow across the main piston. As shown in FIGS. 25-27, the restricted flow channels may include a small slot in the outer diameter of the piston rod. Alternatively or additionally, these flow channels may also include a notch or hole in the shims that creates a restricted flow path to the expansion chamber.

In some damper embodiments, a bleed hole may be located in, for example, the main piston which may act as a tuning element. As used herein, the term "tuning element" refers to a component with one or more parameters which may be altered, during calibration and/or operation, to modify the performance of a system that the tuning element is a part of. In some embodiments, if a bleed hole is large it may allow effective regulation of the pressure across the piston at low speeds or rates of pressure increase but may also lead to excessive pumping loss and inefficiency when, for example, the system is trying to build up pressure with a pump. To mitigate this tradeoff, the inventors have recognized that a significant bleed hole may be used at low delta pressures if the bleed element can be adjusted or fully closed as the delta pressure is increased, e.g. by operating the system pump. In some embodiments, this may be achieved by shutting off the bleed hole as the balancing piston attached to the expansion chamber moves to generate preload on the sealing plate. Inventors have further recognized that the displacement of movable internal components of flow control devices may be used to adjust and/or close off bleed holes in those flow control devices during certain operating conditions.

Figure 28:
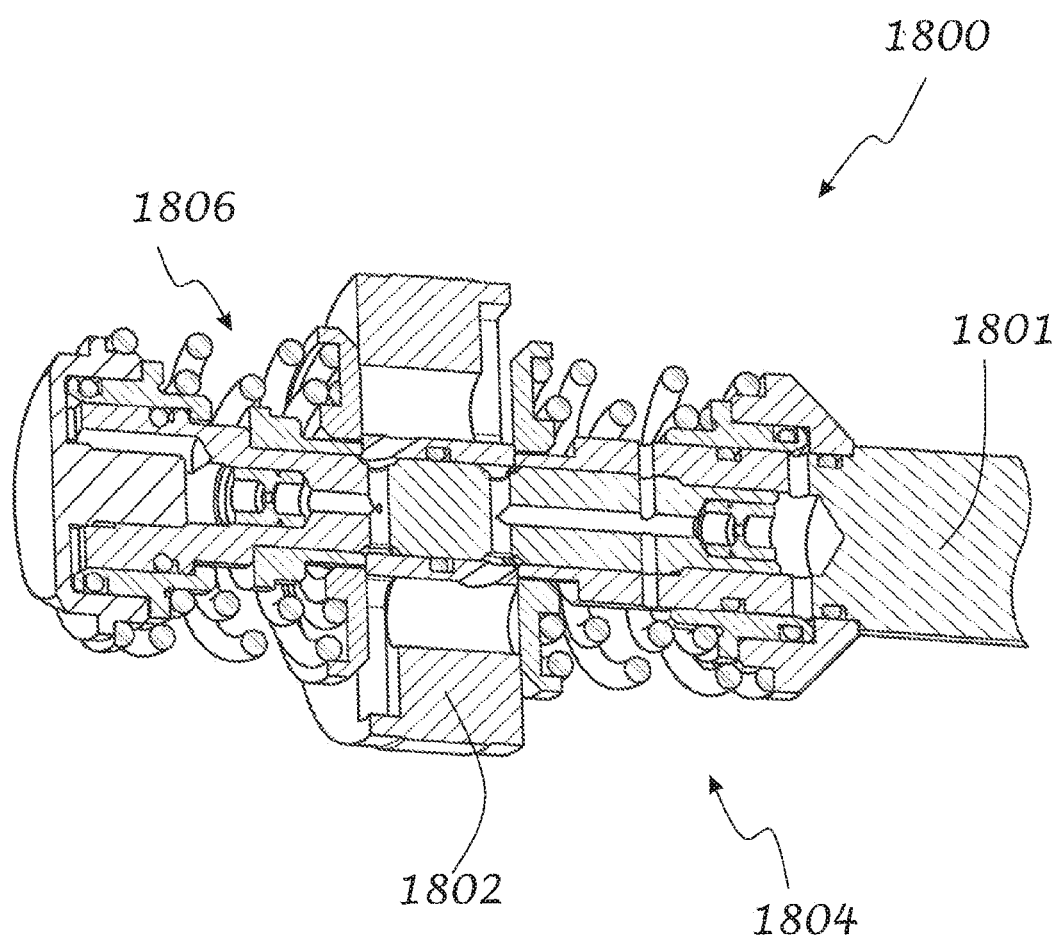
FIG. 28 illustrates a perspective cross section view of an embodiment of a dual poppet PBOV piston assembly with a variable bleed.
Figure 29:
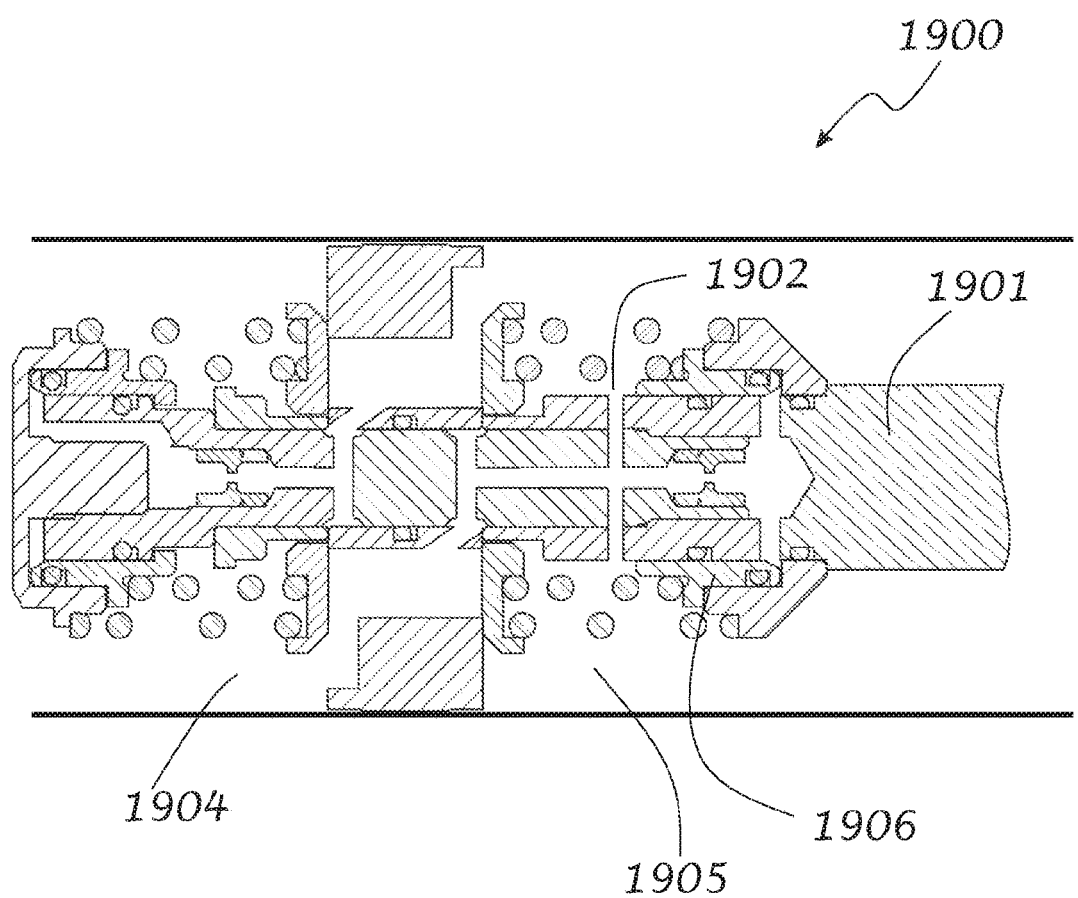
FIG. 29 illustrates a planar cross section view of the embodiment of FIG. 28.
Figure 30:
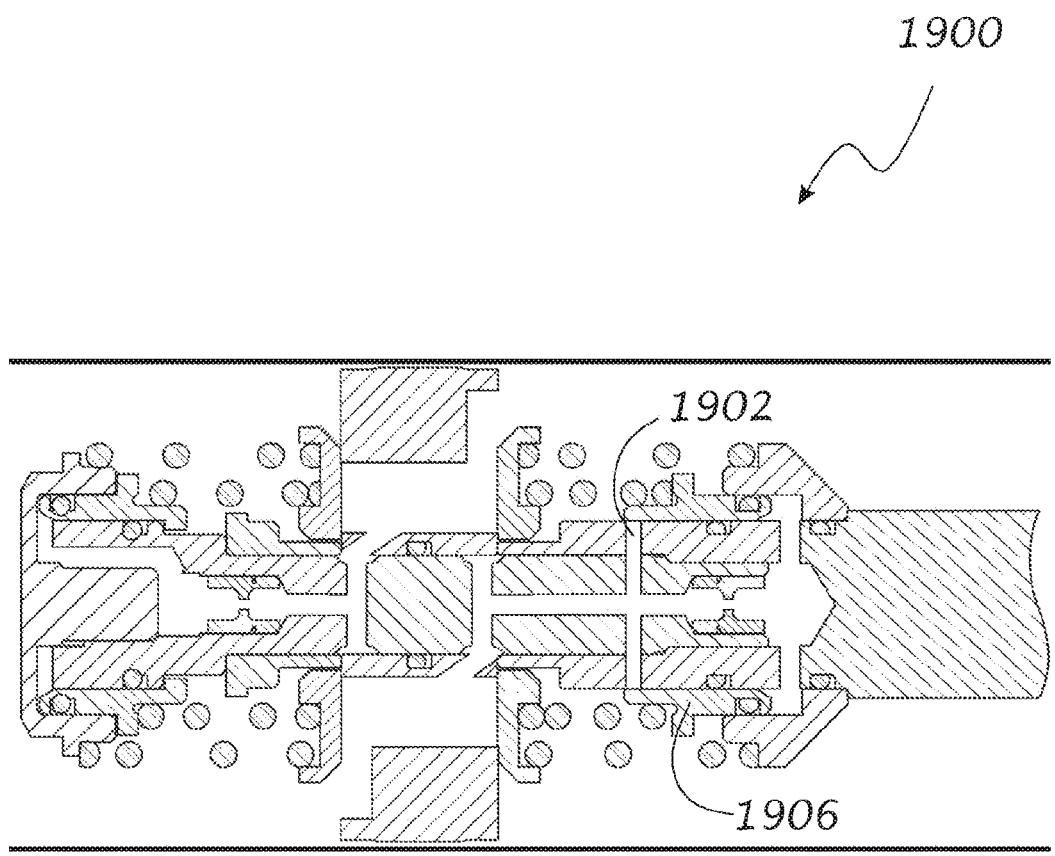
FIG. 30 illustrates a planar cross section view of the embodiment of FIG. 29 with a blocked bleed passage.

FIG. 28 illustrates a dual poppet valve PBOV piston assembly 1800 similar to the embodiment illustrated in FIG. 18. Piston assembly 1800 includes actuator piston 1802, piston rod 1801, compression PBOV 1804, and extension PBOV 1806. FIG. 29 illustrates a planar cross-section of the piston assembly 1800. FIG. 29 also shows bleed hole 1902 that fluidly connects the compression volume 1904 to the extension volume 1903 via, for example, in-piston flow channel 1905. FIG. 30 illustrates the embodiment shown in FIG. 29 where the spring perch 1906 is a displaced to position where it blocks bleed hole 1902. In this embodiment the displacement of the spring perch 1906 may be used to dynamically tune the certain operating parameters of the PBOV and the active suspension actuator system by leaving the bleed passageway unobstructed, or partially or fully blocking the bleed hole depending on the operating condition.

Figure 31:
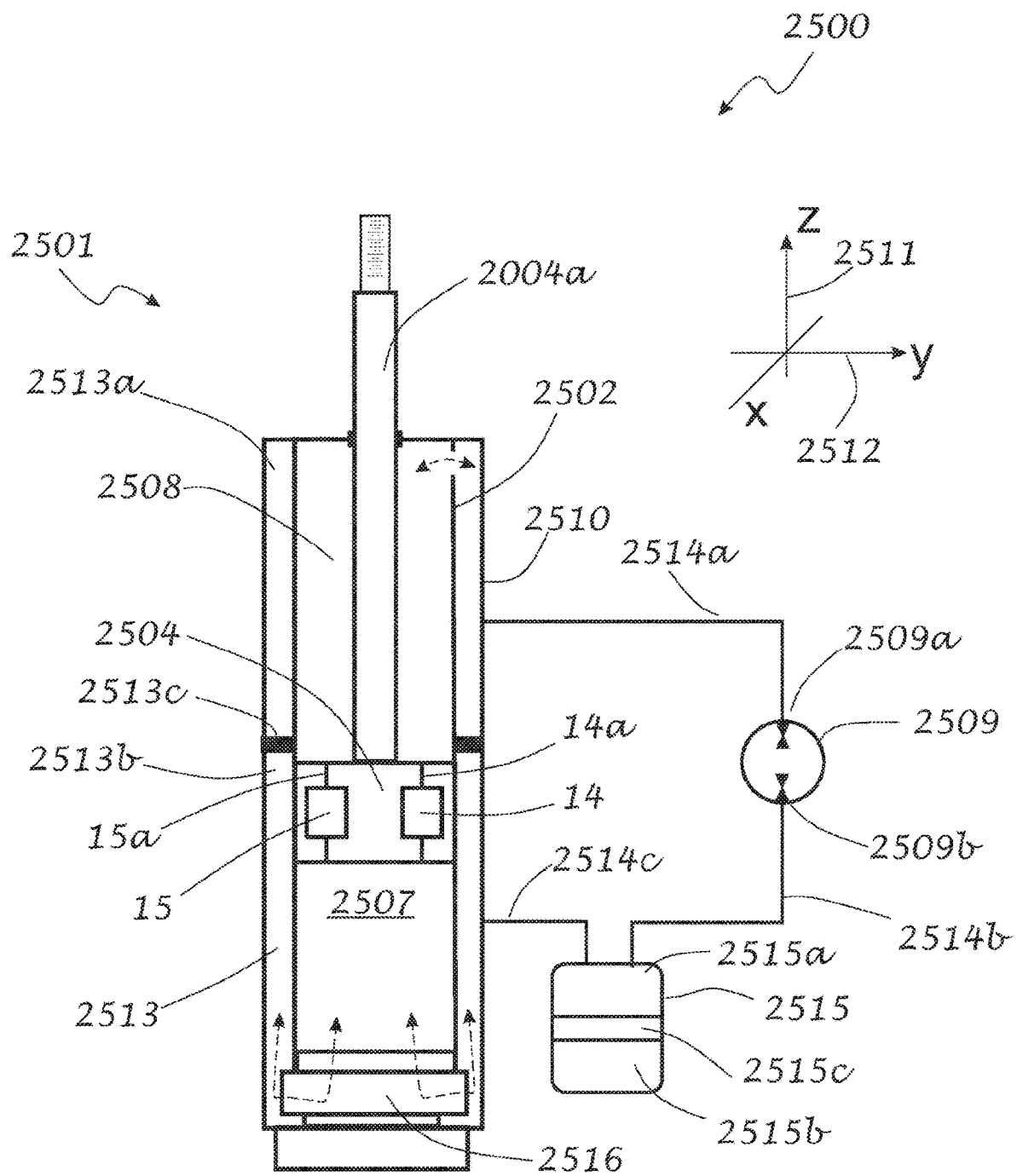
FIG. 31 illustrates an embodiment of an actuator with a base valve incorporated at the compression end of a twin tube actuator.

FIG. 31 illustrates active suspension actuator system 2500 with actuator 2501 that includes pressure tube 2502 and second tube 2510 at least partially surrounding pressure tube 2502. The pressure tube 2502 slidably receives piston 2504 that divides an internal volume in the pressure tube into a compression volume 2507 and an extension volume 2508. The actuator system 2500 includes a hydraulic machine 2509 that may operate as a hydraulic pump and/or a hydraulic motor. The hydraulic machine 2509 may be operatively coupled to an electric machine (not shown) which may drive the hydraulic machine 2509 and/or be driven by the hydraulic machine 2509.

In some embodiments, the hydraulic machine 2509 may include a first port 2509a and a second port 2509b. The longitudinal axis of the second tube 2510 and the pressure tube 2502 are parallel to or effectively parallel to the Z axis 2511. The pressure tube 2502 and the second tube 2510 form an intervening volume 2513, which may be annular in shape in whole or in part. The intervening volume 2513 may include a first conduit 2513a that may be in fluid communication with the extension volume 2508 and a second flow conduit 2513b that may be in fluid communication with the compression volume 2507. The first and second flow conduits 2513a, 2513b of intervening volume 2513 may be fluidly separated by a barrier 2513c. In the embodiment of FIG. 2, the first port 2509a is in fluid communication with the extension volume 2508 via flow conduits 2514a and 2513a, while the second port 2509b may be fluidly connected to accumulator 2515 via flow conduit 2514b. Accumulator 2515 is fluidly connected to the compression volume 2507 via flow conduits 2514c and 2513.

The accumulator 2515 includes two volumes 2515a and 2515b where the volume 2515a may be filled with hydraulic fluid and volume 2515b may be filled with a compressible medium such as, for example, a gas such as air, nitrogen or argon. The material in volume 2515a may be separated from the material in volume 2515b by a piston 2515c shown in FIG. 31 or a diaphragm or bladder (not shown).

The accumulator 2515 in FIG. 31 is a flow-through accumulator, but the disclosure is not limited to such an accumulator as any appropriate accumulator such as a branched or inline accumulator may be used instead of or in addition to the flow through accumulator 2515. The flow between the accumulator 2515 and the compression volume 2507 may be controlled by a flow control device. The flow control device may be, for example, a base valve 2516 that is incorporated into the compression end of the actuator 2501 shown in FIG. 31. The base valve 2516 may also be incorporated into the extension end of the actuator in which case it would need to accommodate the piston rod 2004a. The inventors have recognized that in some embodiments, the base valve 2516 may be configured to operate as a passive digressive valve in compression and/or extension.

Figure 32:
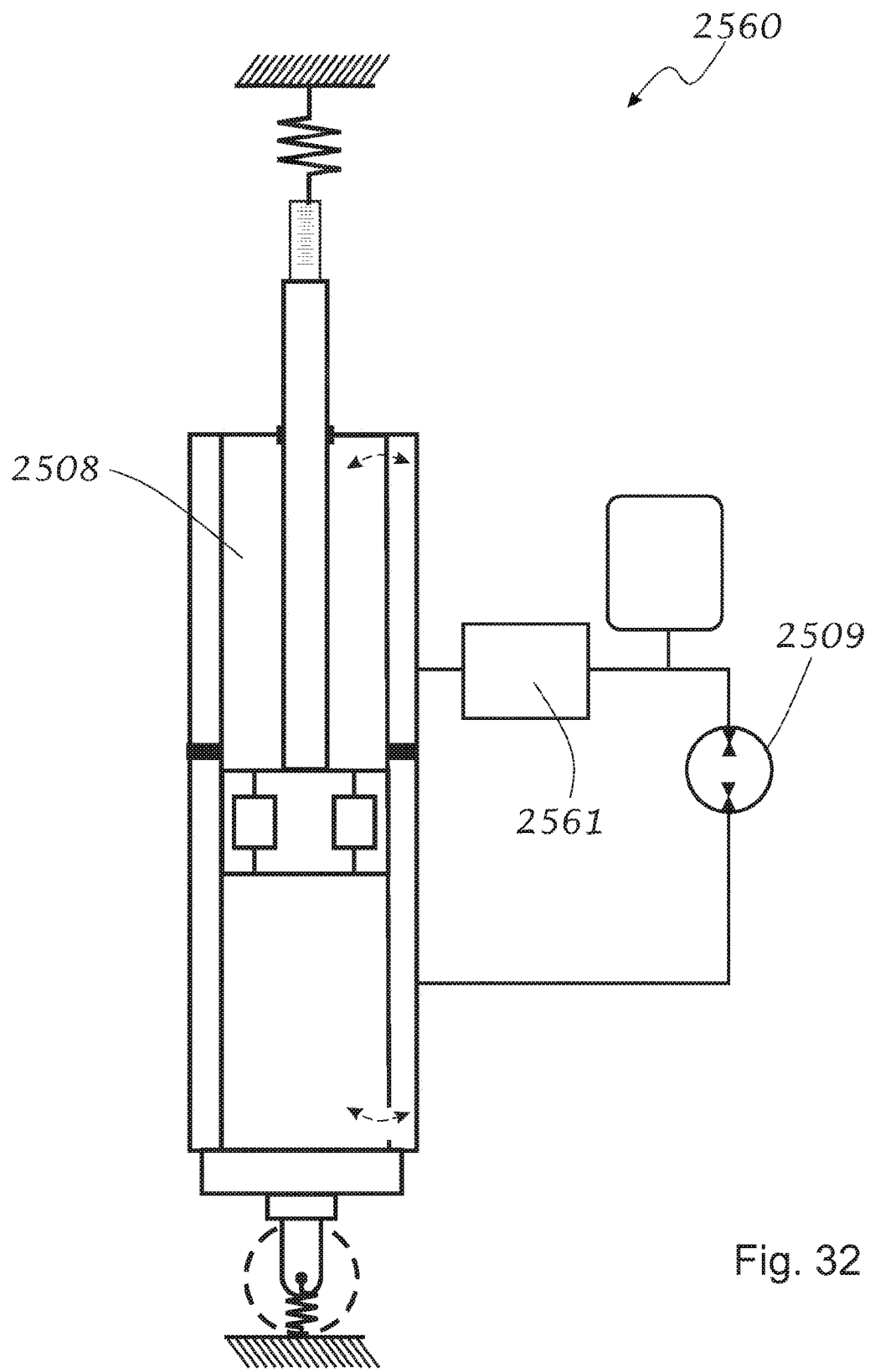
FIG. 32 illustrates an embodiment of an actuator with a flow control device configured to regulate flow into and out of the extension volume.

Alternatively or additionally, as indicated in FIG. 31, and illustrated in FIG. 32, in some embodiments, active suspension actuator system 2560 may include an accumulator 2515 and/or a flow control device 2516 which may be operatively interposed between the hydraulic machine 2509 and the extension volume 2508. FIG. 32 shows the flow control device 2561 located outside the second tube 2510, however, it may be incorporated internally and the disclosure is not limited in this respect. In the case of an internal flow control device at the extension end of the actuator, the flow control device may include an opening configured to receive piston rod 2004a.

Figure 33:
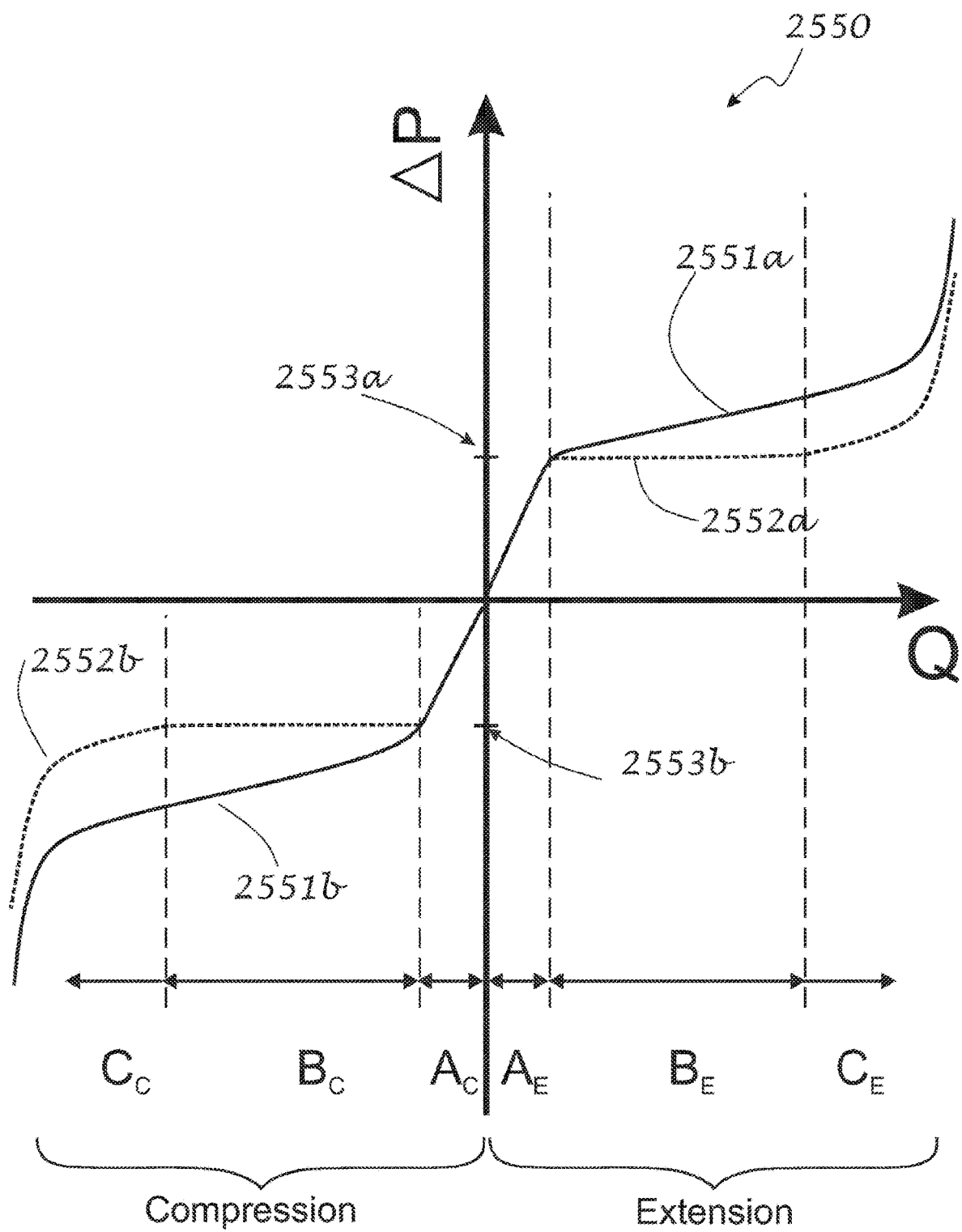
FIG. 33 shows a graph of the relationship of pressure drop across a base valve and the flow rate through the base valve.

FIG. 33 illustrates exemplary performance curves 2550 for a bi-directional digressive base valve. The pressure drop across the valve (ΔP) may increase linearly or effectively linearly as a function of flow rate Q in the low flow range (i.e. ranges $A_E$ and $A_C$). It is noted that in some embodiments, pressure drop across the valve may also increase in a quadratic or other relationship if, for example, a simple orifice hole is used in the base valve to generate damping. In some embodiments this pressure drop may be due to flow through a leakage path through the valve.

In some embodiments, once the pressure drop reaches a level indicated by 2553a during extension or 2553b during compression, shim stacks or other pressure relief valves incorporated in the base valve may open to allow additional flow to pass through the base valve. In some embodiments, shim stacks may be configured to have a cracking pressure in the range of, for example, 10 psi to 300 psi. In some embodiments, the cracking pressure may be in the range between 5 psi and 500 psi. Cracking pressure in other ranges may also be used and the disclosure is not so limited.

For flow rates in ranges $B_E$ and $B_C$, the damping may increase linearly or effectively linearly as a function of flow rate Q (curve 2551a and 2551b) or be constant or effectively constant as a function of flow rate Q (curve 2552a and 2552b). In some embodiments, the shim stacks may be configured to maintain a constant or effectively constant pressure drop over the ranges $B_E$ and $B_C$. In some embodiments, ranges $B_E$ and $B_C$ represent flow rates from 0.25 to 5 GPM, or 0.1 to 4 GPM. In some embodiments for flow rates in the range $C_E$ and/or $C_C$ and above, the base valve may behave as an orifice restriction where the damping rate (or damping) may continue to increase.

Figure 34:
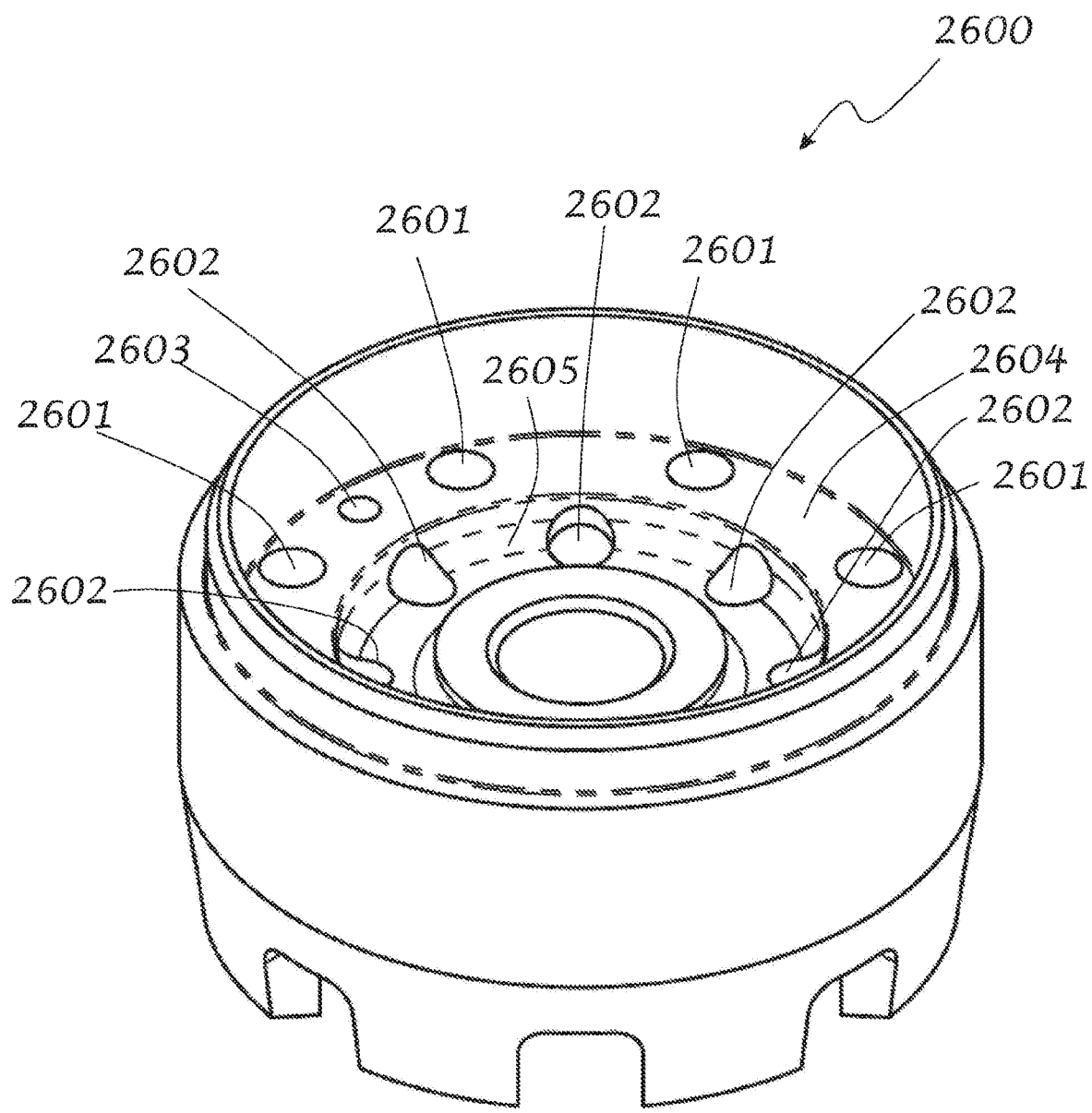
FIG. 34 shows an isometric drawing illustrating an embodiment of the body of a bidirectional base valve including a bleed hole.

FIGS. 34-39 illustrate a structure of an exemplary bi-directional digressive (i.e., digressive during both the compression and extension flows) base valve. FIG. 34 illustrates an isometric drawing of a base valve body 2650. This valve operates by controlling flow in both compression and extension by using two sets of shim stacks. These shim stacks are not shown in FIG. 34.

In the embodiment shown in FIG. 34, intake ports 2601, are angularly distributed about a longitudinal axis of the base valve body 2600. Each intake port leads into one of a first set of internal flow channels in the base valve body 2600 that convey the pressure in the compression volume to the compression shim stack (not shown). Outlet ports 2602 are connected to flow channels that convey the pressure in the extension volume (e.g. volume 2508 shown in FIG. 31) to an extension shim stack (not shown). Port 2603 connects to one internal flow channel in the base valve body 2600 that is configured to allow flow to bypasse both sets of shim stacks. Annular sealing surface 2604 is the surface that the sealing shim or shims of the extension shim stack seal against. All of the outlet ports 2602 are connected by annular cavity 2605.

Figure 35:
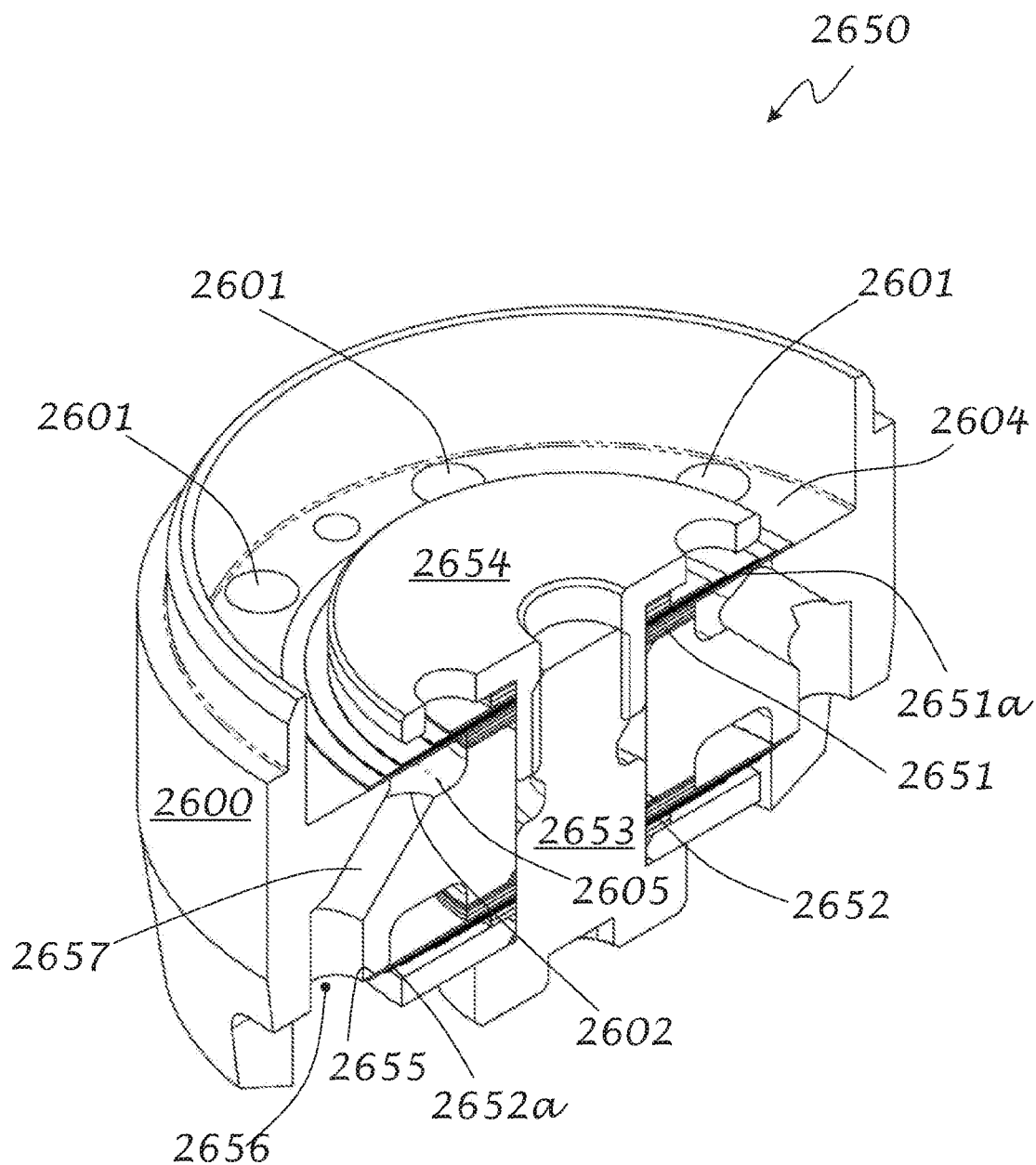
FIG. 35 illustrates an isometric cross section view of the embodiment of FIG. 34

FIG. 35 shows an isometric cross-section of the base valve assembly 2650 that includes base valve body 2600 of FIG. 34, extension shim stack 2651, and compression shim stack 2652. The compression shim stack 2652 may open during a compression stroke of the actuator piston (e.g., piston 2504 shown in FIG. 31) while the extension shim stack 2651 may open when the piston moves in an extension stroke.

Bolt 2653 and nut 2654 may be used to secure the two shim stacks 2651 and 2652 to the base valve body 2600. The large flange at the top of nut 2654 is used as a travel limiter to prevent excessive deflection of the shims under high hydraulic flow rates. A washer may be used under the head of bolt 2653. The extension shim stack 2651 includes a sealing shim 2651a which seats against a portion of sealing surface 2604 while compression shim stack 2652 includes a compression sealing shim 2652a which seats against annular sealing surface 2655. Inlet ports 2656, which are angularly distributed about the longitudinal axis of the base valve body 2600, convey the pressure in conduit 2513 via the internal extension passageways to the annular cavity 2605. The pressure in the annular cavity 2605 acts on the compression sealing shim 2652a.

Figure 36:
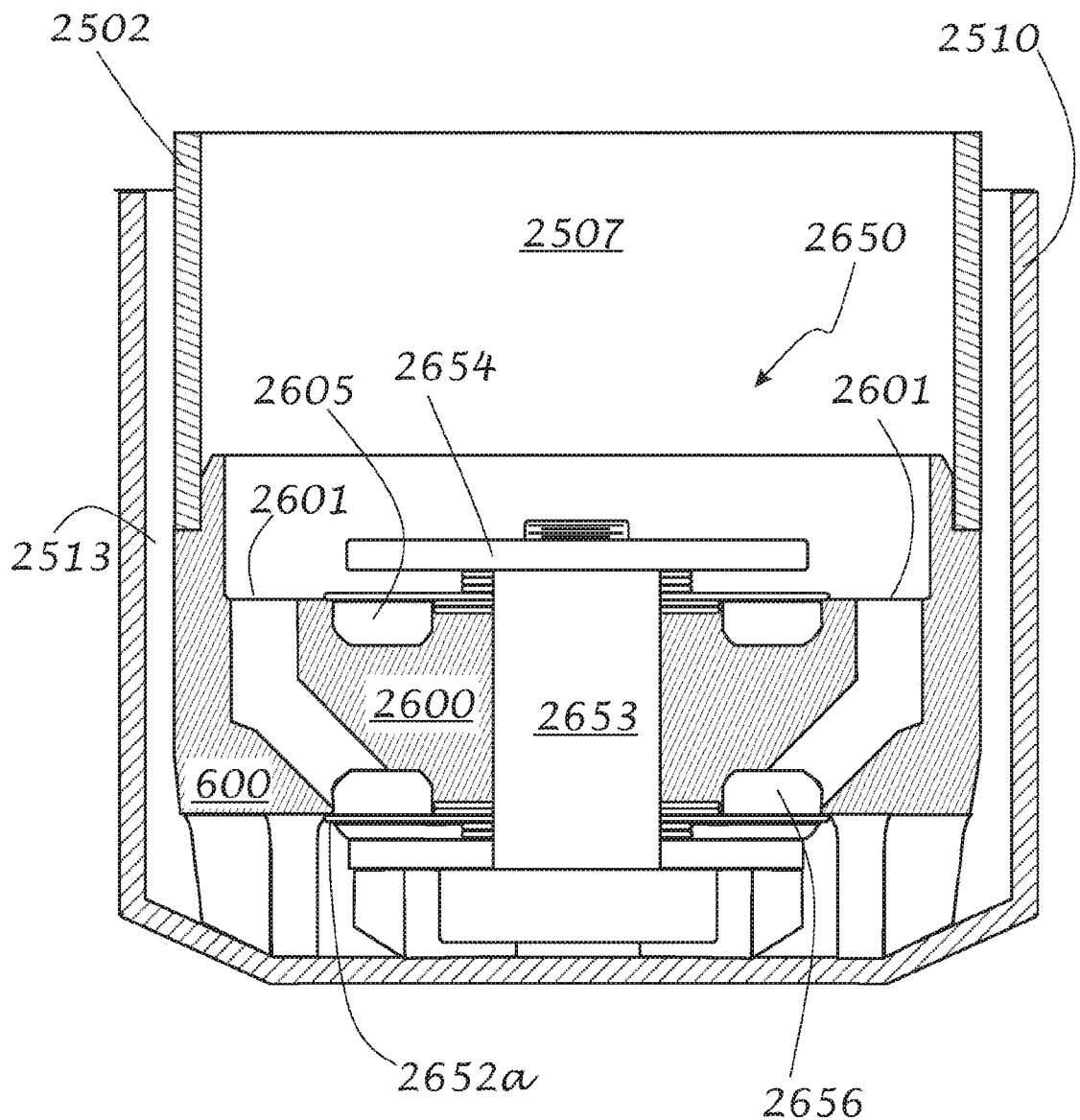
FIG. 36 illustrates a first cross section of a base-valve with each shim-stack in a closed position.
Figure 37:
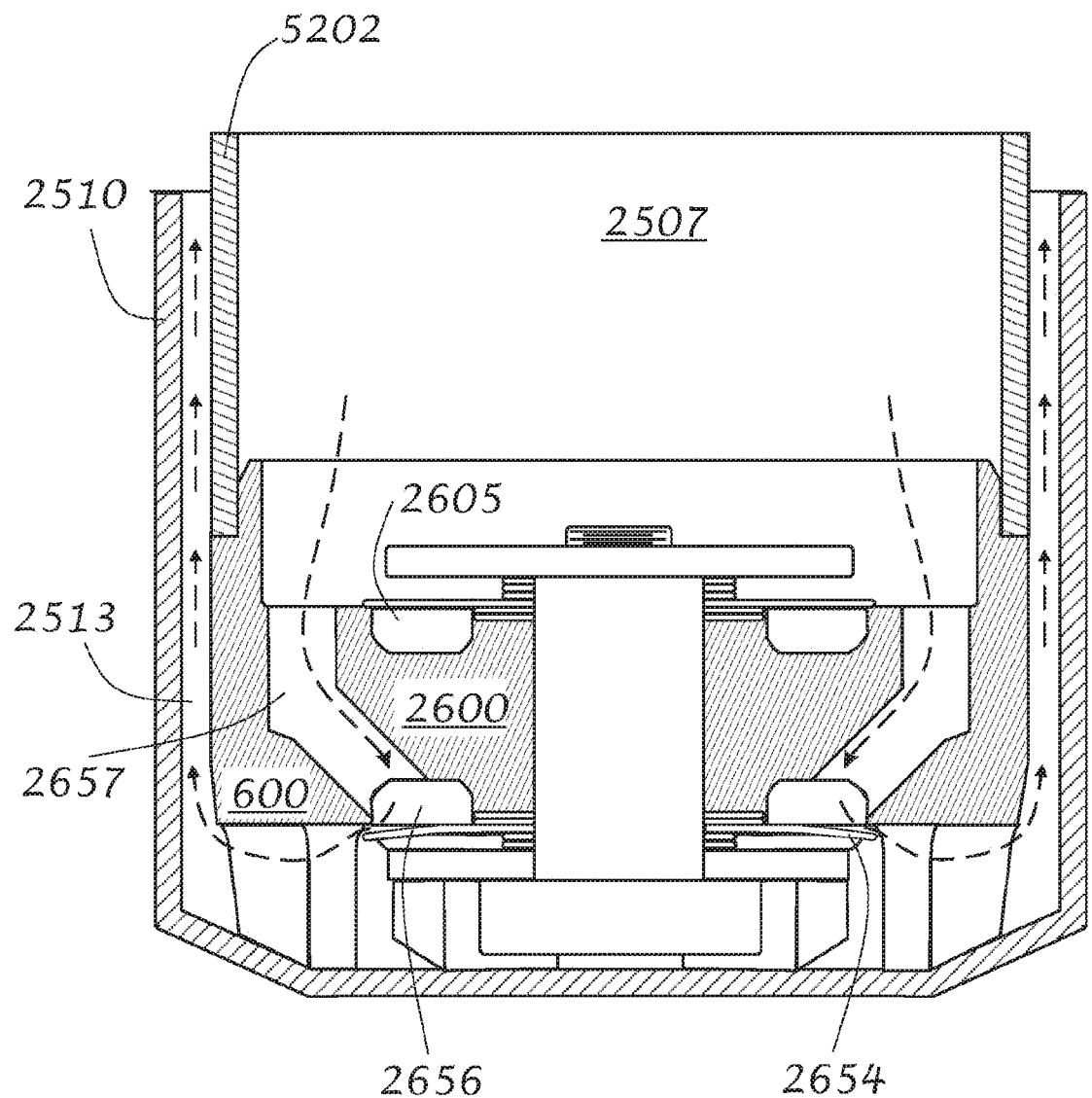
FIG. 37 illustrates the first cross section of FIG. 36 where the compression shim-stack in an open position.

FIG. 36 illustrates a front view of a cross-section of the base valve assembly 2650 located at the compression end of actuator 2501 shown in FIG. 31. FIG. 36 shows how the compression volume 2507 is fluidly connected to the annular cavity 2656. The pressure in the annular cavity 2656 acts on the sealing compression shim 2652a and under certain conditions causes the shim 2652a to deflect and open.

Figure 38:
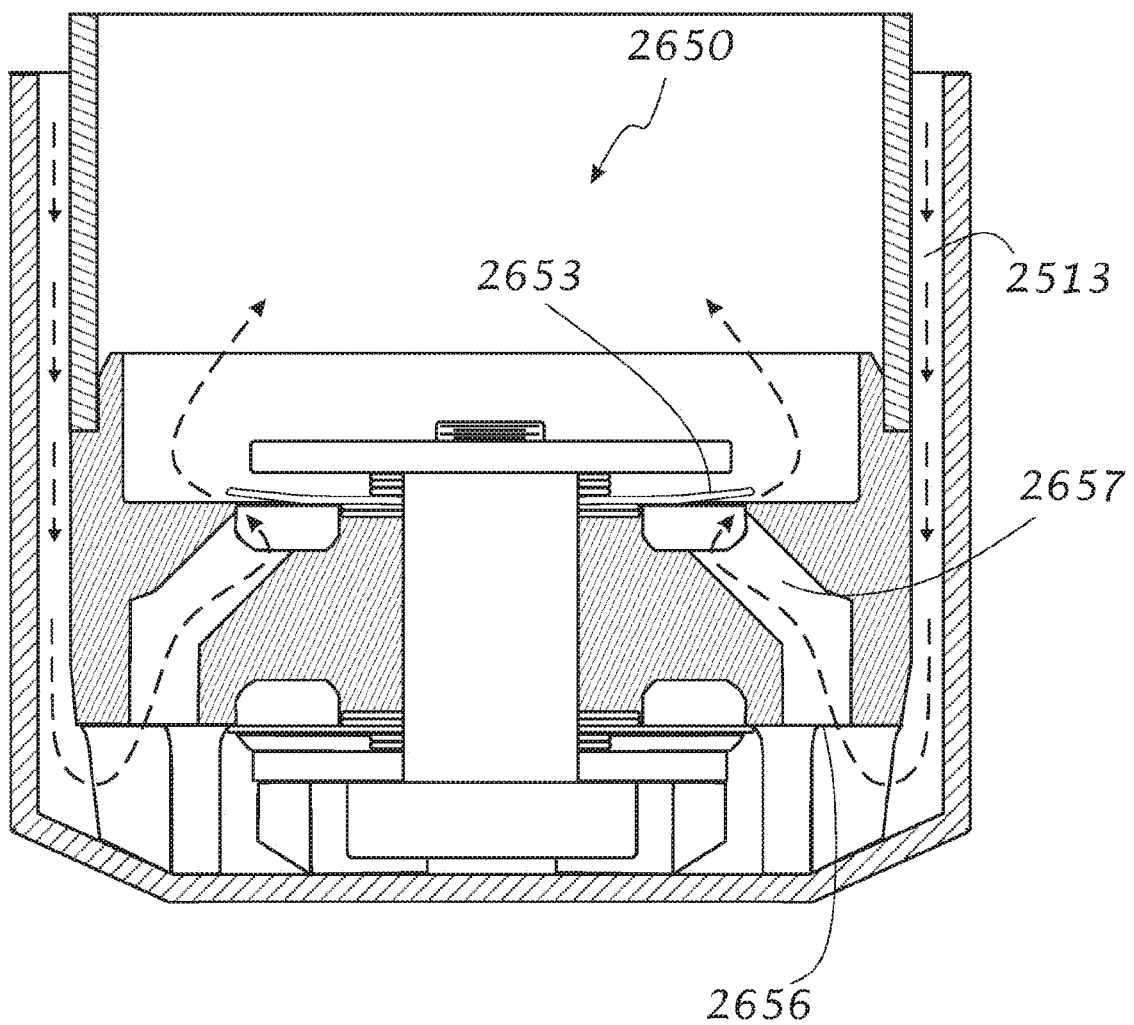
FIG. 38 illustrates a second cross section of the base-valve with the extension shim stack in an open position.

FIG. 38 illustrates that once the compression sealing shim 2652a deflects, fluid may flow from the compression volume 2507, through the flow channels 2657, which, in the embodiment of FIG. 38, are fluidly connected to conduit 2513.

FIG. 38 illustrates another front view cross-section of the base valve 2650 where the pressure in conduit 2513 is conveyed to the extension sealing shim 2651a. Under certain conditions, the sealing shim 2651a may deflect and allow fluid from the conduit 2513 to flow into the compression volume 2507.

The inventors have recognized that in an active suspension actuator operating at low piston velocities, significant damping may be preferred as discussed above with regard to FIG. 33. However, the inventors have also recognized that when operating at higher flow rates, such as in flow ranges $B_E$ (extension) and $B_C$ (compression) in FIG. 33, much higher flow rates may need to be accommodated through the base valve than, for example, in the case of passive dampers. To allow such flow rates, the diameters of the compression and/or extension sealing shims 2651a, 2652a may need to be maximized.

For example, during rapid compression in passive dampers, fluid may flow, for example, to the extension volume through valves in the piston as well as the base valve. Under such circumstances, only the volume displaced by the intrusion of the piston rod into the extension volume may need to flow through the base valve.

In an active system, the inventors have recognized that the valves in the piston may, for example, need to be set at a high enough cracking pressure to allow the production of sufficient active force with the pump.

On the other hand, in some embodiments of active suspension systems, all or effectively all of the volume displaced by the piston may flow through the base valve. The inventors have recognized that the desired capacity of the base valve in either compression and extension and the pressure drop vs. flow relationship may be achieved by maximizing the diameter of the compression sealing shim 2652a and/or the extension sealing shim 2651a.

Figure 39:
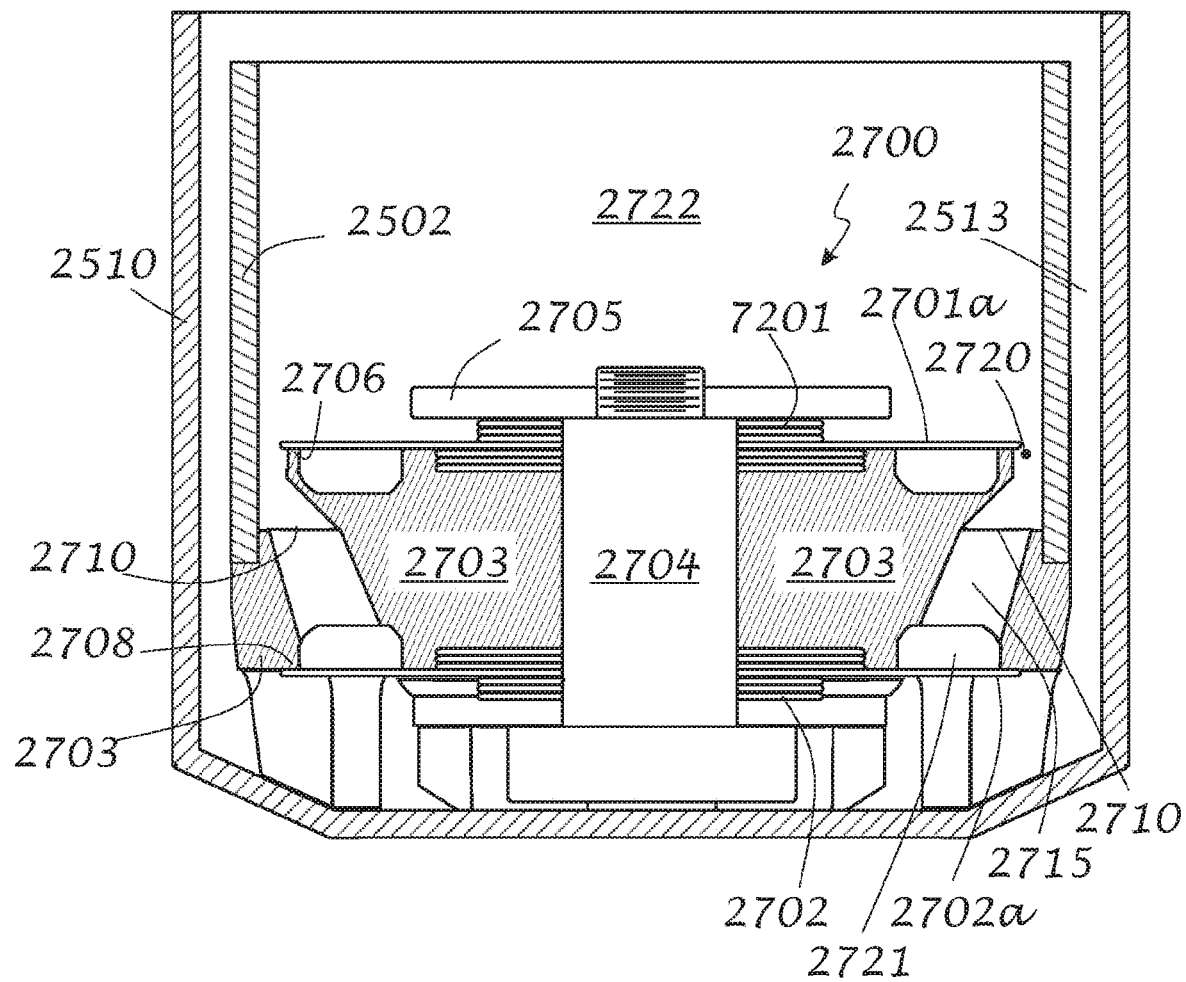
FIG. 39 illustrates a first cross section of another embodiment of a bidirectional base-valve.

FIG. 39 illustrates a base valve assembly 2700 engaging the compression end of a twin tube damper/actuator. The diameter of the compression sealing shim and extension sealing shim are larger than the embodiment illustrated in FIGS. 34-38. The embodiment shown in FIG. 39 includes an extension shim stack 2701 and a compression shim stack 2702 and base valve body 2703. The shim stacks are secured to the valve body by bolt 2704 and nut 2705. Shim stack 2701 includes sealing shim 2701a that seals against annular surface 2706. Shim stack 2702 includes sealing shim 2702a that seals against annular surface 2708.

The diameter of the sealing shim 2701a may be increased relative to the embodiment shown in FIGS. 34-38 because inlet ports 2710 of compression flow conduits 2715 are recessed into the base valve body 2703 and are not located in the same radial plane as the annular sealing surface 2706. Before reaching the inlet ports 2710, the fluid from the compression volume flows through an annular or partially annular volume 2720 between the valve body and the pressure tube 2502.

The inventors have recognized that by using such a configuration, the diameter of the extension sealing shim 2701a, may be greater than 70%, but less than 100% of the inner diameter of the pressure tube 2502. Alternatively, the diameter of the extension sealing shim 2701a may be greater than 80% but less than 100% of the inner diameter of the pressure tube 2502. In some embodiments, the diameter of the extension sealing shim 2701a may be greater than 90%, but less than 100%, of the inner diameter of the pressure tube 2502 or any other appropriate percentage of the inner diameter of the pressure tube 2502.

Figure 40:
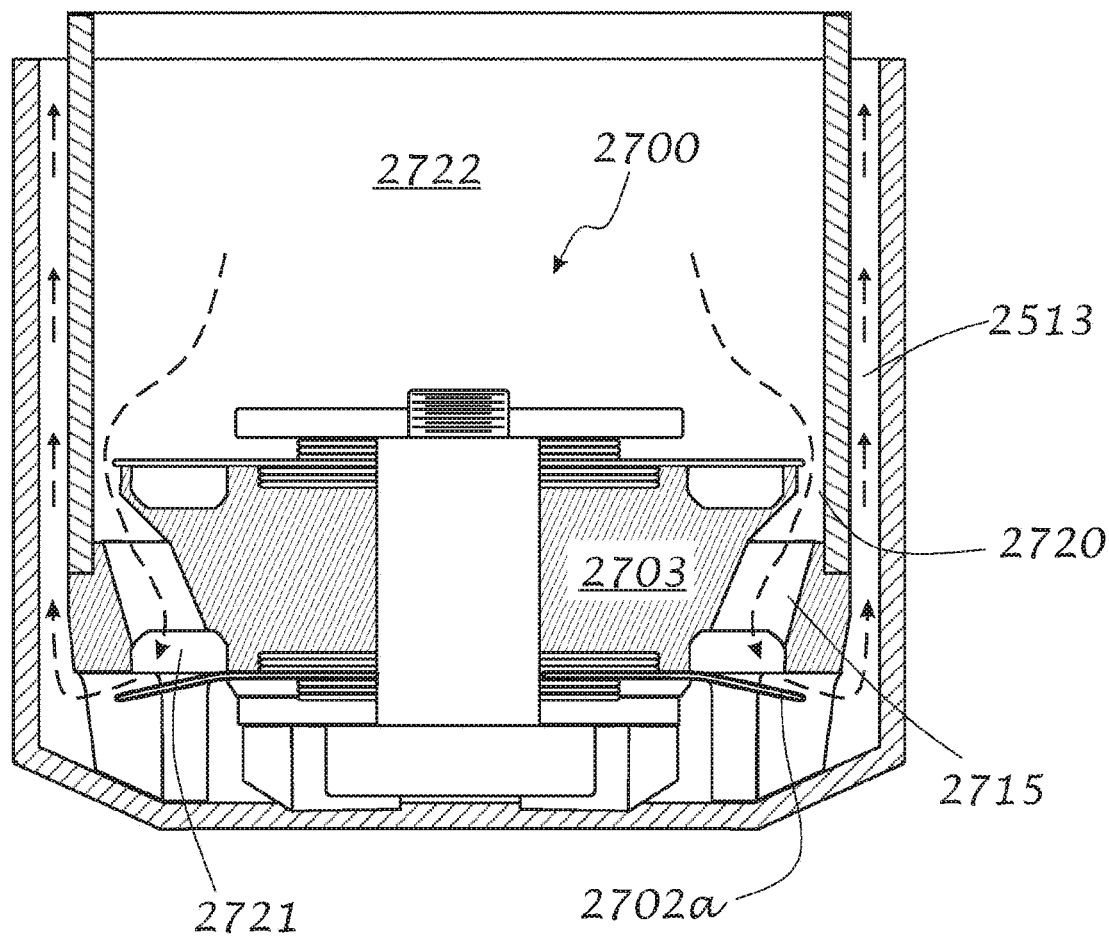
FIG. 40 illustrates the embodiment of FIG. 39 with the extension shim stack in an open position.

FIG. 40 illustrates how the pressure in the compression volume 2722 may be conveyed to the compression sealing shim 2702a through annular or partially annular region 2720, compression flow channels 2715 in the base valve body 2703, and the annular cavity 2721 to act on the compression sealing shim 2702a. Under certain conditions, the pressure may cause the sealing shim 2702a to deflect and create a flow path from the compression volume 2722 to the flow conduit 2513.

Figure 41:
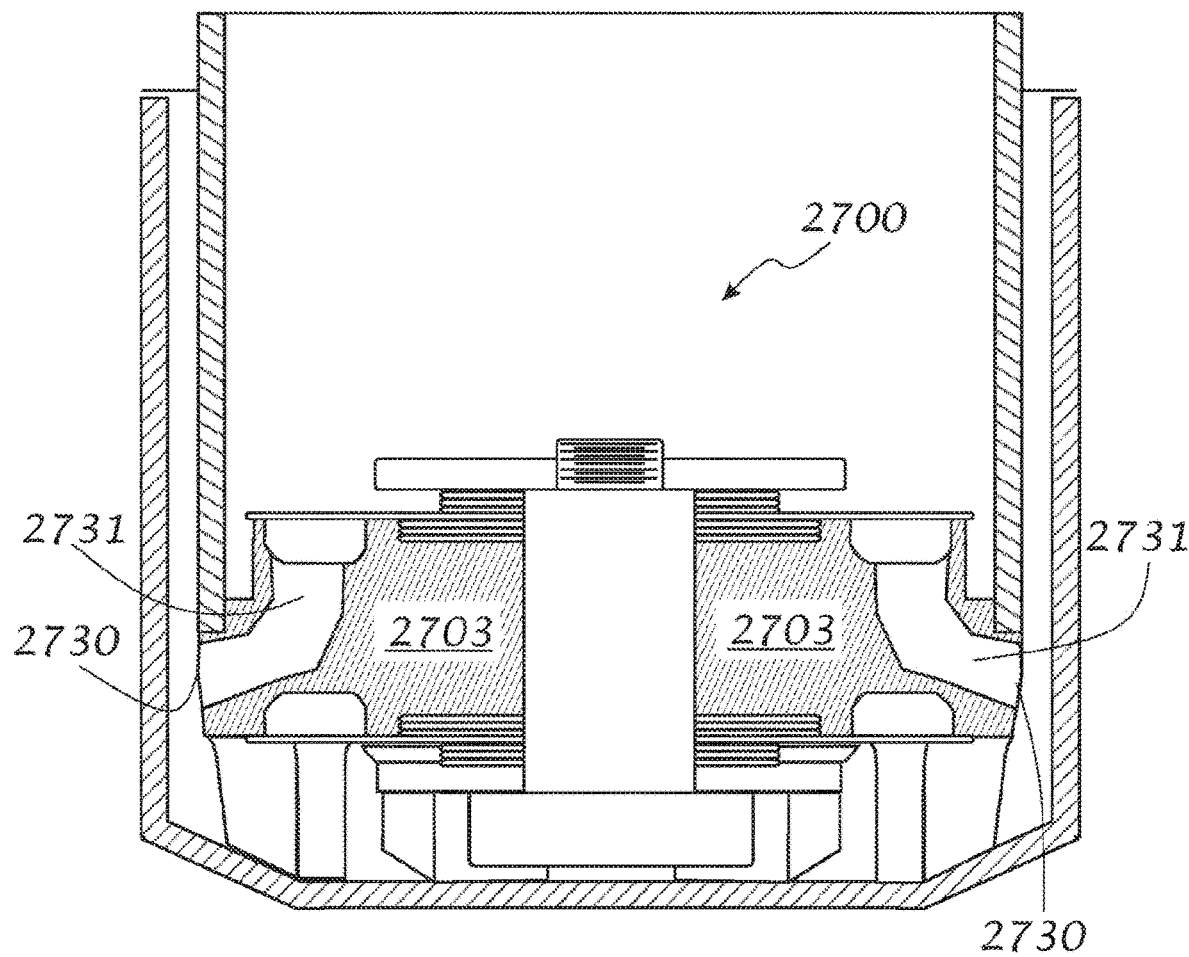
FIG. 41 illustrates a second cross section of the embodiment of FIG. 39.

FIG. 41 shows another cross-section of base valve assembly 2700. Alternatively or additionally, as illustrated in FIG. 41, the inlet ports 2730 to the extension conduits 2731 may be recessed axially into the body 2703 of the base valve relative to the sealing surface. By using this configuration, the diameter of the compression sealing shim 2702a, may be greater than 70%, but less than 100% of the inner diameter of the pressure tube 2502. Alternatively, the diameter of the compression sealing shim 2702a may be greater than 80% but less than 100% of the inner diameter of the pressure tube 2502. In some embodiments, the diameter of the compression sealing shim 2702a may be greater than 90%, but less than 100%, of the inner diameter of the pressure tube 2502 or any other appropriate percentage of the inner diameter of the pressure tube.

By using such a configuration, the diameter of the compression sealing shim 2702a may be greater than the inner diameter of the pressure tube 2502. In some embodiments, the diameter of the compression sealing shim 2702a (not shown) may be greater than 70%, but less than 100% of the inner diameter of the second tube 2510. Alternatively, the diameter of the compression sealing shim 2702a may be greater than 80% but less than 100% of the diameter of the second tube 2510. In some embodiments, the diameter of the compression sealing shim 2702a may be greater than 90%, but less than 100% of the diameter of the second tube 2510 or any other appropriate percentage of the diameter of the second tube 2510.

Figure 42:
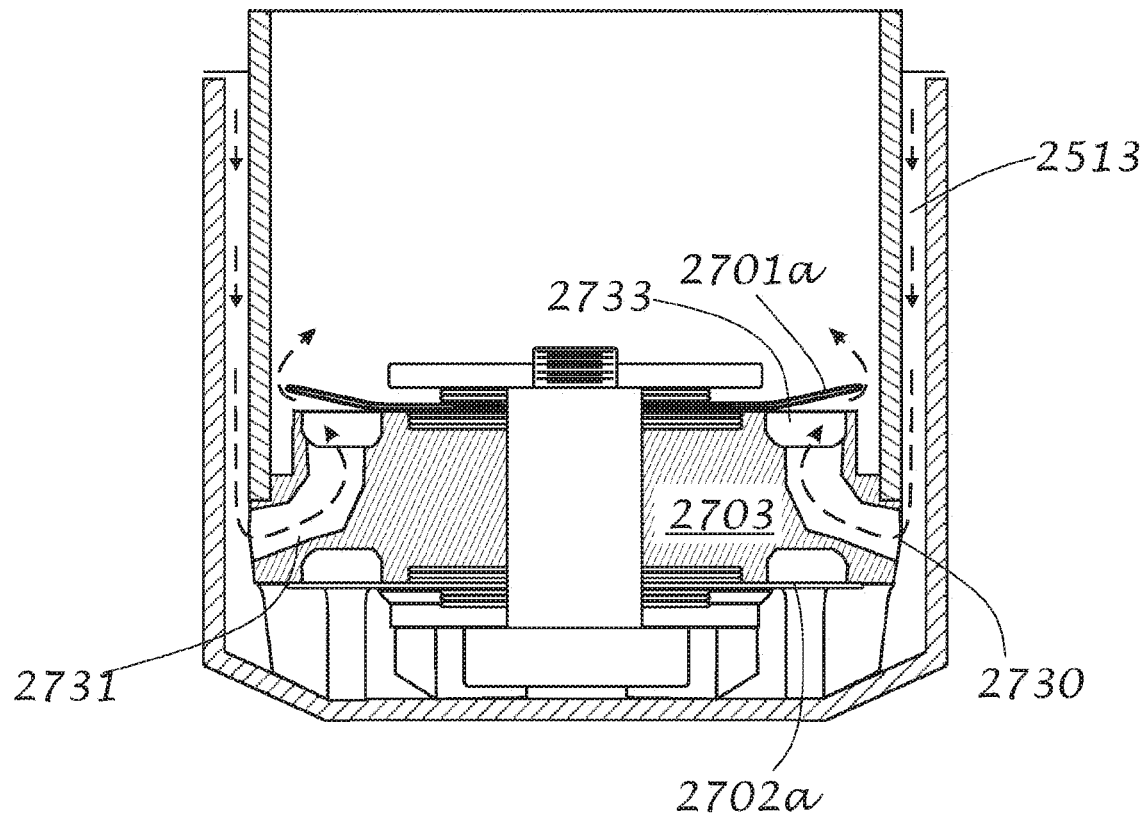
FIG. 42 illustrates the second cross section of the base-valve of FIG. 39 with the extension shim-stack is in an open position.

FIG. 42 illustrates how the pressure in the flow conduit 2513 may be conveyed through inlet ports 2730, extension flow channels 2731 in the body 2703 of the base valves, and annular cavity 2733. Pressure in the flow conduit 2513 causes the sealing shim 2701a to deflect and open a flow path between the flow conduit 2513 and the compression volume 2722 in the direction shown in FIG. 42.

Figure 43:
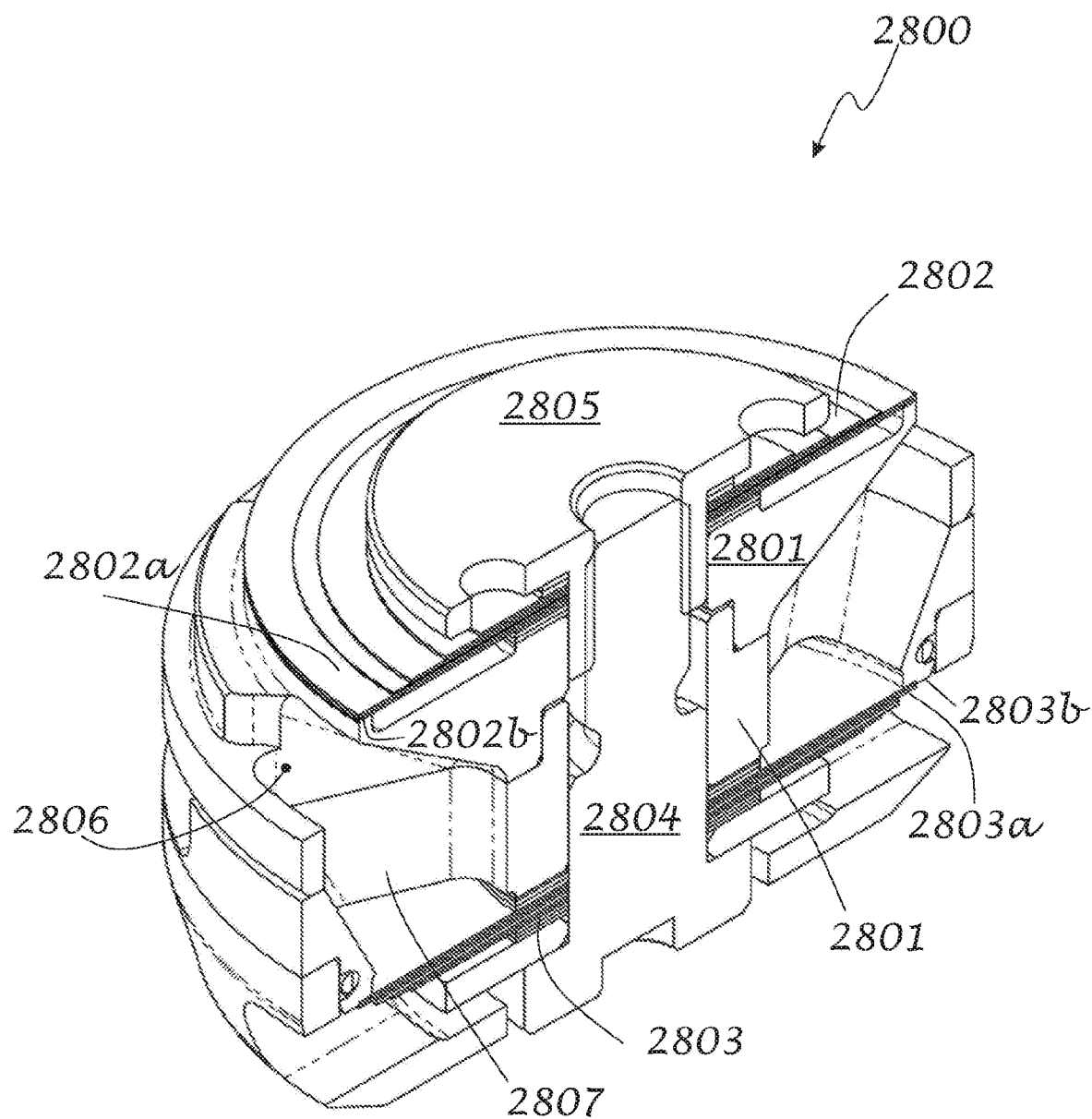
FIG. 43 shows a section of isometric view of yet another embodiment of a bidirectional base valve.
Figure 44:
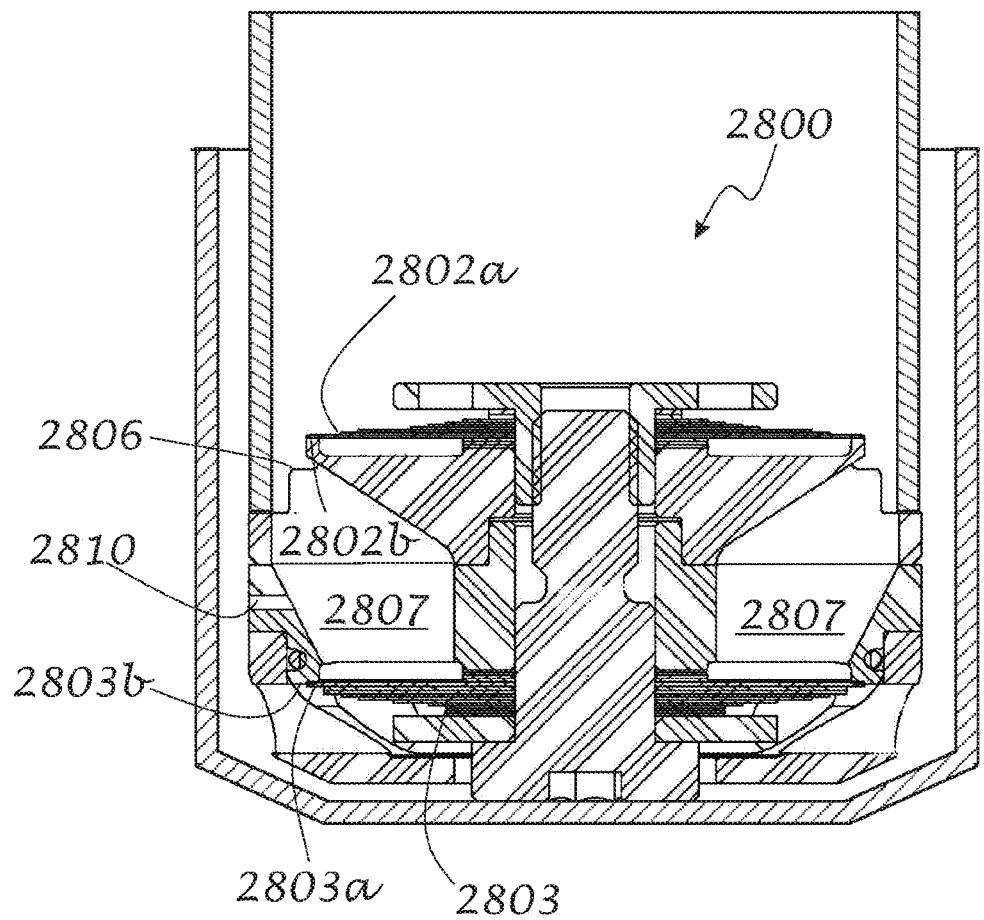
FIG. 44 illustrates a first cross section of the high capacity base-valve of FIG. 43 including a bleed hole, with each shim-stack in a closed position.

The isometric cross-section shown in FIG. 43 illustrates another embodiment of a high capacity base valve assembly 2800 that includes a multipiece valve body 2801, extension shim stack 2802, and compression shim stack 2803 that are securely attached together by bolt 2804 and nut 2805. Sealing extension shim 2802a seals against sealing surface 2802b, while sealing compression shim 2803a seals against a portion of sealing surface 2803b. Inlet port 2806 of compression flow channel 2807 is recessed axially further into the valve body 2801 relative to the sealing surface. FIG. 44 illustrates a front view cross-section view of the base valve assembly of FIG. 43 showing the compression flow channels 2807 with inlet ports 2806 that are axially recessed from the sealing surface 2802b of the extension sealing shim 2802a. In some embodiments, a bleed passage 2810 may allow for a flow across the valve without passing through either shim stack. In some embodiments this bleed hole may be in the rage between 0.1 and 3 mm, or 0.05-5 mm hydraulic diameter. The size, length, and number of bleed holes may be used to determine or tune the flow pressure drop relationship in the ranges $A_E$ and $A_C$ illustrated in FIG. 33.

Figure 45:
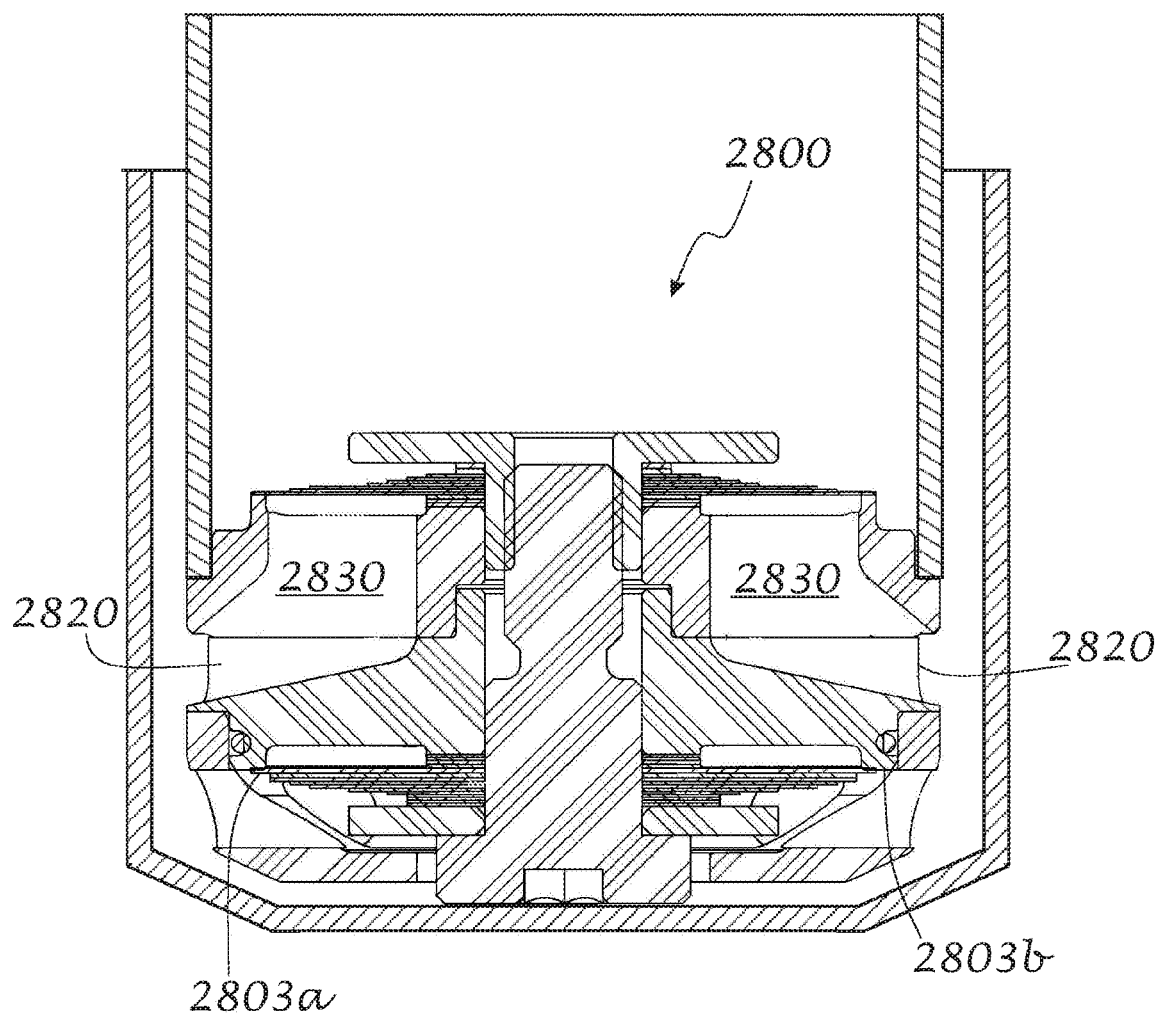
FIG. 45 illustrates a second cross section of the base-valve of FIG. 43 with each shim-stack in a closed position.

FIG. 45 illustrates another front view cross-section of the base valve 2800 showing the extension inlet ports 2820 of extension flow conduits 2830 in the body of valve assembly 2800. It should be noted that the inlet ports 2820 are recessed relative to the sealing surface 2803b of the compression sealing shim 2803a.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A method of operating an active suspension actuator system of a vehicle; the method comprising:
over a road surface, operating the vehicle with the active suspension actuator operatively interposed between a wheel assembly and a vehicle body, wherein the actuator has a compression volume and an extension volume that are fluidly connected to a first and second port of a hydraulic machine, respectively;
striking a discontinuity in the road surface with a wheel associated with the wheel assembly;
increasing a pressure in the compression volume to a first value greater than a pre-selected threshold value at a first rate of increase;
opening a pressure balanced blow-off valve to discharge at least a portion of the increased pressure from the compression volume to the extension volume;
operating the hydraulic machine to increase the pressure in the compression volume to a value greater than the threshold at a second rate lower than the first rate without opening the pressure balanced blow-off valve; and
operating the hydraulic machine to increase the pressure in the compression volume to a value less than the threshold value at a rate greater than the first rate without opening the pressure balanced blow-off valve.

2. The method of claim 1, wherein the actuator has an accumulator fluidly connected to the compression volume by means of at least a portion of a first flow path.

3. The method of claim 2, wherein a damping coefficient of the first flow path is between 10 newton-meters per second and 400 newton-meters per second.

4. The method of claim 3, wherein the damping coefficient of the first flow path for fluid flow towards the compression volume is different from the damping coefficient of the first flow path for fluid flow away from the compression volume.

5. The method of claim 1, wherein the pressure balanced blow-off valve is passive.

6. The method of claim 1, wherein the pressure balanced blow-off valve has a pressure offset that one of an absolute offset and a relative offset.

7. The method of claim 1, wherein the discontinuity in the road surface is a pothole.

8. The method of claim 1, wherein the discontinuity in the road surface is a bump.

9. The method of claim 1, wherein the hydraulic machine is a hydraulic pump.

10. A method of operating an active suspension actuator system of a vehicle, the method comprising:
over a road surface, operating the vehicle with the active suspension actuator operatively interposed between a wheel assembly and a vehicle body, wherein the actuator has a compression volume and an extension volume that are fluidly connected to a first and second port of a hydraulic machine, respectively;
striking a discontinuity in the road surface with a wheel associated with the wheel assembly;
due to striking the discontinuity, increasing a pressure in the compression volume to a first value greater than a pre-selected threshold value at a first rate of increase;
in response to the increase in pressure at the first rate, opening a pressure balanced blow-off valve to discharge at least a portion of the increased pressure from the compression volume to the extension volume; and
operating the hydraulic machine to increase the pressure in the compression volume to a value greater than the threshold at a second rate lower than the first rate without opening the pressure balanced blow-off valve.

11. The method of claim 10, wherein the actuator has an accumulator fluidly connected to the compression volume by means of at least a portion of a first flow path.

12. The method of claim 11, wherein a damping coefficient of the first flow path is between 10 newton-meters per second and 400 newton-meters per second.

13. The method of claim 12, wherein the damping coefficient of the first flow path for fluid flow towards the compression volume is different from the damping coefficient of the first flow path for fluid flow away from the compression volume.

14. The method of claim 10, wherein the pressure balanced blow-off valve is passive.

15. The method of claim 10, wherein the pressure balanced blow-off valve has a pressure offset that one of an absolute offset and a relative offset.

16. The method of claim 10, wherein the discontinuity in the road surface is a pothole.

17. The method of claim 10, wherein the discontinuity in the road surface is a bump.

18. The method of claim 10, wherein the hydraulic machine is a hydraulic pump.

* * * * *